United States Patent
Kubo et al.

(10) Patent No.: US 6,452,654 B2
(45) Date of Patent: Sep. 17, 2002

(54) LIQUID CRYSTAL DISPLAY IN WHICH AT LEAST ONE PIXEL INCLUDES BOTH A TRANSMISSIVE REGION AND A REFLECTIVE REGION

(75) Inventors: Masumi Kubo, Ikoma; Yozo Narutaki, Yamatokoriyama; Atsushi Ban, Kyoto; Takayuki Shimada, Yamatokoriyama; Yoji Yoshimura, Nari; Mikio Katayama, Ikoma; Yutaka Ishii, Nara; Hirohiko Nishiki, Funabashi, all of (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/739,697

(22) Filed: Dec. 20, 2000

Related U.S. Application Data

(62) Division of application No. 09/122,756, filed on Jul. 27, 1998, now Pat. No. 6,195,140.

(51) Int. Cl.[7] .................. G02F 1/1335; G02F 1/136; G02F 1/1343
(52) U.S. Cl. ................. 349/114; 349/44; 349/147
(58) Field of Search ................. 349/43, 44, 113, 349/112, 114, 147, 143

(56) References Cited

U.S. PATENT DOCUMENTS

| | | | |
|---|---|---|---|
| 3,748,018 A | 7/1973 | Borden, Jr. | 350/160 LC |
| 4,218,281 A | 8/1980 | Doriguzzi et al. | 156/281 |
| 5,003,356 A | 3/1991 | Wakai et al. | 349/44 |
| 5,146,355 A | 9/1992 | Prince et al. | 359/50 |

(List continued on next page.)

FOREIGN PATENT DOCUMENTS

| | | |
|---|---|---|
| JP | 60-262131 | 12/1985 |
| JP | 62-272228 | 11/1987 |
| JP | 64-32201 | 2/1989 |
| JP | 64-52130 | 2/1989 |
| JP | 01-165184 | 6/1989 |
| JP | 02-204726 | 8/1990 |
| JP | 3-134623 | 6/1991 |
| JP | 4-116531 | 4/1992 |
| JP | 06-337433 | 12/1994 |
| JP | 07-318929 | 12/1995 |
| JP | 7-333598 A | 12/1995 |
| JP | 08-201851 | 8/1996 |
| JP | 09/033945 | 2/1997 |

OTHER PUBLICATIONS

"Latest Liquid Crystal Technologies", Kogyo Chosakai Publishing Co., Tokyo, 1983, pp. 186–189 and 194–197.
Abstract (English Translation of JP 3–134623), Jun. 7, 1991, Hirosada, Seiko Epson Corp., Liquid Crystal Electrooptical Element.
Abstract (English Translation of JP 103–33201), Feb. 2, 1989, Kiyoshi, Asahi Optical Co., Ltd., Laminated Structure of Thin Dielectric Film.

*Primary Examiner*—William L. Sikes
*Assistant Examiner*—Tarifur R. Chowdhury
(74) *Attorney, Agent, or Firm*—Nixon & Vanderhye P.C.

(57) ABSTRACT

A liquid crystal display device according to the present invention includes a first substrate, a second substrate, and a liquid crystal layer interposed between the first substrate and the second substrate. The first substrate includes: a plurality of gate lines; a plurality of source lines arranged to cross with the plurality of gate lines; a plurality of switching elements disposed in the vicinity of crossings of the plurality of gate lines and the plurality of source lines; and a plurality of pixel electrodes connected to the plurality of switching elements. The second substrate includes a counter electrode. A plurality of pixel regions are defined by the plurality of pixel electrodes, the counter electrode, and the liquid crystal layer interposed between the plurality of pixel electrodes and the counter electrode, and each of the plurality of pixel regions includes a reflection region and a transmission region.

13 Claims, 52 Drawing Sheets

U.S. PATENT DOCUMENTS

| | | | |
|---|---|---|---|
| 5,434,688 A | * 7/1995 | Saitoh et al. | 359/67 |
| 5,530,571 A | 6/1996 | Chen | 359/69 |
| 5,585,951 A | 12/1996 | Noda et al. | 349/122 |
| 5,680,186 A | 10/1997 | Watanabe et al. | 349/95 |
| 5,753,937 A | 5/1998 | Shimomaki et al. | 257/55 |
| 5,771,083 A | 6/1998 | Fujihara et al. | 349/147 |
| 5,808,711 A | 9/1998 | Suppelsa et al. | 349/74 |
| 5,822,027 A | 10/1998 | Shimada et al. | 349/39 |
| 5,841,494 A | 11/1998 | Hall | 349/98 |
| 5,847,781 A | 12/1998 | Ono et al. | 349/44 |
| 5,847,789 A | 12/1998 | Nakamura et al. | 349/113 |
| 5,907,379 A | 5/1999 | Kim et al. | 349/147 |
| 5,920,082 A | 7/1999 | Kitazawa et al. | 349/143 |
| 5,926,702 A | 7/1999 | Kwon et al. | 349/44 |
| 5,978,056 A | 11/1999 | Shintani et al. | 349/44 |
| 6,061,110 A | * 5/2000 | Hisatake et al. | 349/113 |
| 6,061,112 A | * 5/2000 | Ukita et al. | 349/113 |
| 6,215,538 B1 | * 4/2001 | Narutaki et al. | 349/106 |
| 6,262,842 B1 | * 7/2001 | Ouderkirk et al. | 349/114 |

* cited by examiner

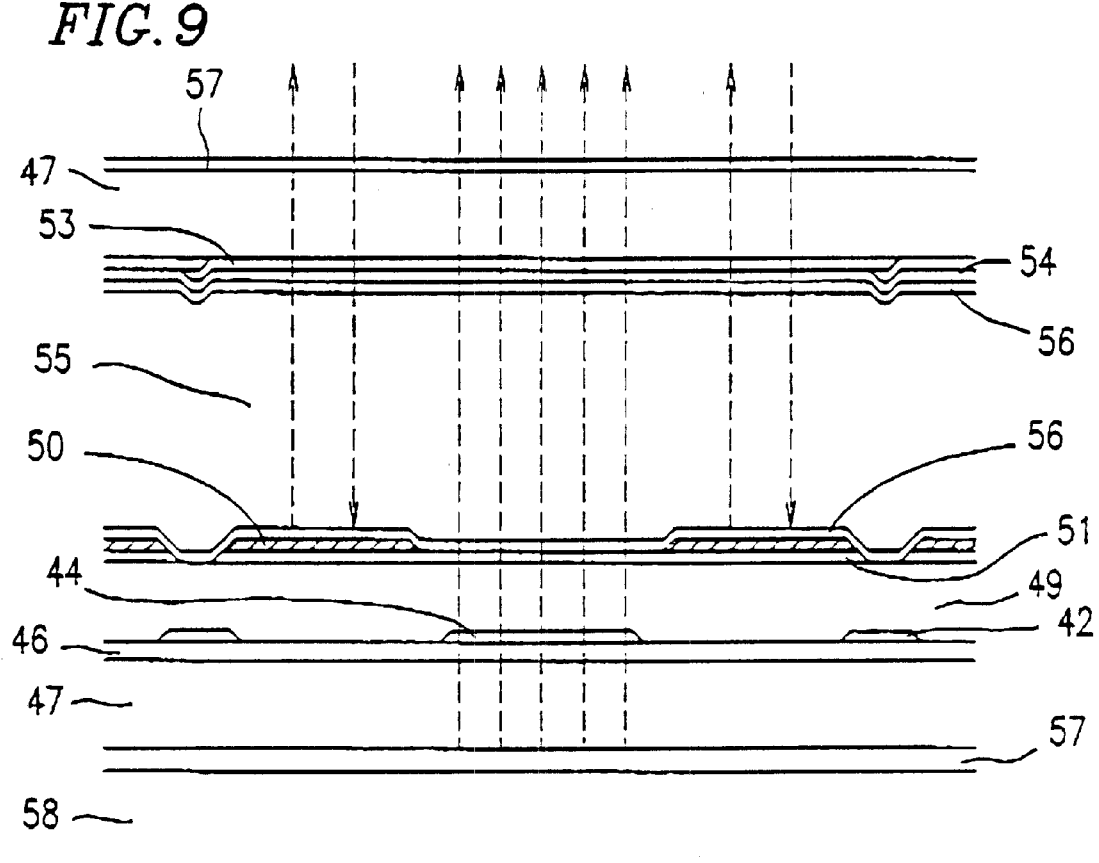

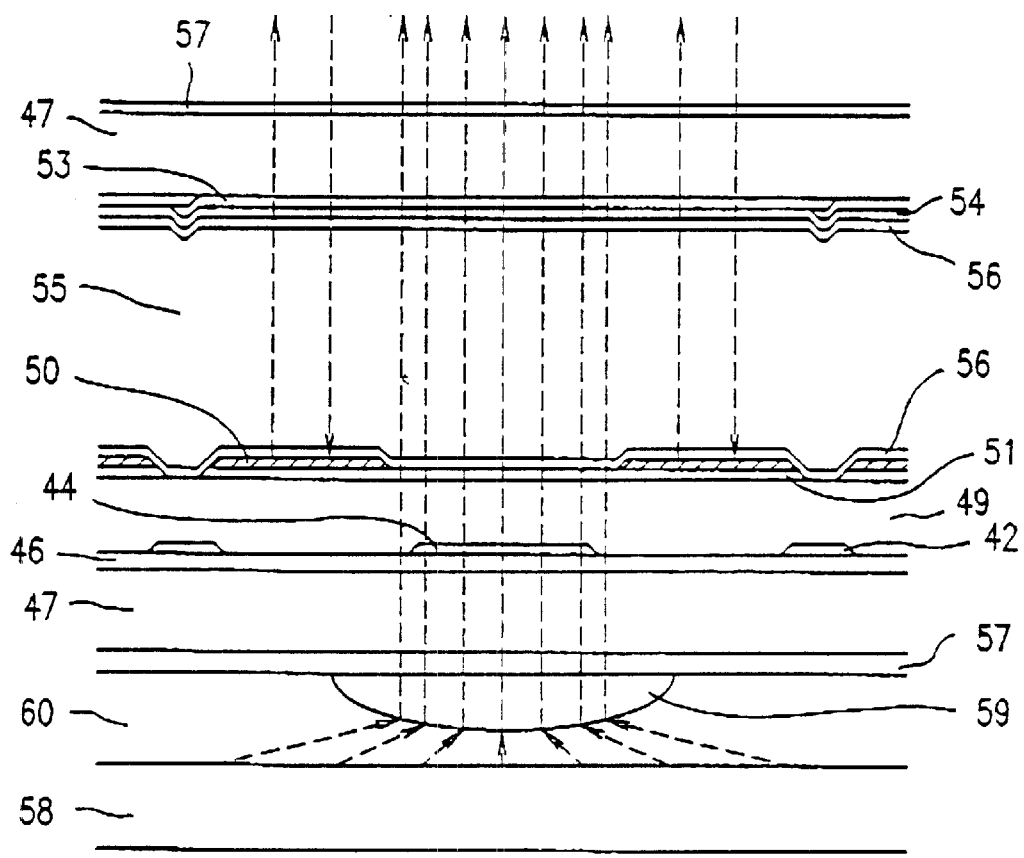

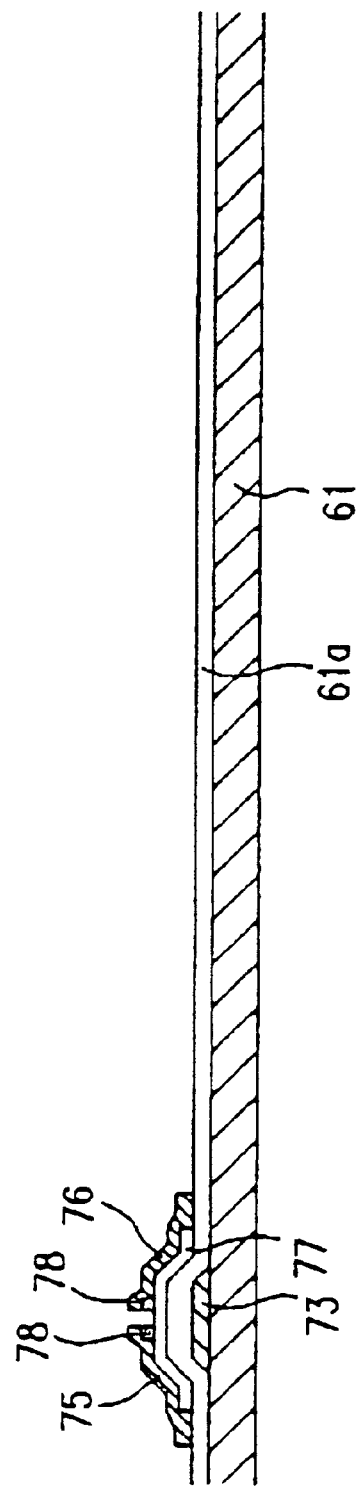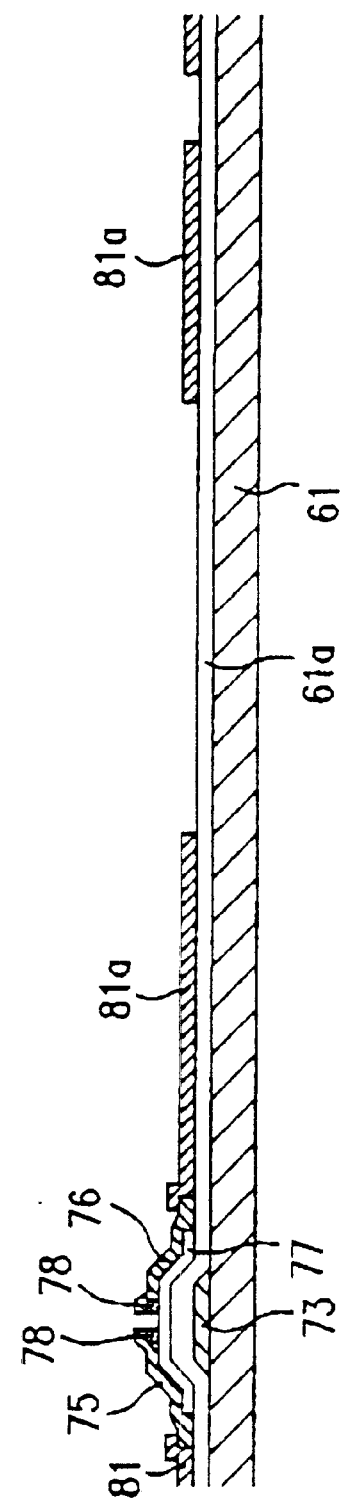

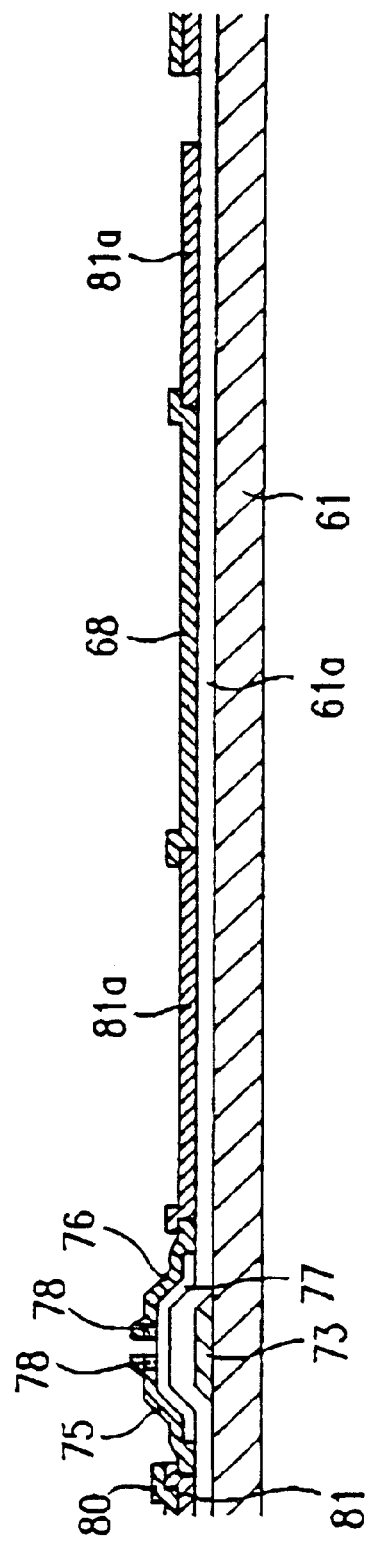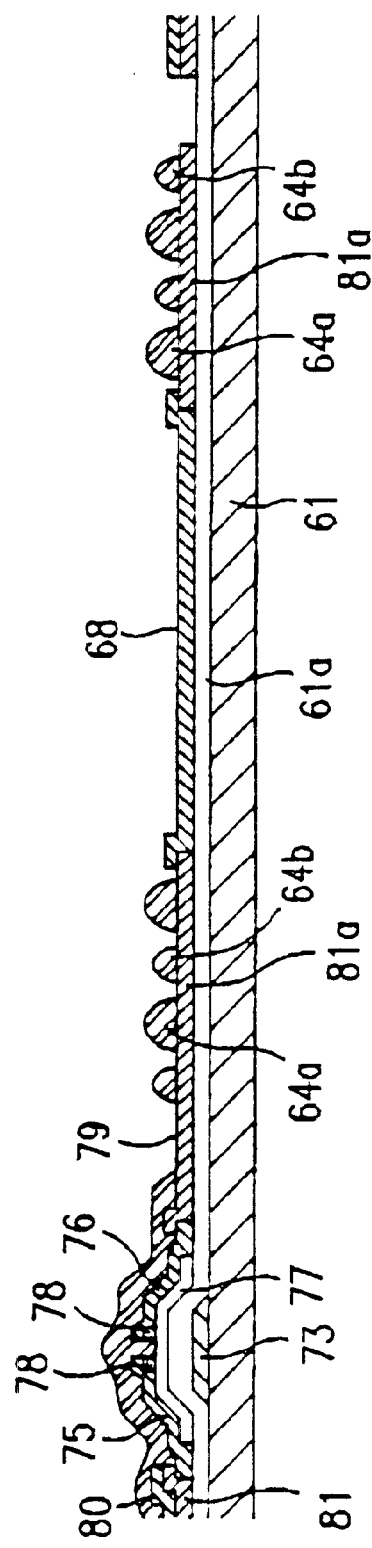

US 6,452,654 B2

LIQUID CRYSTAL DISPLAY IN WHICH AT LEAST ONE PIXEL INCLUDES BOTH A TRANSMISSIVE REGION AND A REFLECTIVE REGION

This is a divisional of application Ser. No. 09/122,756, filed Jul. 27, 1998 now U.S. Pat. No. 6,195,140, the entire content of which is hereby incorporated by reference in this application.

FIELD OF THE INVENTION

The present invention relates to a liquid crystal display device and a method for fabricating the liquid crystal display device. More particularly, the present invention relates to a liquid crystal display device having a transmission display region and a reflection display region in each pixel, and a method for fabricating such a liquid crystal display device.

DESCRIPTION OF THE RELATED ART

Due to the features of being thin and consuming low power, liquid crystal display devices have been used in a broad range of fields including office automation (OA) apparatuses such as wordprocessors and personal computers, portable information apparatuses such as portable electronic schedulers, and a camera-incorporated VCR provided with a liquid crystal monitor.

Such liquid crystal display devices include a liquid crystal display panel which does not emit light itself, unlike a CRT display and an electroluminescence (EL) display. Therefore, a so-called transmission type is often used as the liquid crystal display device, which includes an illuminator called a backlight disposed at the rear or one side thereof, so that the amount of the light from the backlight which passes through the liquid crystal panel is controlled by the liquid crystal panel in order to realize image display.

In such a transmission type liquid crystal display device, however, the backlight consumes 50% or more of the total power consumed by the liquid crystal display device. Providing the backlight therefore increases the power consumption.

In order to overcome the above problem, a reflection type liquid crystal display device has been used for portable information apparatuses which are often used outdoors or carried with the users. Such a reflection type liquid crystal display device is provided with a reflector formed on one of a pair of substrates in place of the backlight so that ambient light is reflected from the surface of the reflector.

Such a reflection type liquid crystal display device is operated in a display mode using a polarizing plate, such as a twisted nematic (TN) mode and a super twisted nematic (STN) mode which have been broadly used in the transmission type liquid crystal display devices. In recent years, there has been vigorous development of a phase change type guest-host mode which does not use a polarizing plate and thus realizes a brighter display.

The reflection type liquid crystal display device using the reflection of ambient light is disadvantageous in that the visibility of the display is extremely lower when the surrounding environment is dark. Conversely, the transmission type liquid crystal display device is disadvantageous when the environment is bright. That is, the color reproducibility is lower and the display is not sufficiently recognizable because the display light is less bright than the ambient light. In order to improve the display quality under a bright environment, the intensity of the light from the backlight needs to be increased. This increases the power consumption of the backlight and thus the resultant liquid crystal display device. Moreover, when the liquid crystal display device needs to be viewed at a position exposed to direct sunlight or direct illumination light, the display quality is inevitably lower due to the ambient light. For example, when a liquid crystal display screen fixed in a car or a display screen of a personal computer used at a fixed position receives direct sunlight or illumination light, surrounding images are mirrored, making it difficult to observe the display itself.

In order to overcome the above problems, a construction which realizes both a transmission mode display and a reflection mode display in one liquid crystal display device has been disclosed in, for example, Japanese Laid-Open Publication No. 7-333598. Such a liquid crystal display device uses a semi-transmissive reflection film which transmits part of light and reflects part of light.

FIG. 52 shows such a liquid crystal display device using a semi-transmissive reflection film. The liquid crystal display device includes polarizing plates 30a and 30b, a phase plate 31, a transparent substrate 32, black masks 33, a counter electrode 34, alignment films 35, a liquid crystal layer 36, metal-insulator-metal (MIM) elements 37, pixel electrodes 38, a light source 39, and a reflection film 40.

The pixel electrodes 38, which are the semi-transmissive reflection films, are extremely thin layers made of metal particles or layers having sporadical minute hole defects or concave defects therein formed over respective pixels. Pixel electrodes with this construction transmit light from the light source 39 and at the same time reflect light from outside such as natural light and indoor illumination light, so that both the transmission display function and the reflection display function are simultaneously realized.

The conventional liquid crystal display device shown in FIG. 52 has following problems. First, when an extremely thin layer of deposited metal particles is used as the semi-transmissive reflection film of each pixel, since the metal particles have a large absorption coefficient, the internal absorption of incident light is large and some of the light is absorbed without being used for display, thereby lowering the light utilization efficiency.

When a film having sporadical minute hole defects or concave defects therein is used as the pixel electrode 38 of each pixel, the structure of the film is too complicated to be easily controlled, requiring precise design conditions. Thus, it is difficult to fabricate the film having uniform characteristics. In other words, the reproducibility of the electrical or optical characteristics is so poor that control of the display quality in the above liquid crystal display device is extremely difficult.

For example, if thin film transistors (TFTs), which in recent years have been generally used as the switching elements of liquid crystal display devices, are attempted to be used for the above liquid crystal display device shown in FIG. 52, an electrode for the formation of a storage capacitor in each pixel needs to be formed by an electrode/ interconnect material other than that for the pixel electrode. In this case, the pixel electrode made of the semi-transmissive reflection film, as in this conventional device, is not suitable for the formation of a storage capacitor. Moreover, even when the semi-transmissive reflection film as the pixel electrode is formed over part of the interconnects and elements via an insulating layer, the pixel electrode which includes a transmissive component hardly contributes to an increase in the numerical aperture. Also, if light is incident on a semiconductor layer of the switching element such as a MIM and a TFT, an optically pumped current is generated. The formation of the semi-transmissive reflection film as the light-shading layer is insufficient for the protection of the switching element from light. To ensure light-shading, another light-shading film is required to be disposed on the counter substrate.

SUMMARY OF THE INVENTION

The liquid crystal display device of this invention includes a first substrate, a second substrate, and a liquid crystal layer interposed between the first substrate and the second substrate, a plurality of pixel regions being defined by respective pairs of electrodes for applying a voltage to the liquid crystal layer, wherein each of the plurality of pixel regions includes a reflection region and a transmission region.

In one embodiment of the invention, the first substrate includes a reflection electrode region corresponding to the reflection region and a transmission electrode region corresponding to the transmission region.

In another embodiment of the invention, the reflection electrode region is higher than the transmission electrode region, forming a step on a surface of the first substrate, and thus a thickness of the liquid crystal layer in the reflection region is smaller than a thickness of the liquid crystal layer in the transmission region.

In still another embodiment of the invention, the occupation of an area of the reflection region in each of the pixel regions is in the range of about 10 to about 90%.

Alternatively, the liquid crystal display device of this invention includes a first substrate, a second substrate, and a liquid crystal layer interposed between the first substrate and the second substrate, wherein the first substrate includes: a plurality of gate lines; a plurality of source lines arranged to cross with the plurality of gate lines; a plurality of switching elements disposed in the vicinity of crossings of the plurality of gate lines and the plurality of source lines; and a plurality of pixel electrodes connected to the plurality of switching elements, the second substrate includes a counter electrode, a plurality of pixel regions are defined by the plurality of pixel electrodes, the counter electrode, and the liquid crystal layer interposed between the plurality of pixel electrodes and the counter electrode, and each of the plurality of pixel regions includes a reflection region and a transmission region.

In one embodiment of the invention, the first substrate includes a reflection electrode region corresponding to the reflection region and a transmission electrode region corresponding to the transmission region.

In another embodiment of the invention, the reflection electrode region is higher than the transmission electrode region, forming a step on a surface of the first substrate, and thus a thickness of the liquid crystal layer in the reflection region is smaller than a thickness of the liquid crystal layer in the transmission region.

In still another embodiment of the invention, the thickness of the liquid crystal layer in the reflection region is about a half of the thickness of the liquid crystal layer in the transmission region.

In still another embodiment of the invention, each of the pixel electrodes includes a reflection electrode in the reflection electrode region and a transmission electrode in the transmission electrode region.

In still another embodiment of the invention, the reflection electrode and the transmission electrode are electrically connected to each other.

In still another embodiment of the invention, each of the pixel electrodes includes a transmission electrode, and the reflection region includes the transmission electrode and a reflection layer isolated from the transmission electrode.

In still another embodiment of the invention, the reflection electrode regions overlap at least a portion of the plurality of gate lines, the plurality of source lines, and the plurality of switching elements.

In still another embodiment of the invention, at least either of the reflection electrode regions and the transmission electrode regions have a layer formed of the same material as a material for the plurality of gate lines or the plurality of source lines.

In still another embodiment of the invention, the occupation of an area of the reflection region in each of the pixel regions is in the range of about 10 to about 90%.

In still another embodiment of the invention, the first substrate further includes storage capacitor electrodes for forming storage capacitors with the pixel electrodes via an insulating film, wherein the reflection electrode regions overlap the storage capacitor electrodes.

In still another embodiment of the invention, the liquid crystal display device further includes microlenses on a surface of the first substrate opposite to the surface facing the liquid crystal layer.

In still another embodiment of the invention, each of the reflection electrode regions includes a metal layer and an interlayer insulating film formed under the metal layer.

In still another embodiment of the invention, the metal layer has a continuous wave shape.

In still another embodiment of the invention, a surface of the interlayer insulating layer is of a concave and convex shape.

In still another embodiment of the invention, the interlayer insulating layer is formed of a photosensitive polymer resin film.

In still another embodiment of the invention, the interlayer insulating layer covers at least a portion of either the switching element, the plurality of gate lines, or the plurality of source lines.

In still another embodiment of the invention, the reflection electrodes are formed at the same level as the plurality of gate lines or the plurality of source lines.

In still another embodiment of the invention, the reflection electrodes are formed at the same level as the plurality of gate lines, and the reflection electrodes are electrically connected to the gate lines for the pixel electrodes adjacent to the reflection electrodes.

In still another embodiment of the invention, the same signals applied to the counter electrode are applied to the reflection electrodes.

In still another embodiment of the invention, the reflection electrodes are formed at the same level as the plurality of gate lines, and the reflection electrodes form storage capacitors by overlapping drain electrodes of the switching elements or the transmission electrodes.

In still another embodiment of the invention, the reflection electrode is formed of Al or an Al alloy.

In still another embodiment of the invention, the transmission electrode is formed of ITO, and a metal layer interposes between the transmission electrode and the reflection electrode.

According to another aspect of the invention, a method for fabricating a liquid crystal display device is provided. The liquid crystal display device includes a first substrate, a second substrate, and a liquid crystal layer interposed between the first substrate and the second substrate, the first substrate including: a plurality of gate lines; a plurality of source lines arranged to cross with the plurality of gate lines; a plurality of switching elements disposed in the vicinity of crossings of the plurality of gate lines and the plurality of source lines; and a plurality of pixel electrodes connected to the plurality of switching elements, the second substrate including a counter electrode, a plurality of pixel regions are defined by the plurality of pixel electrodes, the counter electrode, and the liquid crystal layer interposed between the plurality of pixel electrodes and the counter electrode, each of the plurality of pixel regions including a reflection region and a transmission region. The method includes the steps of: forming the transmission electrode regions using a material having a high light transmittance on the first substrate; forming photosensitive polymer resin layers; and forming reflection layers made of a material having a high reflectance on the polymer resin layers.

In one embodiment of the invention, the photosensitive polymer resin layers have a plurality of concave and convex portions.

Alternatively, a method for fabricating a liquid crystal display device of this invention is provided. The liquid crystal display device includes a first substrate, a second substrate, and a liquid crystal layer interposed between the first substrate and the second substrate, the first substrate including: a plurality of gate lines, a plurality of source lines arranged to cross with the plurality of gate lines; a plurality of switching elements disposed in the vicinity of crossings of the plurality of gate lines and the plurality of source lines; and a plurality of pixel electrodes connected to the plurality of switching elements, the second substrate including a counter electrode, a plurality of pixel regions are defined by the plurality of pixel electrodes, the counter electrode, and the liquid crystal layer interposed between the plurality of pixel electrodes and the counter electrode, each of the plurality of pixel regions including a reflection region and a transmission region. The method includes the steps of: forming the transmission electrode regions using a material having a high light transmittance on the first substrate; forming protection films on the transmission electrode regions; and forming layers having a high reflectance on portions of the protection films to form the reflection electrode regions.

In one embodiment of the invention, the transmission electrode regions are formed at the same level as the plurality of source lines.

Thus, the invention described herein makes possible the advantages of (1) providing a liquid crystal display device of a type realizing both a transmission mode display and a reflection mode display simultaneously where the light utilization efficiencies of ambient light and light from a backlight are improved compared with the conventional liquid crystal display device of the same type and an excellent display quality is obtained, and (2) providing a method for fabricating such a liquid crystal display device. In particular, in the liquid crystal display device according to the present invention, the display quality obtained when the environment is bright significantly improves.

These and other advantages of the present invention will become apparent to those skilled in the art upon reading and understanding the following detailed description with reference to the accompanying figures.

BRIEF DESCRIPTION OF THE DRAWINGS

FIG. 9 is a sectional view of the liquid crystal display device according to Example 4 of the present invention;

FIG. 10 is a sectional view of an alternative embodiment of the liquid crystal display device according to Example 4 of the present invention, provided with microlenses;

FIGS. 19A to 19F are sectional views taken along line F—F of FIG. 18, illustrating the process of fabricating the reflection/transmission type liquid crystal display device of Example 8;

DESCRIPTION OF THE PREFERRED EMBODIMENTS

EXAMPLE 1

A liquid crystal display device of Example 1 according to the present invention includes an active matrix substrate and a transparent counter substrate (e.g., a glass substrate), which has a counter electrode facing pixel electrodes. A liquid crystal layer is interposed between the active matrix substrate and the counter substrate. A plurality of pixel regions are defined by respective pairs of the pixel electrodes and the counter electrode for applying a voltage to the liquid crystal layer. The pixel region includes a pair of electrodes and the liquid crystal layer between the pair of electrodes. This definition is also applicable to a simple matrix type liquid crystal display device, which has a plurality of scanning electrodes and a plurality of signal electrodes.

The liquid crystal display device according to the present invention has at least one transmission electrode region and at least one reflection region in each pixel. The transmission and reflection regions include the liquid crystal layer and the pair of the electrodes interposing the liquid crystal layer. A region of an electrode which defines the transmission region is referred to as a transmission electrode region and a region of an electrode which defines the reflection region is referred to as a reflection electrode region.

Figure 1:
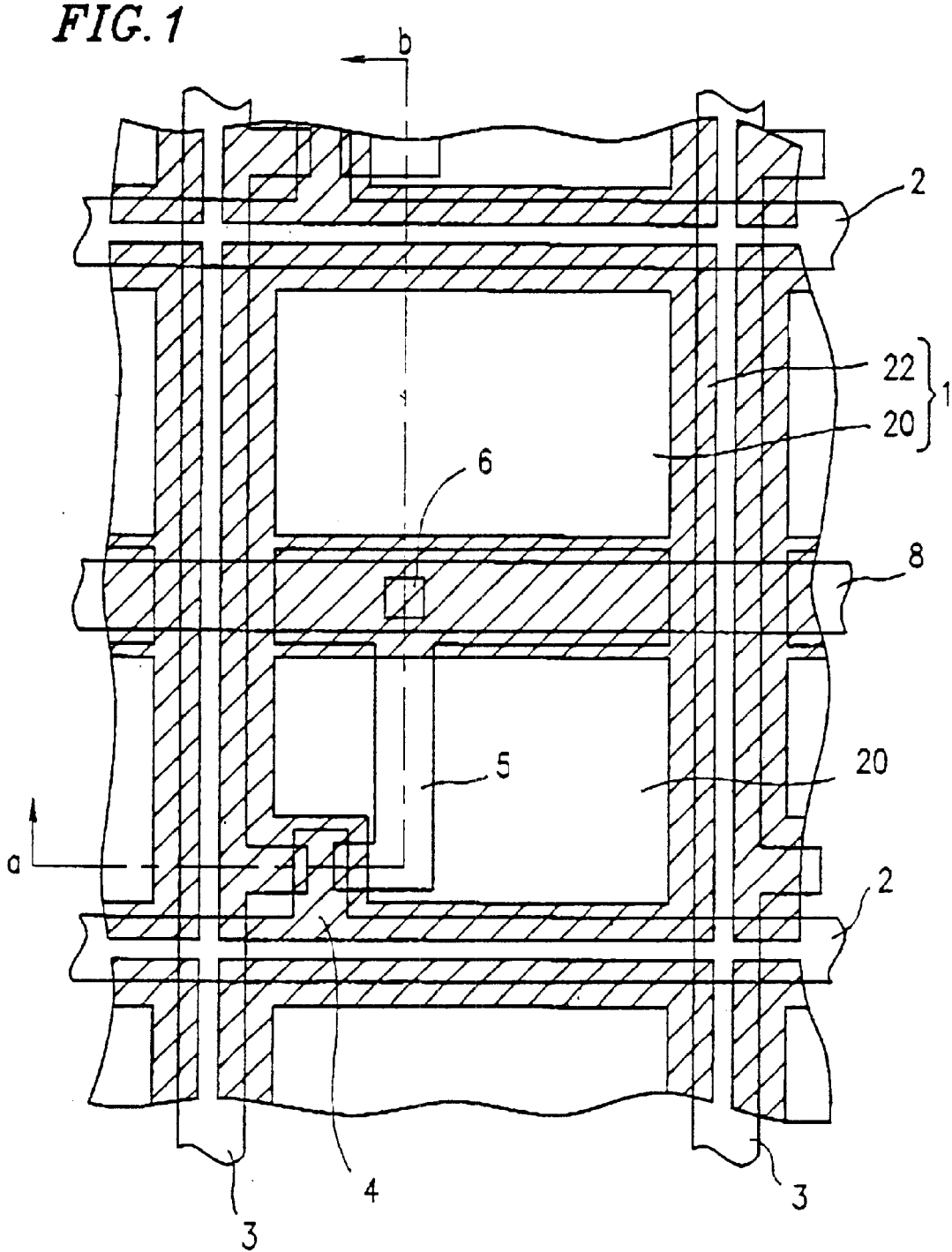
FIG. 1 is a plan view of an active matrix substrate of a liquid crystal display device according to Example 1 of the present invention.
Figure 2:
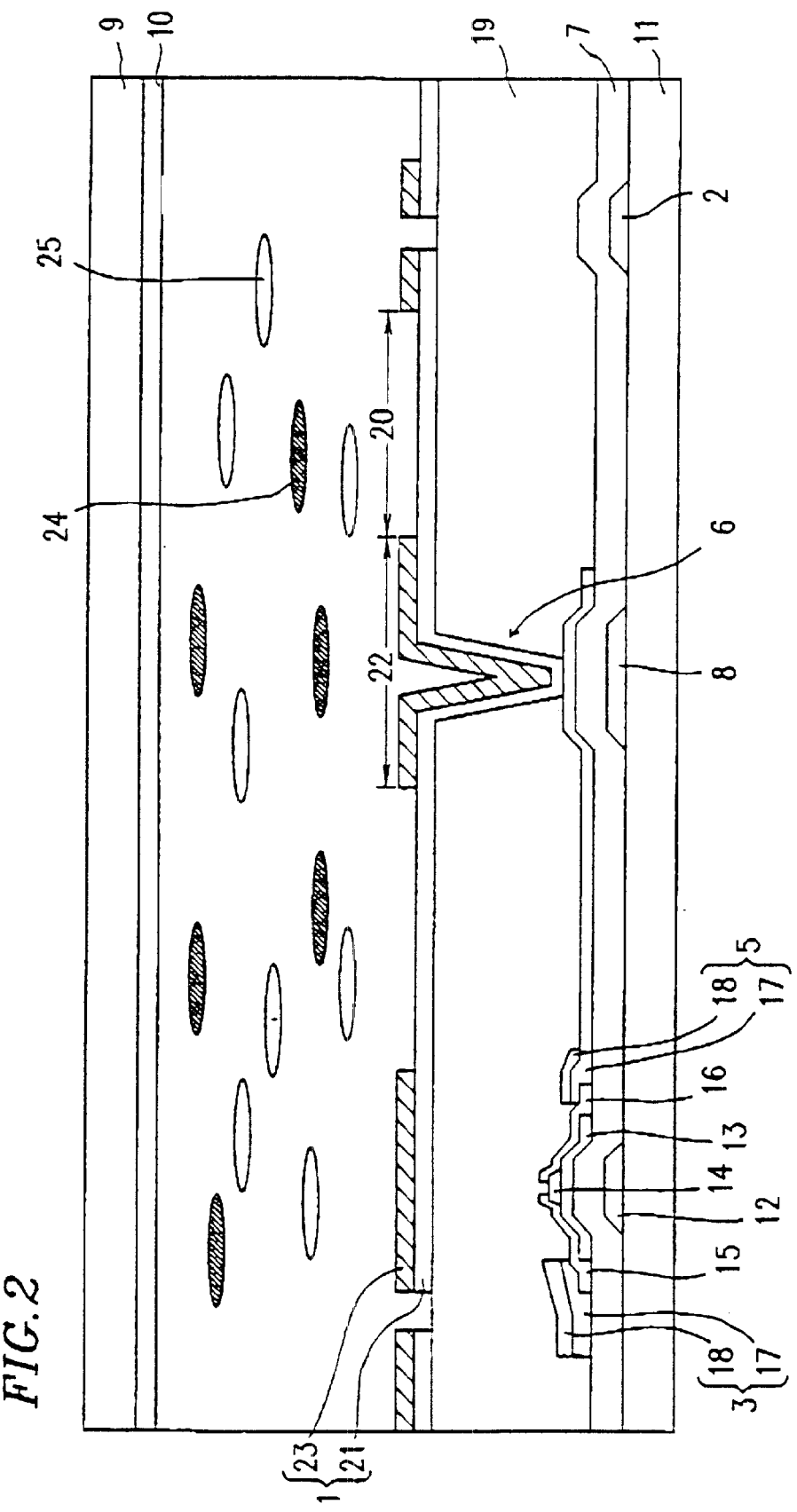
FIG. 2 is a sectional view taken along line a–b of FIG. 1.

FIG. 1 is a plan view of one pixel portion of an active matrix substrate of the liquid crystal display device of Example 1. FIG. 2 is a sectional view taken along line a–b of FIG. 1.

Referring to FIGS. 1 and 2, the active matrix substrate includes pixel electrodes 1 arranged in a matrix. Gate lines 2 for supplying scanning signals and source lines 3 for supplying display signals are disposed along the peripheries of the pixel electrodes 1 so as to cross each other at right angles.

The gate lines 2 and the source lines 3 are overlapped by peripheral portions of the corresponding pixel electrodes 1 via an interlayer insulating film 19. The gate lines 2 and the source lines 3 are composed of metal films.

Thin film transistors (TFTS) 4 are formed in the vicinity of the respective crossings of the gate lines 2 and the source lines 3. A gate electrode 12 of each of the TFTs 4 is connected to the corresponding gate line 2, to drive the TFT 4 with a signal input into the gate electrode 12 via the gate line 2. A source electrode 15 of the TFT 4 is connected to the corresponding source line 3, to receive a data signal from the source line 3. A drain electrode 16 of the TFT 4 is connected to a connecting electrode 5 which is in turn electrically connected to the corresponding pixel electrode 1 via a contact hole 6.

The connecting electrode 5 forms a storage capacitor with a storage capacitor electrode 8 via a gate insulating film 7. The storage capacitor electrode 8 is composed of a metal film and connected to a counter electrode 10 formed on a counter substrate 9 via an interconnect (not shown). The storage capacitor electrodes 8 may be formed together with the gate lines 2 during the same step.

Each of the pixel electrodes 1 includes a reflection electrode region 22 including a metal film and at least one transmission electrode region 20 composed of an ITO film. The reflection electrode region 22 is formed to overlie the gate line 2, the source line 3, the TFT 4, and the storage capacitor electrode 8, while the transmission electrode region 20 is surrounded by the reflection electrode region 22.

The active matrix substrate of Example 1 with the above construction is fabricated in the following manner.

First, the gate electrodes 12, the gate lines 2, the storage capacitor electrodes 8, the gate insulating film 7, semiconductor layers 13, channel protection layers 14, the source electrodes 15, and the drain electrodes 16 are sequentially formed on a transparent insulating substrate 11 made of glass or the like.

Then, a transparent conductive film 17 and a metal film 18 are sequentially deposited by sputtering and patterned into a predetermined shape to form the source lines 3 and the connecting electrodes 5.

Thus, the source lines 3 have a double-layer structure composed of the transparent conductive film 17 made of ITO and the metal film 18. With this structure, even if a defect such as a disconnection is generated in the metal film 18, the electrical connection is maintained via the transparent conductive film 17. This reduces the generation of disconnections in the source lines 3.

Thereafter, a photosensitive acrylic resin is applied to the resultant substrate by a spin application method to form the interlayer insulating film 19 with a thickness of 3 µm. The acrylic resin is then exposed to light according to a desired pattern and developed with an alkaline solution. Only the light-exposed portions of the film are etched with the alkaline solution to form the contact holes 6 through the interlayer insulating film 19. By employing this alkaline development, well-tapered contact holes 6 are obtained.

Using a photosensitive acrylic resin for the interlayer insulating film 19 is advantageous in the aspect of productivity in view of the following points. Since the spin application method can be employed for the thin film formation, a film as thin as several micrometers can be easily formed. Also, no photoresist application step is required at the patterning of the interlayer insulating film 19.

In this example, the acrylic resin is colored and can be made transparent by exposing the entire surface to light after patterning. The acrylic resin may also be made transparent by chemical processing.

Thereafter, a transparent conductive film 21 is formed by sputtering and patterned, thereby forming transparent conductive films 21. The transparent conductive films 21 are made of ITO.

Thus, the transparent conductive films 21 are electrically connected to the respective connecting electrodes 5 via the-contact holes 6.

A metal film 23 is then formed on the transparent conductive films 21 and patterned so as to overlie the gate lines 2, the source lines 3, the TFTs 4, and the storage capacitor electrodes 8, to be used as the reflection electrode regions 22 of the pixel electrodes 1. The portions of the transparent conductive films 21 which are not covered with the metal films 23 constitute the transmission electrode regions 20. The transparent conductive films 21 and the metal films 23 are electrically connected with each other. Any adjacent pixel electrodes are separated by the portions located above the gate lines 2 and the source lines 3 so as not to be electrically connected with each other.

The metal films 23 are made of Al. They may also be made of any conductive material having a high reflectance such as Ta.

In this example, as shown in FIG. 2, a liquid crystal layer includes dichromatic pigment molecules 24 mixed in liquid crystal. The absorption coefficient of such a dichromatic pigment varies depending on the orientation direction of molecules thereof. The orientation direction of the dichromatic pigment molecules 24 changes when the orientation direction of the liquid crystal molecules 25 is changed by controlling the electric field between the counter electrode 10 and the pixel electrodes 1. The resultant change In the absorption coefficient of the dichromatic pigment molecules 24 is used to generate an image display.

By using the liquid crystal display panel of Example 1 with the above construction, the display can effectively use light which has been emitted from a backlight and passed through the transmission electrode regions 20 when the ambient light is low and light reflected by the reflection electrode regions 22 when the ambient light is high. Also, both the transmission electrode ectrode regions 20 and the reflection electrode regions 22 can be used to generate a display. Moreover, a liquid crystal display device providing a bright display can be realized.

In this example, the metal films 23 of the reflection electrode regions 22 of the pixel electrodes 1 overlie the TFTs 4, the gate lines 2, and the source lines 3. This eliminates the necessity of providing light-shading films for preventing light from entering the TFTs 4 and light-shading portions of the pixel electrodes located above the gate lines, the source lines, and the storage capacitor electrodes. In such portions, light leakage tends to be generated in the form of domains, disclination lines, and the like in certain display regions. As a result, regions which are conventionally unusable as display regions because they are blocked by the light-shading films can be used as display regions. This allows for effective use of the display regions.

When the gate lines and the source lines are made of metal, they serve as light-shading regions in a transmission type display device, and thus are unusable as display regions. In the liquid crystal display device of this example, however, such regions which are used as light-shading regions in the conventional transmission type display device are usable as reflection electrode regions of the pixel electrodes. Thus, a brighter display can be obtained.

In this example, the metal film 23 is formed on the transparent conductive film 21. This allows the metal film 23 to have an uneven surface in compliance with an uneven surface of the transparent conductive film 21. The uneven surface of the metal film 23 is advantageous over a flat surface since an uneven surface receives ambient light at various incident angles. The resultant liquid crystal display device provides a brighter display.

Figure 3:
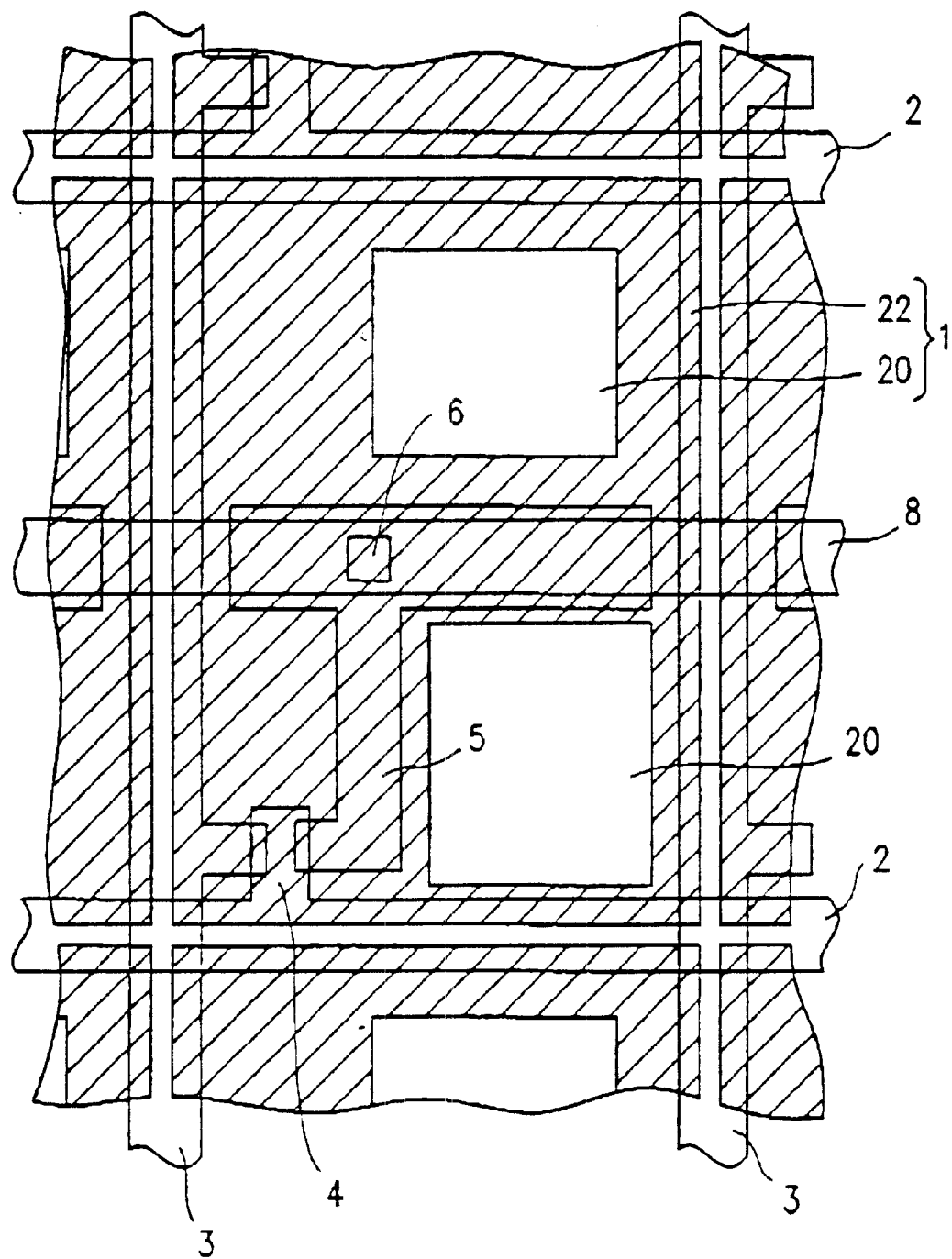
FIG. 3 is a plan view of another embodiment of the active matrix substrate according to Example 1 of the present invention.
Figure 4:
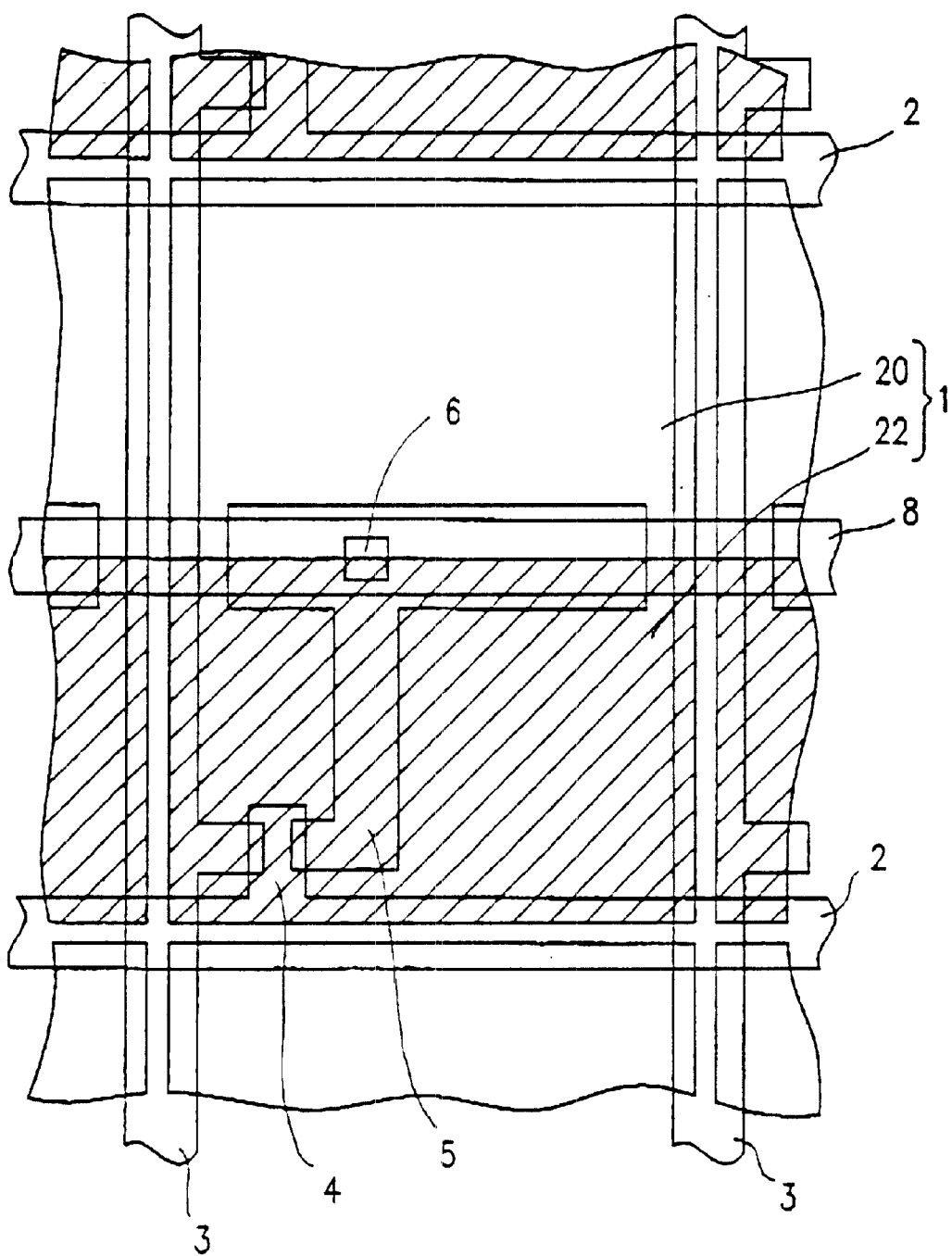
FIG. 4 is a plan view of a still another embodiment of the active matrix substrate according to Example 1 of the present invention.

FIGS. 3 and 4 are plan views of alternative embodiment of the liquid crystal display devices of Example 1 according to the present invention. In these alternative examples, the ratio of the areas of the transmission electrode region 20 to the reflection electrode region 22 of each pixel electrode 1 is changed from that shown in FIG. 1. In this way, a liquid crystal display device having a desired reflectance and transmittance is obtained.

In the alternative examples shown in FIGS. 3 and 4, the connecting electrode 5 is located in the reflection electrode region 22. This suppresses a decrease in the brightness of light which has passed through the transmission electrode region 20.

Figure 6:
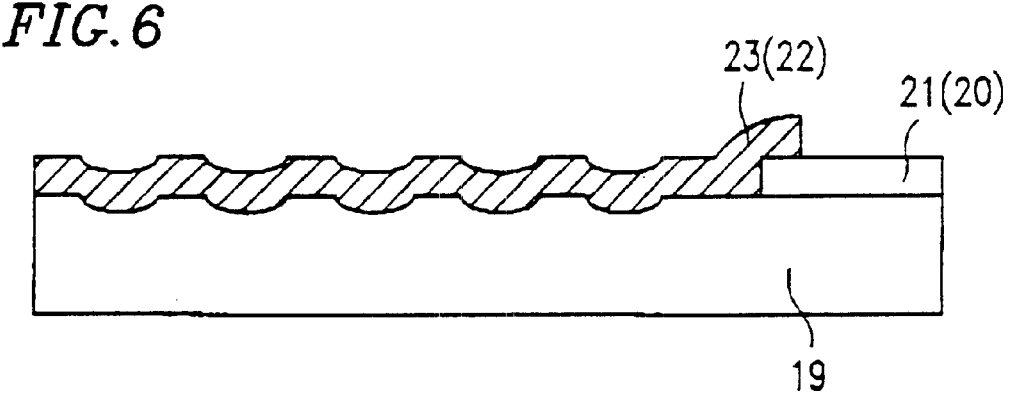
FIG. 6 is a sectional view taken along line c–d of FIG. 5.

In Example 1, the metal film 23 of the reflection electrode region 22 of the pixel electrode 1 is formed on the transparent conductive film 21. Alternatively, as shown in FIG. 6, the metal film 23 may be formed so as to overlap the transparent conductive film 21 only partially in order to be electrically connected with each other.

EXAMPLE 2

In Example 2, a method for forming the uneven surface of the metal film 23 will be described.

Figure 5:
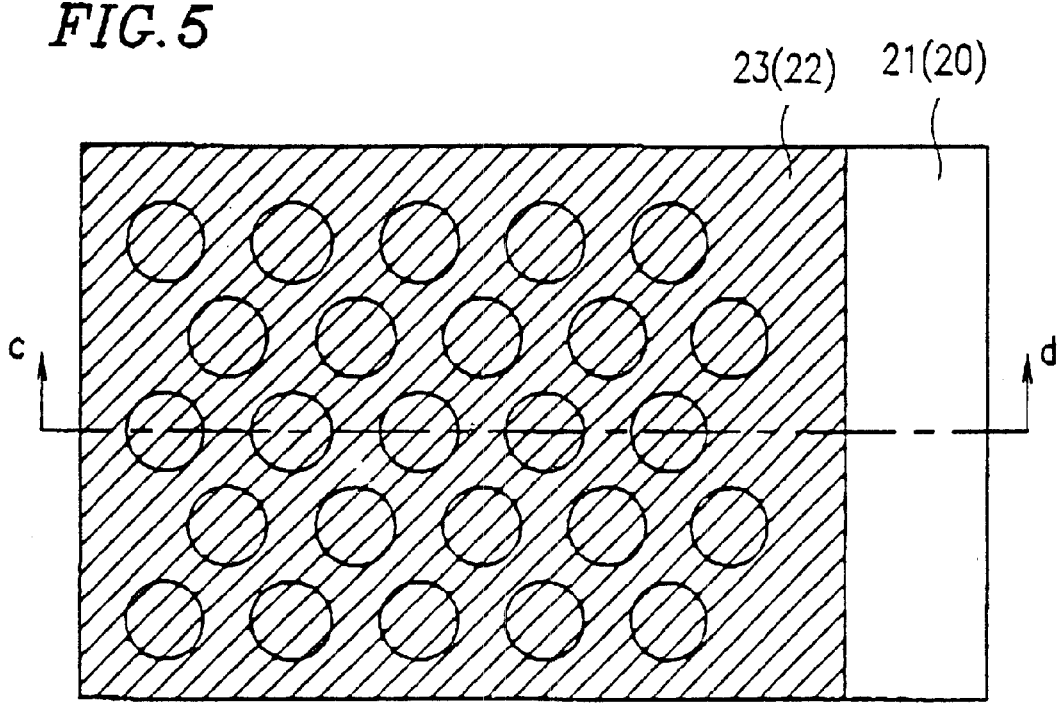
FIG. 5 is a plan view partially illustrating an interlayer insulating film and a metal film of a liquid crystal display device according to Example 2 of the present invention.

FIG. 5 is a plan view partially illustrating the metal film 23 formed on the interlayer insulating film 19 (not shown). FIG. 6 is a sectional view taken along line c–d of FIG. 5.

The surface of the interlayer insulating film 19 is made uneven by etching or the like, and the metal film 23 is formed on the uneven surface.

Thus, by forming the metal film 23 on the interlayer insulating film 19 which may be first formed flat by the spin application method or the like, but then have the surface thereof made uneven as described above, the metal film 23 having an uneven surface is obtained.

In a reflection type liquid crystal display device, the uneven surface of the metal film 23 is advantageous over a flat surface since an uneven surface receives ambient light at various incident angles. Thus, by forming the metal films 23 of the pixel electrodes 1 on the interlayer insulating film 19 so as to have an uneven surface obtained by etching or the like as shown in FIG. 6, the resultant reflective liquid crystal display device provides a brighter display.

The uneven surface of the metal film 23 is not limited to the shape shown in FIG. 5, i.e., the surface having concave portions of a circular shape in plan. Alternatively, the surface of the metal film 23 and thus the surface of the underlying interlayer insulating film 19 may have concave portions of a polygonal or elliptic shape in plan. The section of the concave portions may be of a polygonal shape, in place of the semi-circular shape as shown in FIG. 6.

EXAMPLE 3

In Example 3, a liquid crystal display device which employs a guest-host display method will be described.

Figure 7:
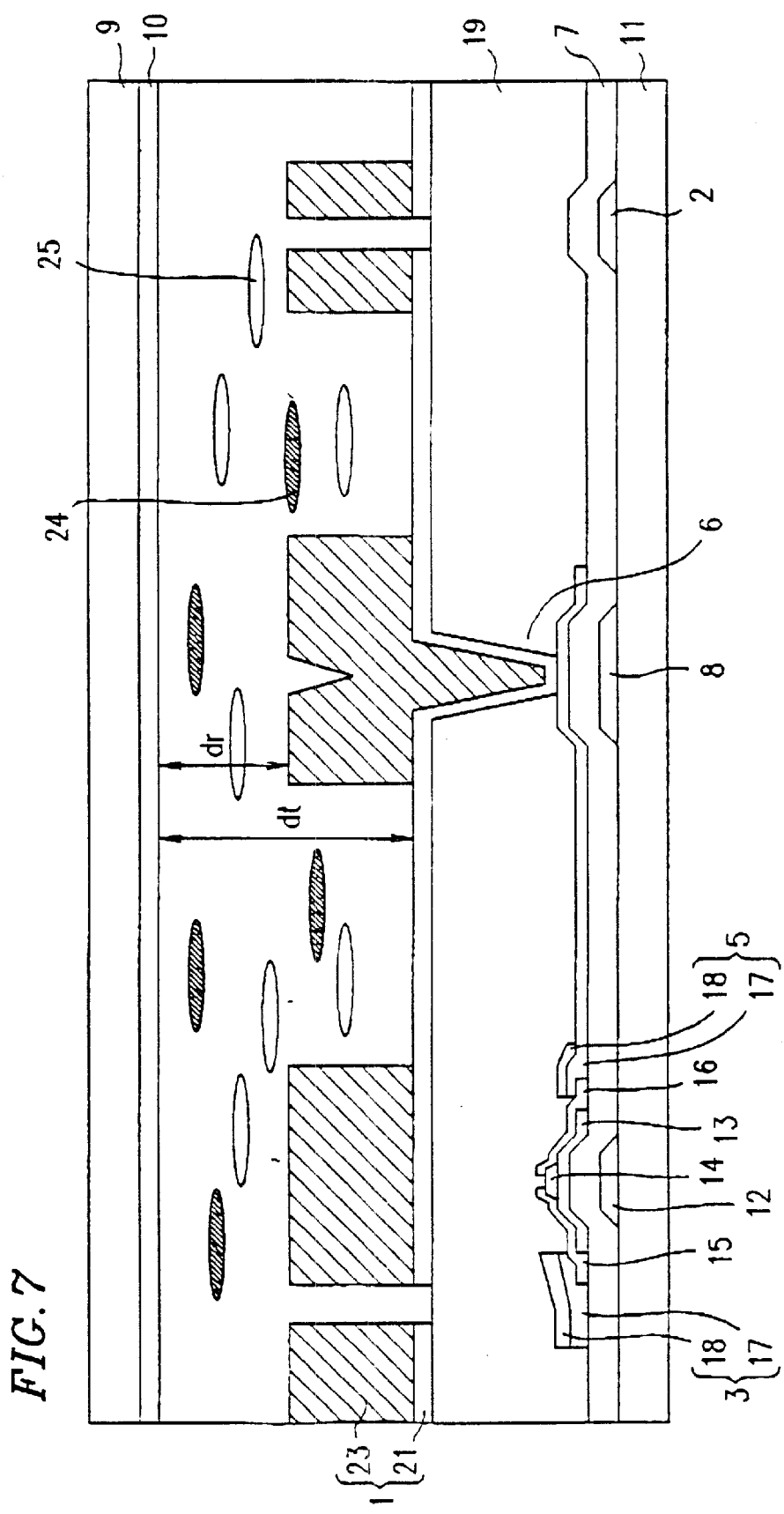
FIG. 7 is a sectional view of a liquid crystal display device according to Example 3 of the present invention.

FIG. 7 is a sectional view of a liquid crystal display device of this example according to the present invention. The same components as those of Example 1 are denoted by the same reference numerals as those in FIG. 2.

When the guest-host display method is employed using a mixture of a guest-host liquid crystal material, ZLI 2327 (manufactured by Merck & Co., Inc.) containing black pigments therein and 0.5% of an optically active substance, S-811 (manufactured by Merck & Co., Inc.), the following problem arises. That is, if the optical path length dt of transmitted light from the blacklight in the transmission region using the backlight is significantly different from the optical path length 2dr of reflected light from ambient light in the reflection region, the brightness and the contrast of the resultant display are significantly different between the case where light from the backlight is used and the case where ambient light is used even when the same voltage is applied to the liquid crystal layer.

Accordingly, the thickness dt of the portions of the liquid crystal layer located on the transparent conductive films 21 of the transmission regions and the thickness dr of the portions of the liquid crystal layer located on the metal films 23 of the reflection regions should be set to satisfy the relationship of dt=2dr. In this example, therefore, the thickness of the metal films 23 is changed to satisfy this relationship.

Thus, by equalizing the optical path length dt of transmitted light from the backlight in the transmission regions and the optical path length 2dr of reflected light from ambient light in the reflection region, with each other, substantially the same brightness and contrast can be obtained irrespective of which type of light is used (light from backlight or light from ambient light) so long as the same voltage is applied to the liquid crystal layer. In this way, a liquid crystal display device having better display characteristics is obtained.

The brightness and the contrast can be made uniform to some extent by approximating, not necessarily equalizing, the optical path length dt of transmitted light from the backlight in the transmission region and the optical path length 2dr of reflected light from ambient light in the reflection region.

The contrast can also be made uniform irrespective of which type of light is used (light from backlight or light from ambient light) by changing the driving voltage applied to the liquid crystal layer, even when the optical path length dt of transmitted light in the transmission region is significantly different from the optical path length 2dr of reflected light in the reflection region.

Thus, in the liquid crystal display devices in Examples 1 to 3 above, where the transmission mode display and the reflection mode display are realized using a single substrate, the regions which are conventionally blocked from light by the use of a black mask can be used as reflection electrode regions of the respective pixel electrodes. This allows for effective use of the display regions of the pixel electrodes of the liquid crystal panel, and thus increases the brightness of the liquid crystal display device.

In Examples 1 to 3, the storage capacitor electrode is provided for forming a storage capacitor with each pixel electrode via the insulating film, and the reflection electrode region of the pixel electrode overlies the storage capacitor electrode. Accordingly, the region where the storage capacitor electrode is formed can be utilized for display as a reflection electrode region of the pixel electrode.

The metal film of the reflection electrode region of each pixel electrode is formed on the transparent conductive film. By using a transparent conductive film having an uneven surface, the resultant reflection electrode region of the pixel electrode has an uneven surface, which makes it possible to utilize ambient light having various incident angles as display light.

The metal film of the reflection region of each pixel electrode may be formed on an interlayer insulating film having an uneven surface. The resultant reflection electrode region of the pixel electrode has an uneven surface, which makes it possible to utilize ambient light having various incident angles as display light.

The metal film of the reflection electrode region of each pixel electrode is made thicker than the transparent conductive film located in the transmission region of the pixel electrode. This make it possible to approximate the optical path length of ambient light which passes and returns through the portion of the liquid crystal layer located in the reflection electrode region of the pixel electrode and the optical path length of light from the backlight which passes through the portion of the liquid crystal layer located on the transmission electrode region of the pixel electrode and compare the path length to each other. By knowing the approximate optical path lengths, changes in the characteristics of light passing through the liquid crystal layer in the reflection region and the transmission region can be made uniform.

The thickness of the portion of the liquid crystal layer located on the reflection electrode region of each pixel electrode is made one half of the thickness of the portion of the liquid crystal layer located on the transmission electrode region thereof. This makes it possible to approximate the optical path length of ambient light which passes and returns through the portion of the liquid crystal layer located on the reflection electrode region of the pixel electrode and the optical path length of light from the backlight which passes through the portion of the liquid crystal layer located on the transmission electrode region of the pixel electrode and compare the path length to each other. By knowing the approximate optical path lengths, changes in the characteristics of light passing through the liquid crystal layer in the reflection region and the transmission region can be made uniform.

EXAMPLE 4

Figure 8A:
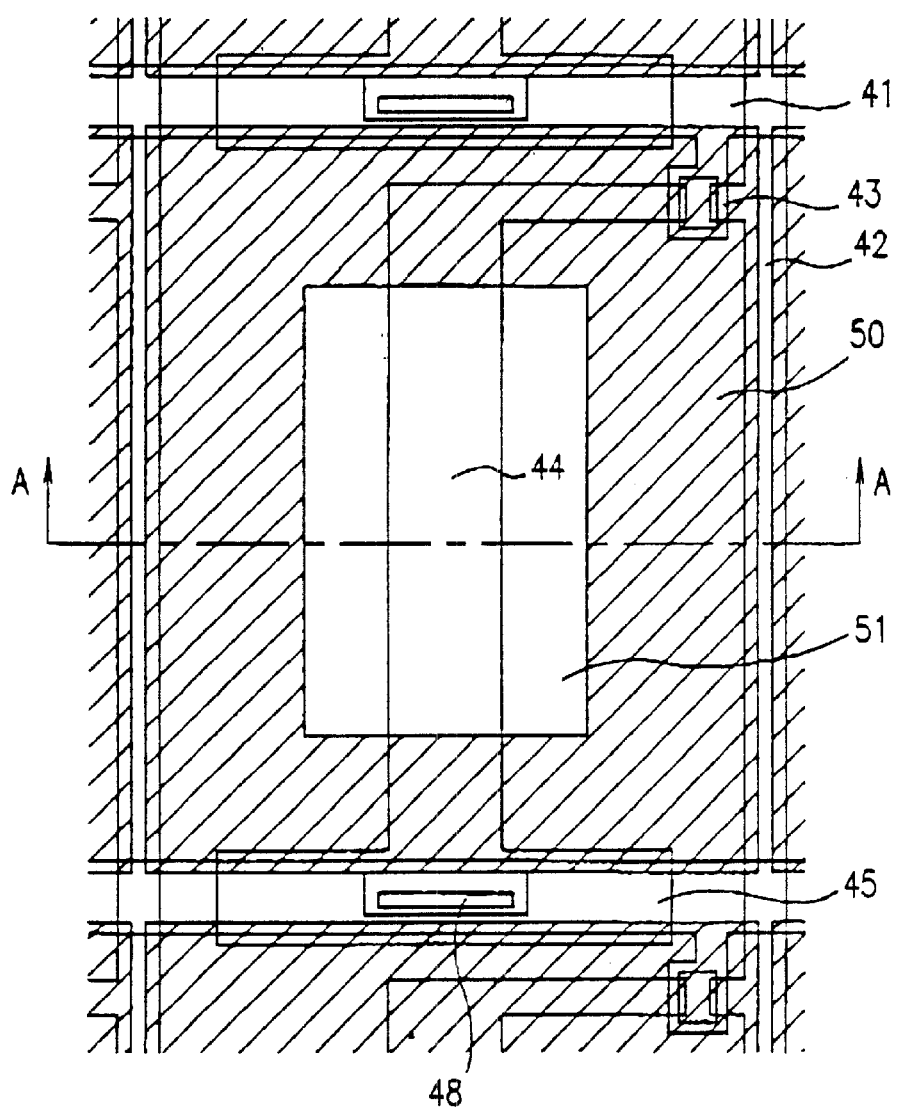
FIG. 8 is a plan view of an active matrix substrate of a liquid crystal display device according to Example 4 of the present invention.
FIG. 8B is a sectional view taken along line A—A of FIG. 8A.
Figure 8B:
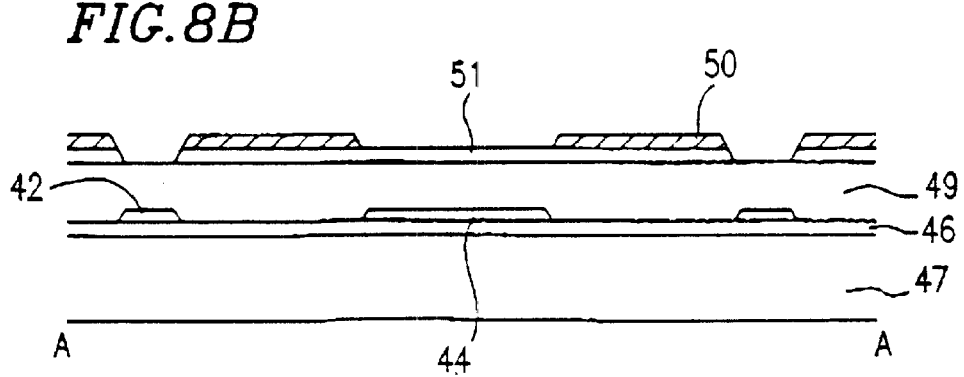

FIG. 8A is a plan view of one pixel portion of an active matrix substrate of a liquid crystal display device of Example 4 according to the present invention. FIG. 8B is a sectional view taken along line A—A of FIG. 8A.

The active matrix substrate of this example includes gate lines 41, data lines 42, driving elements 43, drain electrodes 44, storage capacitor electrodes 45, a gate insulating film 46, an insulating substrate 47, contact holes 48, an interlayer insulating film 49, reflection pixel electrodes 50, and transmission pixel electrodes 51.

Each of the storage capacitor electrodes 45 is electrically connected to the corresponding drain electrode 44 and overlaps the corresponding gate line 41 via the gate insulating film 46. The contact holes 48 are formed through the interlayer insulating film 49 to connect the transmission pixel electrodes 51 and the storage capacitor electrodes 45.

Each pixel of the active matrix substrate with the above construction includes a reflection pixel electrode 50 and a transmission pixel electrode 51. Thus, as shown in FIG. 8B, each pixel is composed of the reflection electrode region, including the reflection pixel electrode 50, which reflects light from outside, and the transmission electrode region, including the transmission pixel electrode 51, which transmits light from a backlight.

FIG. 9 is a sectional view of a liquid crystal display device of this example including the active matrix substrate shown in FIGS. 8A and 8B. The liquid crystal display device also includes a color filter layer 53, a counter electrode 54, a liquid crystal layer 55, alignment films 56, a polarizing plate 57, and a backlight 58.

The regions of the transmission pixel electrodes 51 (transmission electrode region) which transmit light from the backlight 58 do not contribute to the brightness of the panel when the backlight 58 is off. Conversely, the regions of the reflection pixel electrodes 50 (reflection electrode region) which reflect light from outside contribute to the brightness of the panel regardless of the ON/OFF state of the backlight 58. In each pixel, therefore, the area of the reflection electrode region is desirably larger than the area of the transmission electrode region.

In this example, the reflection pixel electrode 50 is formed on the corresponding transmission pixel electrode 51 so as to be electrically connected to each other so that the same signals are input into the reflection pixel electrode 50 and the transmission pixel electrode 51. Alternatively, the reflection pixel electrode 50 and the transmission pixel electrode 51 may not be electrically connected to each other so as to receive different signals for different displays.

In the liquid crystal display device shown in FIG. 9, part of the light from the backlight 58 incident on the reflection pixel electrode 50 is not usable as display light. In order to overcome this problem, a modified liquid crystal display device shown in FIG. 10 includes a microlens 59 and a microlens protection layer 60 for each pixel. With this construction, light from the backlight 58 is converged on the transmission electrode region on which the reflection pixel electrode 50 is not formed, via the microlens 59, to increase the amount of light which passes through transmission region and thus to improve the brightness of display.

Figure 11A:
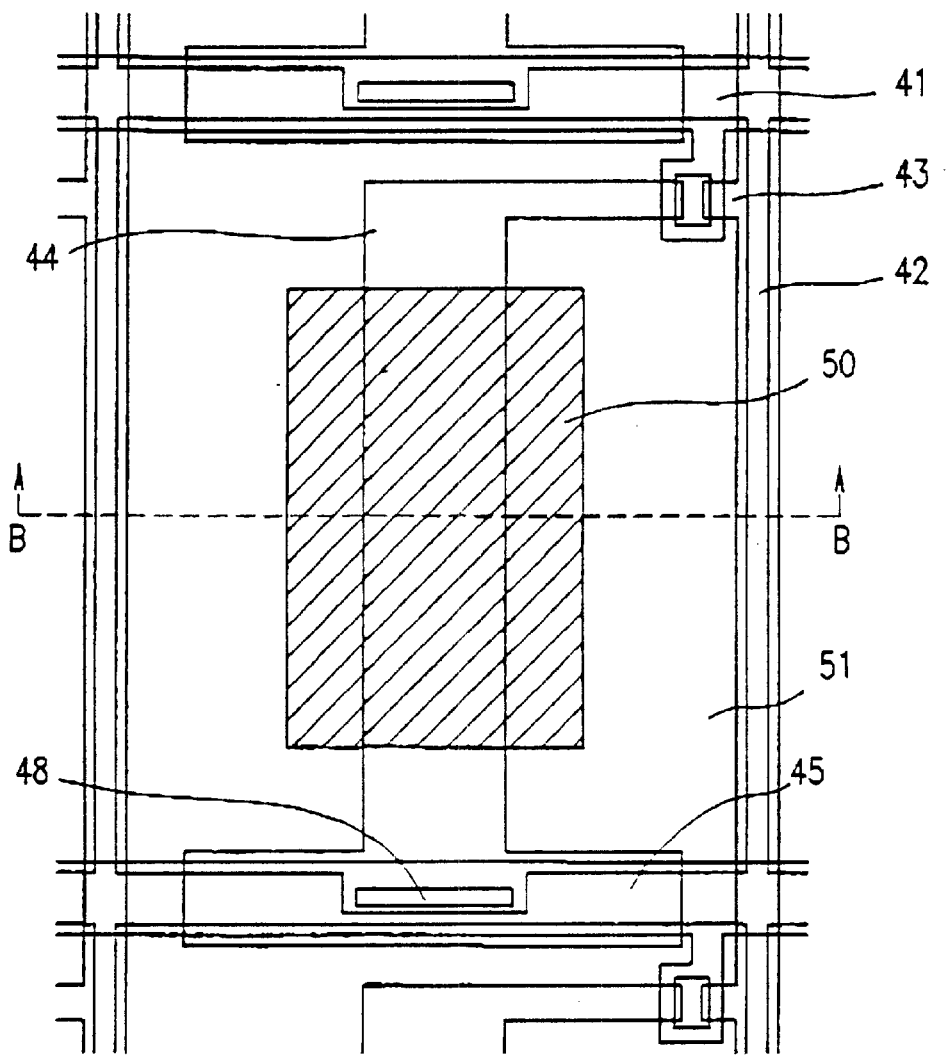
FIG. 11A is a plan view of an alternative embodiment of the active matrix substrate of the liquid crystal display device according to Example 4 of the present invention.
Figure 11B:
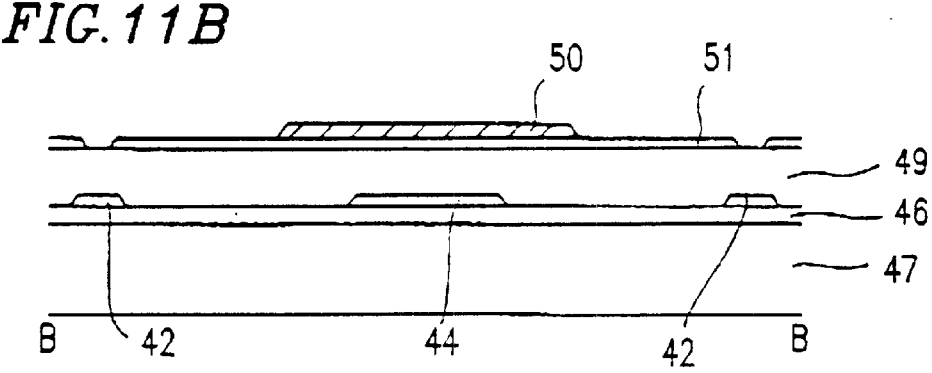
FIG. 11B is a sectional view taken along line B—B of FIG. 11A.

FIG. 11A is a plan view of one pixel portion of an alternative active matrix substrate of the liquid crystal display device of Example 4 according to the present invention. FIG. 11B is a sectional view taken along line B—B of FIG. 11A.

In the active matrix substrate shown in FIGS. 11A and 11D, the region of the transmission pixel electrode 51 and the region of the reflection pixel electrode 50 of each pixel are reversed from those of the active matrix substrate shown in FIGS. 8A and 8B. The ratio of the areas of the region of the reflection pixel electrode 50 and the region of the transmission pixel electrode 51 may be changed appropriately.

When the active matrix substrate shown in FIGS. 8A and 8B and that shown in FIGS. 11A and 11B are compared, the active matrix substrate shown in FIGS. 8A and 8B is advantageous in the points that light from outside is prevented from entering the driving element 43 since the reflection pixel electrode 50 is formed over the driving element 43 and that the formation of the microlens 59 for converging light is easier since the region of the transmission pixel electrode 51 is located in the center of each pixel.

In this example, since the light reflection region and the light transmission region are formed in one pixel, the aperture ratio of the pixel is as large as possible. To satisfy this, a high aperture structure is adopted in this example where the interlayer insulating film 49, composed of an organic insulating film, is interposed between the pixel electrodes and the levels of the gate lines 41 and the source lines 43. Other structures may also be adopted.

EXAMPLE 5

Figure 12A:
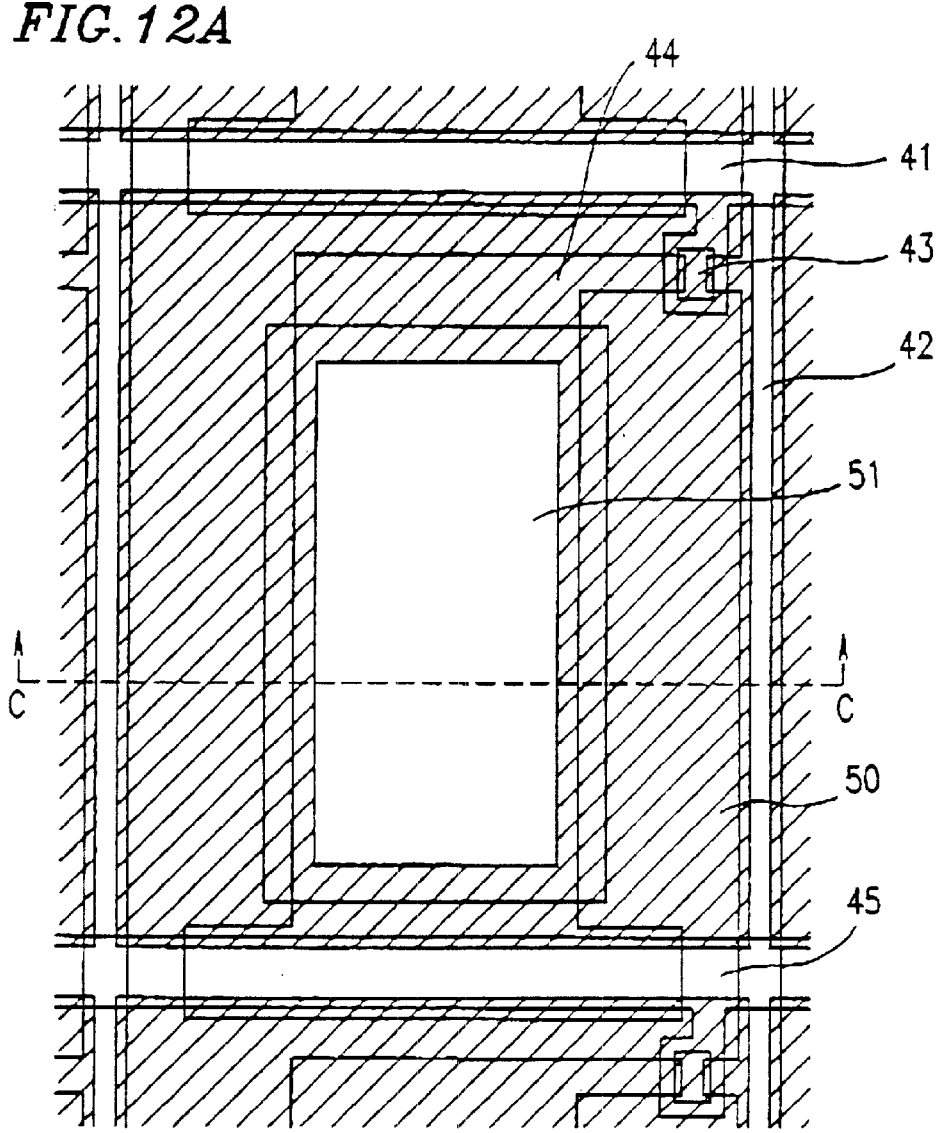
FIG. 12A is a plan view of an active matrix substrate of a liquid crystal display device according to Example 5 of the present invention.
Figure 12B:
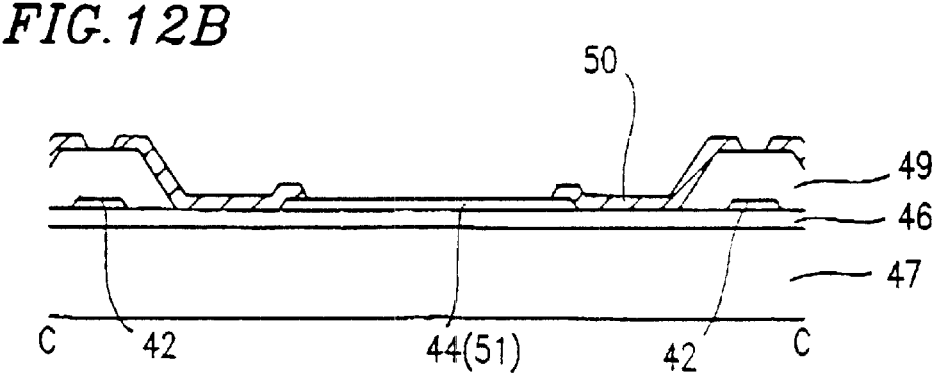
FIG. 12B is a sectional view taken along line C—C of FIG. 12A.

FIG. 12A is a plan view of one pixel portion of an active matrix substrate of a liquid crystal display device of Example 5 according to the present invention. FIG. 12B is a sectional view taken along line C—C of FIG. 12A.

In the active matrix liquid crystal display device of Example 5, reflection pixel electrodes 50 are formed on tilted or concave and convex portions of an interlayer insulating film 49. Light from outside is therefore reflected from the reflection pixel electrodes 50 in a wider range of directions, so that the angle of visibility becomes wider.

The interlayer insulating film 49 in this example is formed so as to be thickest at portions located above gate lines 41 and source lines 42 and be completely etched away at portions located above drain electrodes 44, forming the tilted or concave and convex portions. This eliminates the necessity of forming contact holes for electrically connecting the drain electrodes 44 and the reflection pixel electrodes 50, and thus prevents a disturbance in the orientation of liquid crystal molecules from occurring due to sharp steps at contact holes. This contributes to an increase in the aperture ratio.

In this example, the drain electrodes 44, which are transparent electrodes made of ITO, serve as the transmission pixel electrodes 51.

The tilt angle of the tilted portions or the pitch of the concave and convex portions of the interlayer insulating film 49 should be sufficiently small so that an alignment film can be formed on the resultant substrate and rubbed. Thus, optimal conditions should be determined depending on the respective rubbing conditions and the types of liquid crystal molecules.

In this example, as in Example 4, microlenses may be provided below the drain electrodes 44 as the transmission pixel electrodes 51, to improve the brightness of the display when the backlight is on.

EXAMPLE 6

Figure 13A:
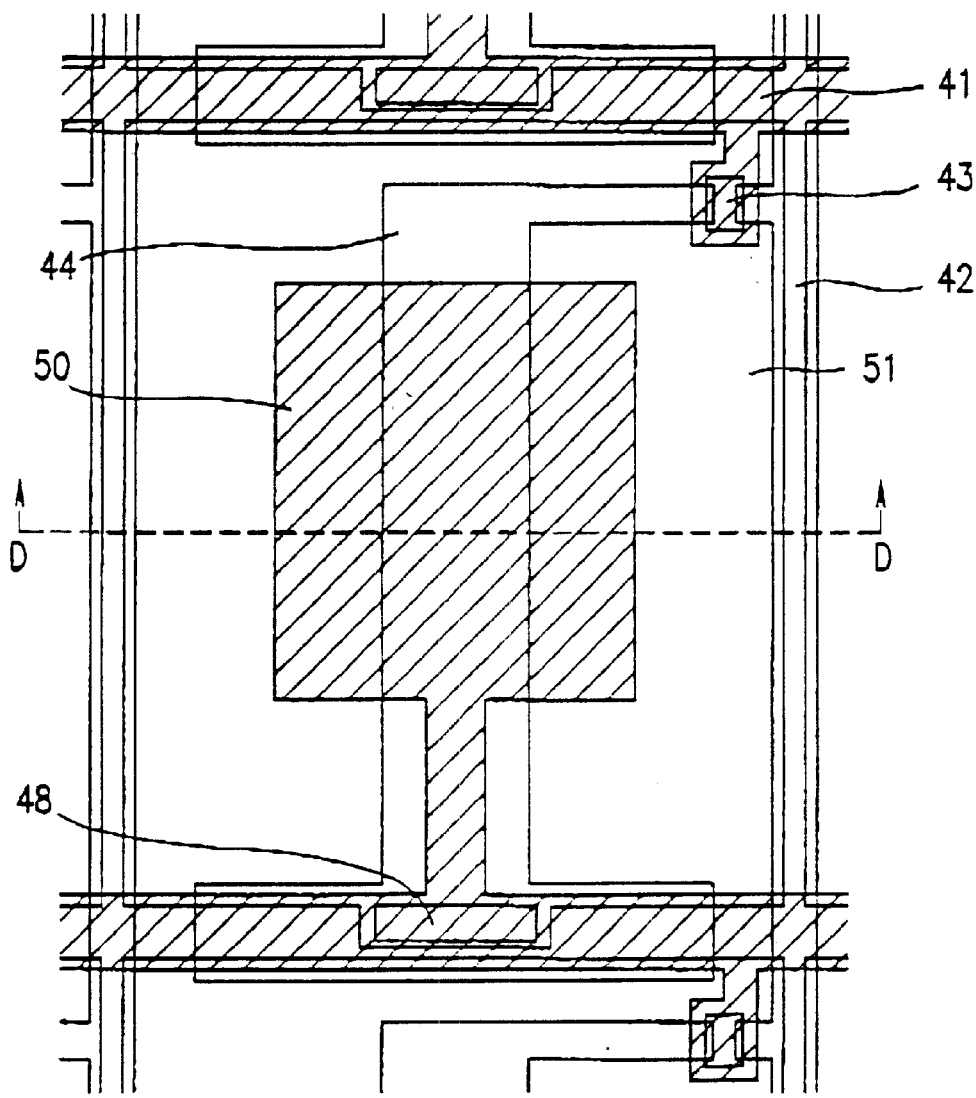
FIG. 13A is a plan view of an active matrix substrate of a liquid crystal display device according to Example 6 of the present invention.
Figure 13B:
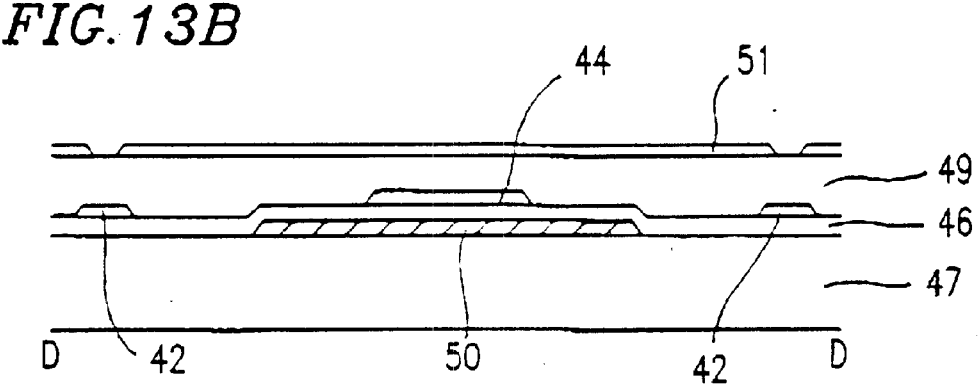
FIG. 13B is a sectional view taken along line D—D of FIG. 13A.

FIG. 13A is a plan view of one pixel portion of an active matrix substrate of a liquid crystal display device of Example 6 according to the present invention. FIG. 13B is a sectional view taken along line D—D of FIG. 13A.

In this example, reflection pixel electrodes 50 are formed at the same level as gate lines 41 at and during the same step. With this configuration, since a separate step for forming the reflection pixel electrodes 50 is not required, the number of steps and the production cost do not increase.

In this example, the reflection pixel electrodes 50 are not connected to drain electrodes 44 constituting driving elements 43, but are used only for the reflection of light from outside. Only the transmission pixel electrodes 51 serve as the electrodes for driving the liquid crystal. In other words, the transmittance of light reflected by the reflection pixel electrodes 50 is controlled by controlling the liquid crystal layer with a voltage at the transmission pixel electrodes 51.

If no signal is input into each of the reflection pixel electrodes 50, a floating capacitance is generated between the reflection pixel electrode 50 and the corresponding drain electrode 44 or transmission pixel electrode 51. To avoid this problem, the reflection pixel electrodes 50 should desirably be provided with such a signal that does not adversely affect the display. By connecting each of the reflection pixel electrodes 50 with an adjacent gate line 41, the generation of a floating capacitance is prevented, and a storage capacitor can be formed between a reflection pixel electrode 50 and a corresponding drain electrode 44.

In this example, as in Example 4, microlenses may be provided to converge light on the transmission pixel electrodes, to improve the brightness of display when the backlight is on.

In this example, also, since the light reflection region and the light transmission region are formed in one pixel, the aperture ratio of the pixel is as large as possible. To satisfy this, a high aperture structure is adopted where an organic insulating film is used as the interlayer insulating film. Other structures may also be adopted.

EXAMPLE 7

Figure 14A:
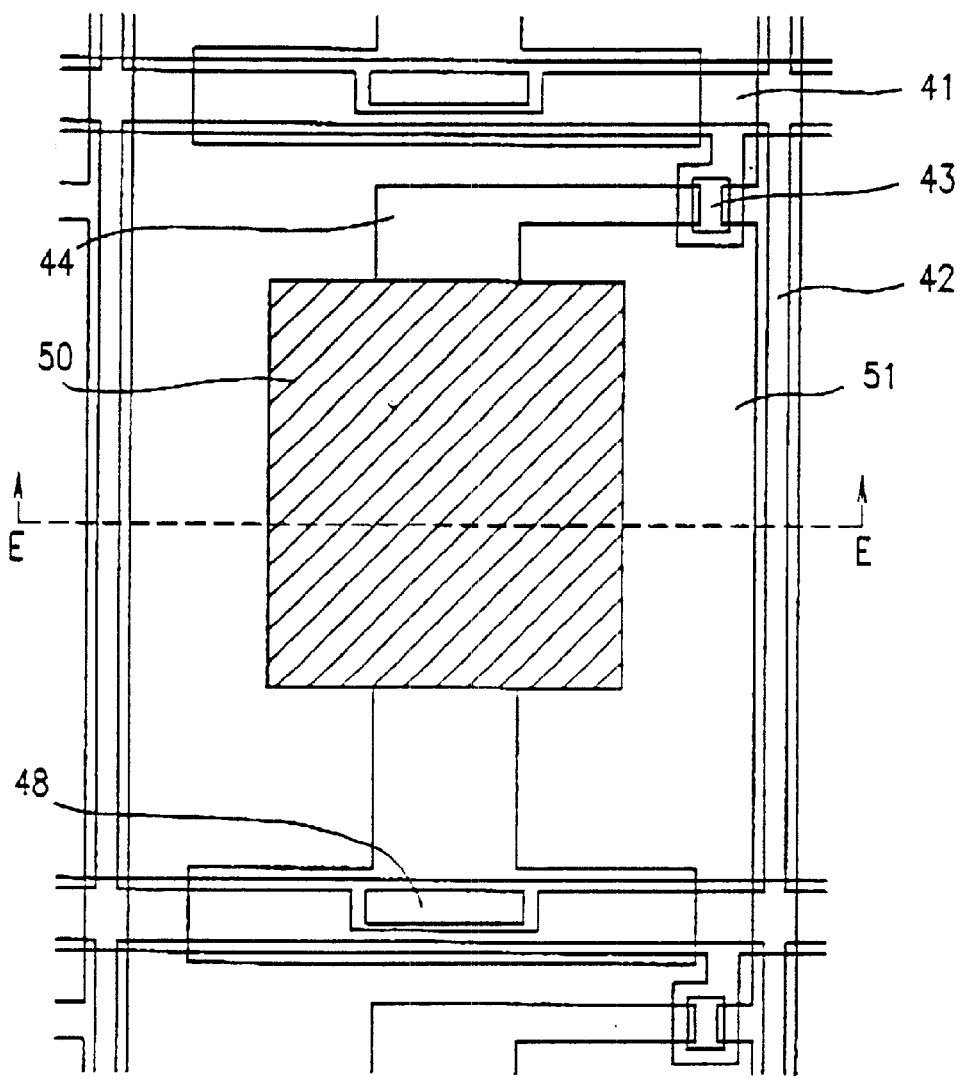
FIG. 14A is a plan view of an active matrix substrate of a liquid crystal display device according to Example 7 of the present invention.
Figure 14B:
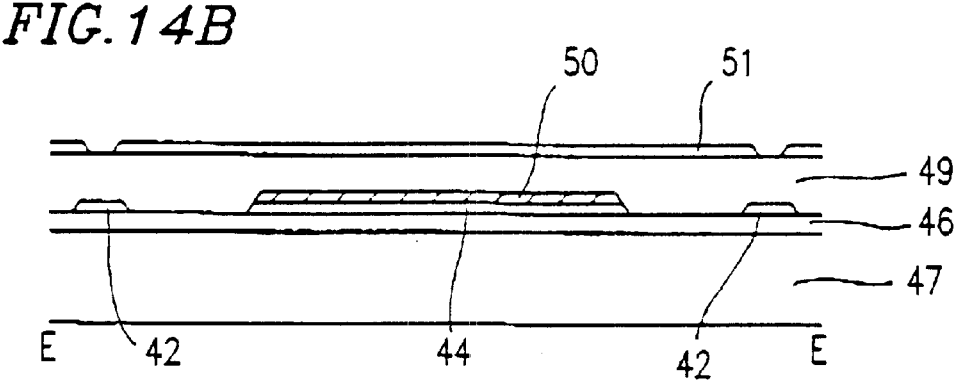
FIG. 14B is a sectional view taken along line E—E of FIG. 14A.

FIG. 14A is a plan view of one pixel portion of an active matrix substrate of a liquid crystal display device of Example 7 according to the present invention. FIG. 14B is a sectional view taken along line E—E of FIG. 14A.

In this example, reflection pixel electrodes 50 are formed at the same level as source lines 42. With this configuration, since the reflection pixel electrodes 50 can be formed at the formation of the source lines 42, the number of steps and the production cost do not increase.

In this example, since a high aperture structure via an interlayer insulating film 49 is adopted, the reflection pixel electrodes 50 are used only for the reflection of light from outside. Only transmission pixel electrodes 51 serve as the electrodes for driving the liquid crystal.

This example is different from Example 6 in that in this example the reflection pixel electrode 50 in each pixel is electrically connected to the corresponding drain electrode 44. In an alternative case where the interlayer insulating film 49 is not formed at the region above the drain electrode 44 and the drain electrode 44 is used as the transmission pixel electrode, the reflection pixel electrode 50 also contributes to the driving of the liquid crystal molecules.

In this example, as in Example 4, microlenses may be provided to converge light on the transmission pixel electrodes 51, to improve the brightness of display when the backlight is on.

In this example, also, since the light reflection region and the light transmission region are formed in one pixel, the aperture ratio of the pixel is as large as possible. To satisfy this, a high aperture structure is adopted where an organic insulating film is used as the interlayer insulating film. Other structures may also be adopted.

Thus, in Examples 4 to 7 above according to the present invention, the active matrix liquid crystal display device capable of switching between the reflection type and the transmission type is realized.

Such a liquid crystal display device can provide a sufficient brightness irrespective of the conditions of use, while realizing a reduced power consumption and a prolonged use duration, by the user's switching the mode between the transmission type and the reflection type depending on the use conditions.

Also realized is a transmission/reflection switchable active matrix liquid crystal display device which can be used as a reflection type liquid crystal display device when the environment is bright and as a transmission type liquid crystal display device when the environment is dark.

Since the reflection pixel electrodes and the transmission pixel electrodes are electrically connected with each other, no interconnect is required to supply the driving signals independently. This simplifies the construction of the active matrix substrate.

When the reflection pixel electrodes are formed above the driving elements, light from outside is prevented from entering the driving elements.

The transmission pixel electrodes do not contribute to the brightness of the panel when the backlight is off, while the reflection pixel electrodes contribute to the brightness of the panel regardless of the ON/OFF state of the backlight. Accordingly, by increasing the area of the reflection pixel electrodes, the brightness of display can be stabilized even when the backlight is off or emits less light.

Light from the backlight which is blocked by the reflection pixel electrodes, the gate lines, and the like can be converged on the transmission pixel electrodes. This makes it possible to increase the brightness of the display device without increasing the brightness of the backlight itself.

The reflection pixel electrodes can be made to reflect light from outside in a wide range of directions. This allows for a wider angle of visibility.

The reflection pixel electrodes may be formed without an additional step for this formation. This prevents the number of steps and the production cost from increasing.

The reflection pixel electrodes may be electrically connected to the gate lines. This prevents the generation of a floating capacitance and allows for the formation of a storage capacitor with the drain electrodes.

The reflection pixel electrodes may be provided with the same signals as those applied to the counter electrode. This prevents the generation of a floating capacitance. Also, the reflection pixel electrodes may be used for the formation of a storage capacitor for the voltage applied to the pixel electrodes.

EXAMPLE 8

In Example 8, a reflection/transmission type liquid crystal display device according to the present invention will be described.

First, the principle of the generation of an interference color in the liquid crystal display device of Example 8 will be described.

Figure 23:
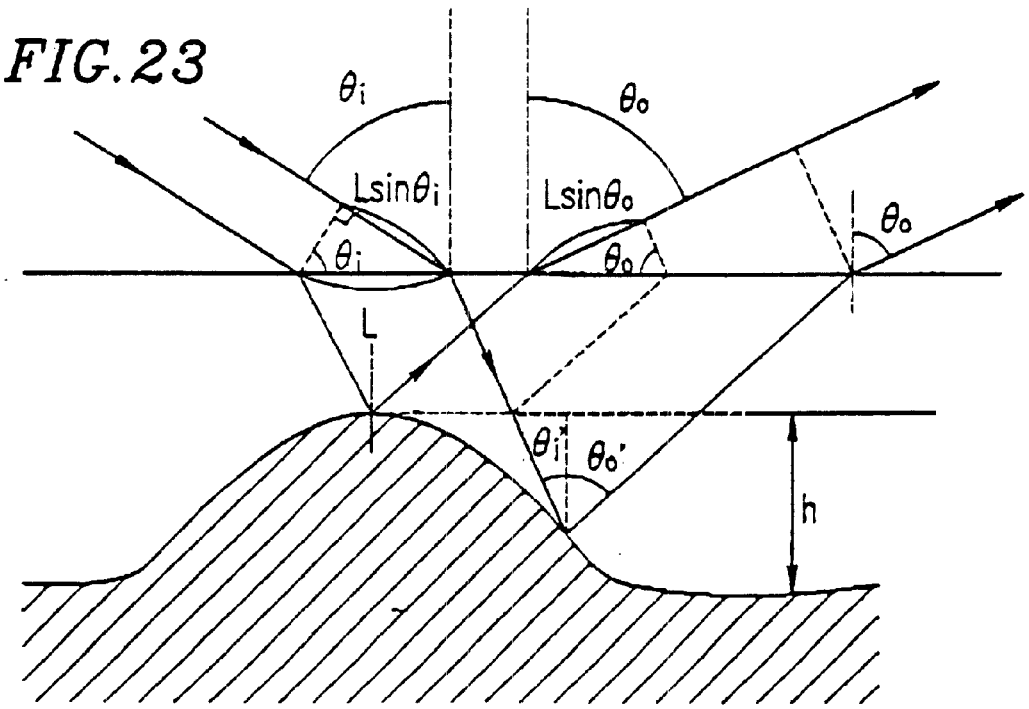
FIG. 23 is a conceptual view illustrating the generation of interference light.

FIG. 23 is a conceptual view illustrating the generation of an interference color. Light is incident on a glass substrate and the incident light is reflected by a reflection film to be output from the glass substrate.

In the above case, an interference color is considered to be generated when light incident at an incident angle $\theta i$ is reflected from a convex portion and a concave portion of the reflection film and output at an output angle $\theta o$. The optical path difference $\delta$ between the two reflected light beams is represented by expression (1) below:

$$\delta = L\sin\theta i + h(1/\cos\theta i' + 1/\cos\theta o') \cdot n - \{L\sin\theta o + h(\tan\theta i' + \tan\theta o')\sin\theta o\}$$
$$= L(\sin\theta i - \sin\theta o) + h\{(1/\cos\theta i' + 1/\cos\theta o') \cdot n - (\tan\theta i' + \tan\theta o')\sin\theta o\} \quad (1)$$

wherein $\theta i'$ is the incident angle at the concave portion of the reflection film, $\theta o'$ is the output angle at the concave portion of the reflection film, L is the distance between the incident points of the two light beams on the glass substrate, h is the height of the point on the convex portion of the reflection film from which one of the light beams is reflected, with respect to the point on the concave portion thereof from which the other light beam is reflected, and n is the refractive index of the glass substrate.

Since the calculation of expression (1) is possible only when $\theta i = \theta o$ and $\theta i' = \theta o'$, the optical path difference $\delta$ is simplified into expression (2) below when $\theta i = \theta o = \theta$ and $\theta i' = \theta o' = \theta'$.

$$\delta = h\{2n/\cos\theta' - 2\tan\theta' \cdot \sin\theta\} \quad (2)$$

When arbitrary wavelengths $\lambda 1$ and $\lambda 2$ are taken into consideration, the output light beams reflected from the convex portion and the concave portion are weakened by each other when $\delta/\lambda 1 = m \pm 1/2$ (m is an integer) and intensified by each other when $\delta/\lambda 2 = m$. Thus, expression (3) below is established.

$$\delta = (1/\lambda 1 - 1/\lambda 2) = 1/2 \quad (3)$$

Expression (3) above is also represented by expression (4) below:

$$\delta = (\lambda 1 \cdot \lambda 2)/2 \cdot (\lambda 2 - \lambda 1) \quad (4)$$

Accordingly, from expressions (2) and (4) above, the height h can be represented by expression (5) below:

$$h = 1/2 \cdot \{(\lambda 1 \cdot \lambda 2)/(\lambda 2 - \lambda 1)\} \cdot \{\cos\theta'/(2n - 2\sin\theta' \cdot \sin\theta)\} \quad (5)$$

From the above, it has been found that, in order to eliminate the generation of an interference color, the reflection surface of the reflection film should have a continuous wave shape.

In this example, in order to form such a reflection film, at least two types of convex portions with different heights are formed on a base plate, a polymer resin film is formed on the base plate covering the convex portions, and a reflection thin film made of a material having a high light reflection efficiency is formed on the polymer resin film.

The thus-fabricated reflection thin film can be used for the reflection portions of the reflection/transmission type liquid crystal display device. Since such reflection portions have a reflection surface of a continuous wave shape, light reflected from the reflection portions is prevented from generating an interference. When the convex portions are optically formed by use of a photomask, they can be formed with good reproducibility by setting the same light irradiation conditions.

In the reflection/transmission type liquid crystal display device of this example, the convex portions are preferably not formed in the transmission portions made of a material having a high light transmission efficiency in order to improve the transmission efficiency. However, the display by use of transmitted light is possible even if the convex portions are formed in the transmission portions.

Figure 15:
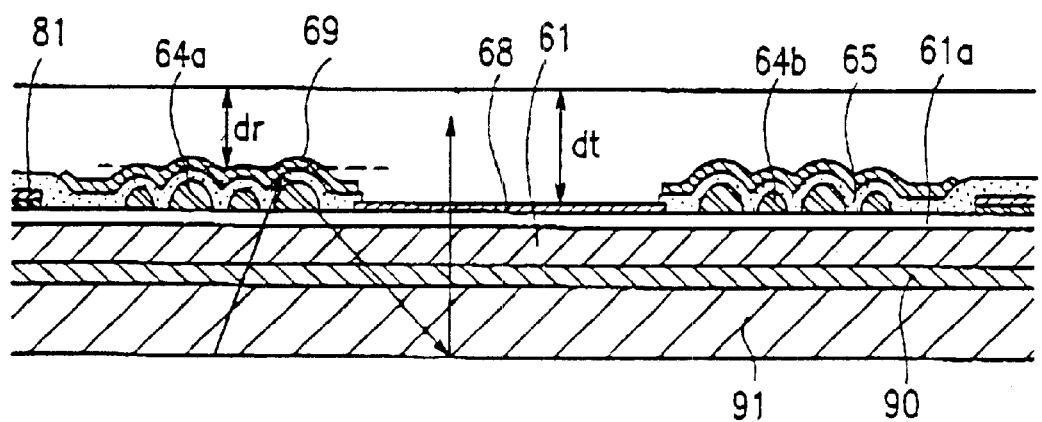
FIG. 15 is a sectional view for explaining a reflection/transmission type liquid crystal display device according to Example 8 of the present invention.

FIG. 15 is a sectional view of a reflection/transmission type liquid crystal display device of this example according to the present invention.

Referring to FIG. 15, a gate insulating film 61a is formed on a glass substrate 61. High convex portions 64a and low convex portions 64b are formed randomly on the portions of the glass substrate 61 located below reflection electrodes 69 having a light reflection function. The high convex portions 64a and the low convex portions 64b are covered with a polymer resin film 65.

Since the high convex portions 64a and the low convex portions 64b are formed on the glass substrate 61 via the gate insulating film 61a, the upper surfaces of the portions of the polymer resin film 65 formed on the high convex portions 64a and the low convex portions 64b are of a continuous wave shape. The polymer resin film 65 is formed almost all over the glass substrate 61, not only in the regions below the reflection electrodes 69.

The reflection electrodes 69, which are made of a material having a light reflection function, are formed on the portions of the polymer resin film 65 having the continuous wave shape which are formed on the high convex portions 64a and the low convex portions 64b.

Transmission electrodes 68 are also formed on the glass substrate 61 via the gate insulting film 61a, separately from the reflection electrodes 69. The transmission electrodes 68 are made of a material having a light transmission function, such as indium tin oxide (ITO).

A polarizing plate 90 is attached to the back surface of the thus-fabricated active matrix substrate when it is mounted as a module. A backlight 91 is then disposed on the polarizing plate 90.

Part of light emitted form the backlight 91 and directed to the transmission electrodes 68 passes through the transmission electrodes 68 and thus the active matrix substrate. However, part of light directed to the reflection electrodes 69 is reflected from the back surfaces of the reflection electrodes 69 to return to the backlight 91. Since the back surfaces of the reflection electrodes 69 are of a continuous wave shape, light reflected from the reflection electrodes 69 is scattered as shown by the arrows in FIG. 15. Such scattered light is again reflected from the backlight 91 toward the active matrix substrate. Part of such light passes through the transmission electrodes 68 and thus the active matrix substrate.

Thus, in the active matrix substrate including the reflection electrodes 69 of the above-described shape, the light from the backlight reflected by the reflection electrodes 69 can be used for display. This allows for more effective use of light than that expected from an actual aperture ratio, unlike the conventional transmission type liquid crystal display device. Specifically, if the reflection electrodes are of a flat shape, regular reflection is mainly generated, which is difficult to be reflected again to pass through the transmission electrodes 68. In this example, however, the reflection electrodes 69 of a continuous wave shape serve to return the reflected light toward the portions of the backlight located below the transmission electrodes 68, allowing for further effective use of light.

Figure 16:
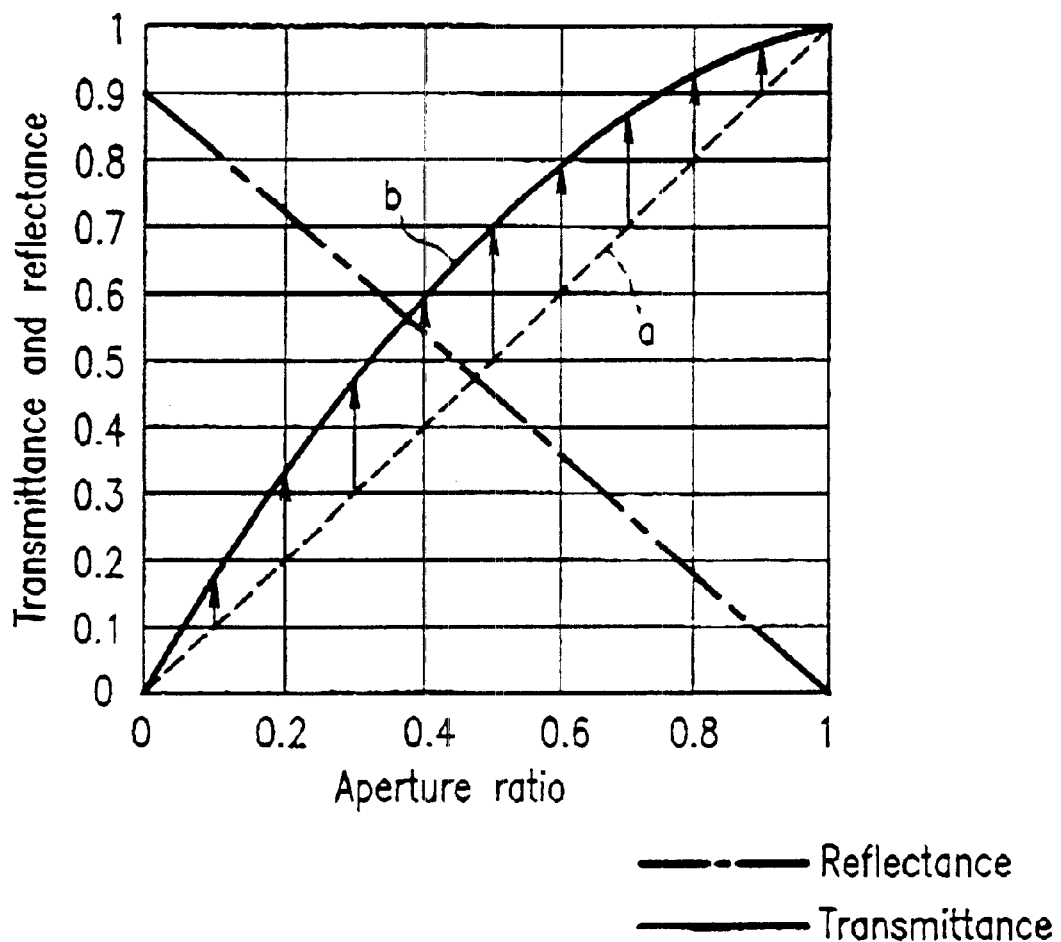
FIG. 16 is a graph showing the relationship of the aperture ratio with the transmittance and reflectance of the reflection/transmission type liquid crystal display device of Example 8.

FIG. 16 is a graph showing the relationship of the aperture ratio to the transmittance and reflectance observed when the reflectances of the reflection electrodes 69 and the backlight 91 as compared with the standard white plate are about 90%, and the transmittance of the polarizing plate 90 is about 40%. Note that this relationship was calculated on the assumption that pixel electrodes cover the entire display surface, not considering the existence of bus lines and active elements.

As is observed from FIG. 16, the reflectance of the reflection electrode 69 for light incident from outside on the side of a counter substrate is obtained by multiplying the reflectance of the reflection electrode 69 by the ratio of the area of the reflection electrode 69 to the area of the entire pixel electrode. The transmittance of the transmission electrode 68 for light from the backlight 91 is equal to, not just the aperture ratio a (i,e., the ratio of the area of the transparent electrode 68 to the area of the entire pixel electrode), but a value b, including a component of light from the backlight reflected by the reflection electrode 69, which can be utilized for display added to the aperture ratio a.

Thus, since the light from the backlight 91 reflected by the reflection electrodes 69 is also utilized, more effective use of light than that expected from the actual aperture ratio is possible, unlike the conventional transmission type liquid crystal display device.

Figure 17:
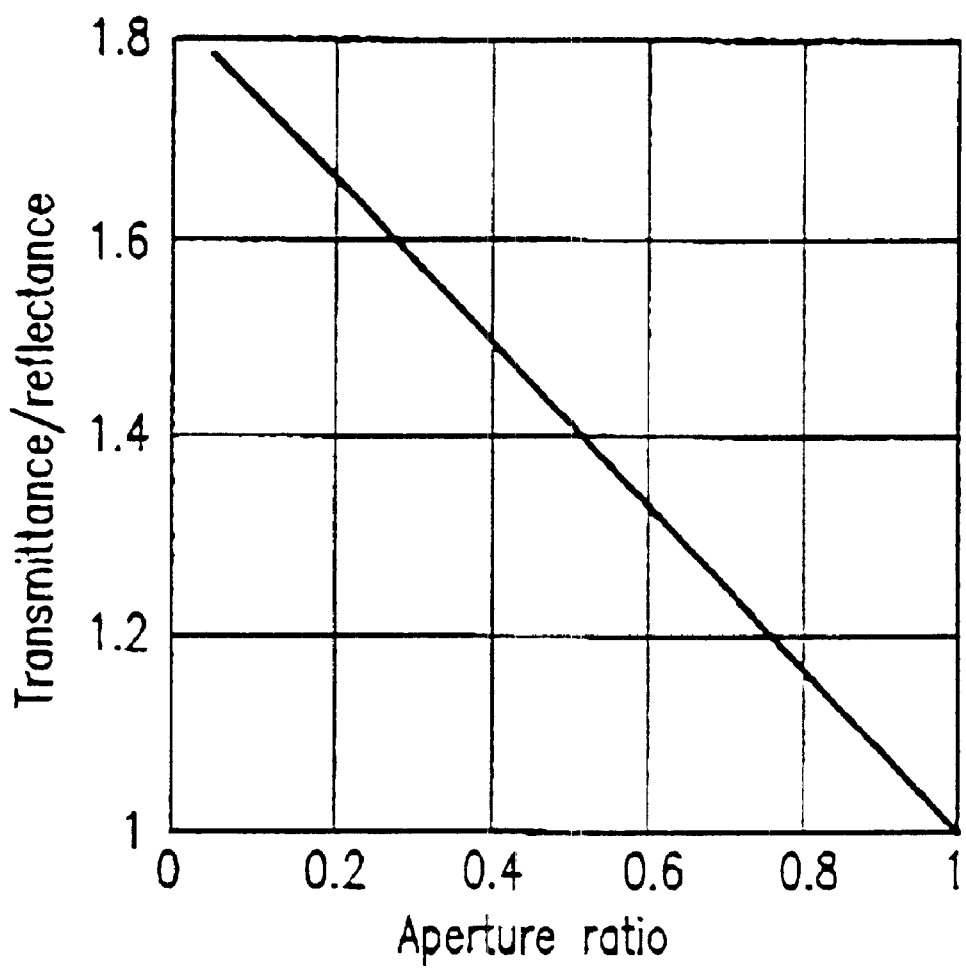
FIG. 17 is a graph showing the relationship between the aperture ratio and the light transmission efficiency of the reflection/transmission type liquid crystal display device of Example 8.

FIG. 17 is a graph showing the relationship between the aperture ratio and the light transmission efficiency (transmittance/aperture ratio). As is observed from FIG. 17, it has been found from such a calculation that, when the aperture ratio is 40%, the light from the backlight 91 reflected by the reflection electrode 69 can be utilized up to about 50% of the intensity of the light which has directly passed through the transmission electrode 68 from the backlight 91. From the calculation results shown in FIG. 17, it has also been found that the greater the ratio of the area of the reflection electrode 69 to the area of the entire pixel electrode is, the higher the use efficiency of the light reflected by the reflection electrode 69 becomes.

Hereinbelow, a specific example of the reflection/transmission type liquid crystal display device of Example 8 will be described.

Figure 18:
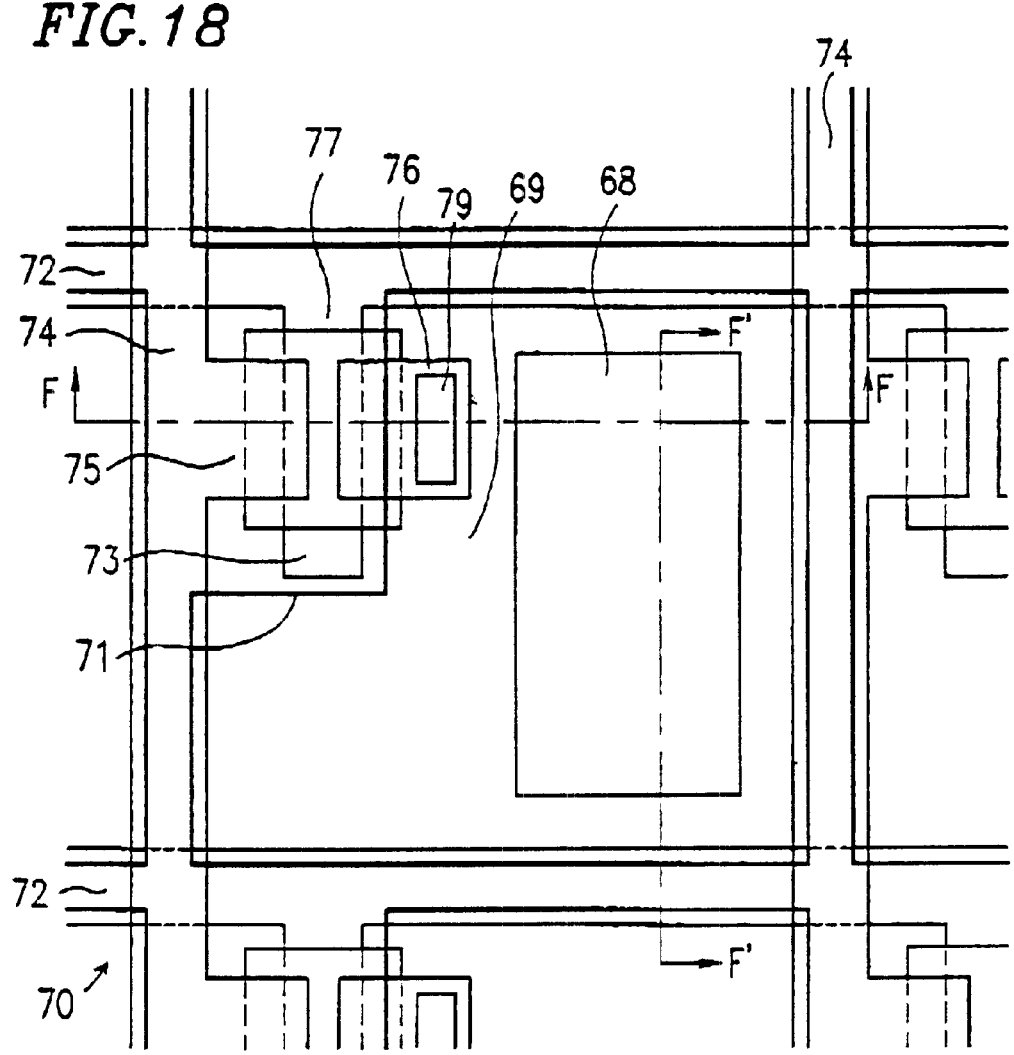
FIG. 18 is a plan view of a reflection/transmission type liquid crystal display device according to Example 8 of the present invention.

FIG. 18 is a plan view of the reflection/transmission type liquid crystal display device of Example 8 according to the present invention. FIGS. 19A to 19F are sectional views taken along line F—F of FIG. 18, illustrating the process of fabricating the liquid crystal display device of this example.

Figure 19E:
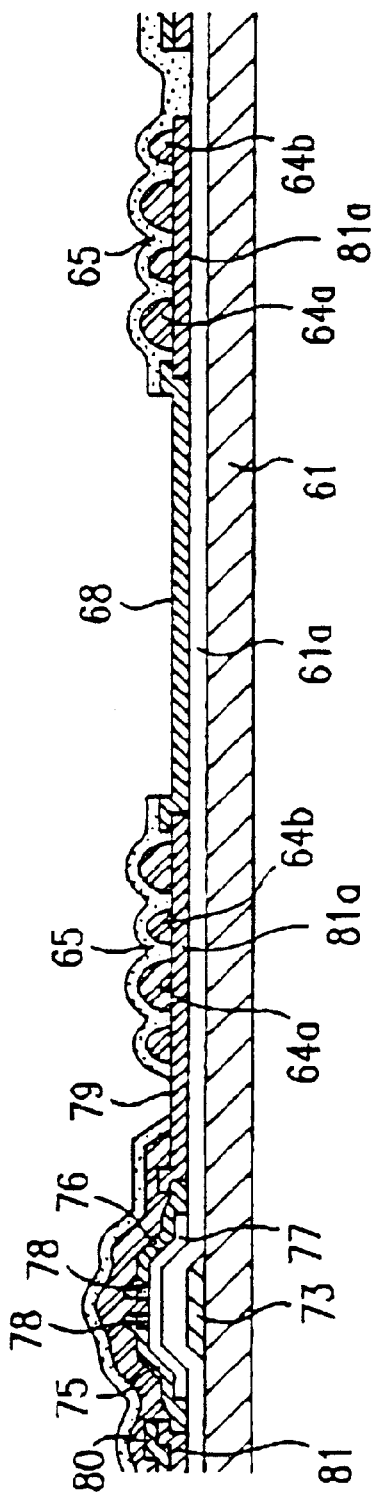
Figure 19F:
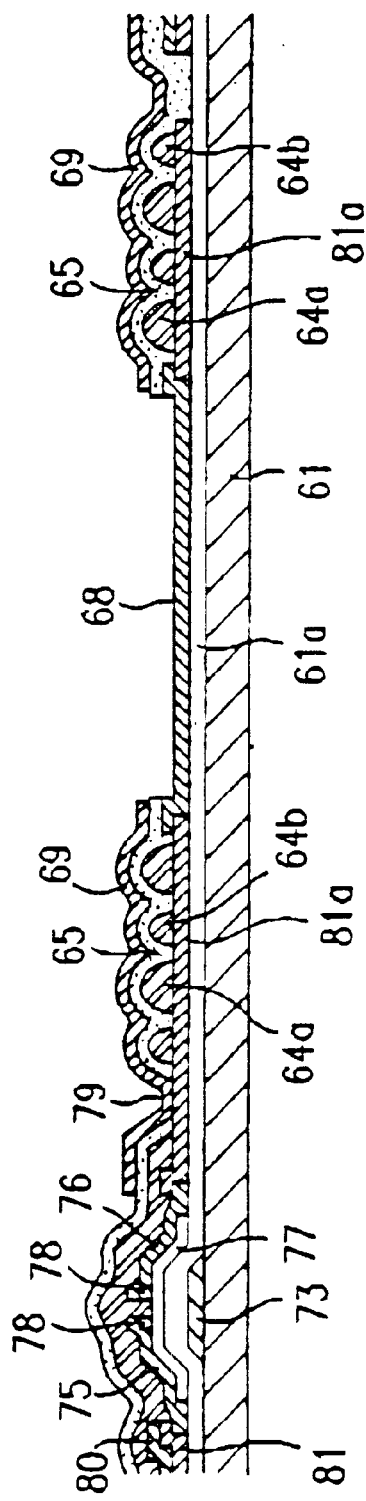

Referring to FIGS. 18 and 19F, an active matrix substrate 70 of the reflection/transmission type liquid crystal display device includes a plurality of gate bus lines 72, as scanning lines, and a plurality of source bus lines 74, as signal lines, which are formed to cross with each other. In each of the rectangular regions surrounded by the adjacent gate bus lines 72 and the adjacent source bus lines 74, a transmission electrode 68 made of a material having a high light transmission efficiency and a reflection electrode 69 made of a material having a high reflection efficiency are disposed. The transmission electrode 68 and the reflection electrode 69 constitute one pixel electrode.

A gate electrode 73 extends from the gate bus line 72 toward the pixel electrode at a corner portion of each of the region where the pixel electrode is formed. A thin film transistor (TFT) 71 is formed as a switching element at the end portion of the gate electrode 73. The gate electrode 73 itself constitutes part of the TFT 71.

The TFT 71 is located above the gate electrode 73 formed on a glass substrate 61 as shown in FIG. 19F. The gate electrode 73 is covered with a gate insulating film 61*a*, and a semiconductor layer 77 is formed on the gate insulating film 61*a* so as to cover the gate electrode 73 via the gate insulating film 61*a*. A pair of contact layers 78 are formed on the side portions of the semiconductor layer 77.

A source electrode 75 is formed on one of the contact layers 78 and electrically connected to the corresponding source bus line 74. The side portion of the source electrode 75 overlaps the gate electrode 73 in an insulating manner, constituting part of the TFT 71. A drain electrode 76, which also constitutes part of the TFT 71, is formed on the other contact layer 78 so as to be away from the source electrode 75 and overlaps the gate electrode 73 in an insulating manner. The drain electrode 76 is electrically connected to the pixel electrode via an underlying electrode 81*a*.

A storage capacitor is formed by forming the underlying electrode 81*a* so as to overlap the gate bus line 72 used for the adjacent pixel electrode in the next pixel row via the gate insulating film 61*a*. The underlying electrode 81*a* may be formed over substantially the entire region where convex portions are formed as will be described hereinafter, so as to unify the influence of the process of forming this layer.

High convex portions 64*a* and low convex portions 64*b* and an overlying polymer resin film 65 are formed under each of the reflection electrodes 69.

The upper surface of the polymer resin film 65 is of a continuous wave shape reflecting the existence of the convex portions 64*a* and 64*b*. Such a polymer resin film 65 is formed over substantially the entire glass substrate 61, not only in the regions below the reflection electrodes 69. In this example, OFPR-800 manufactured by Tokyo Ohka Co., Ltd., for example, is used for the polymer resin film 65.

The reflection electrode 69 is formed on the portion of the polymer resin film 65 having the continuous wave shape which is formed on the high convex portions 64*a* and the low convex portions 64*b*. The reflection electrode 69 is made of a material having a high reflection efficiency, such as Al. The reflection electrode 69 is electrically connected to the corresponding drain electrode 76 via a contact hole 79.

In each pixel of the reflection/transmission type liquid crystal display device of this example, the transmission electrode 68 is formed separately from the reflection electrode 69. The transmission electrode 68 is made of a material having a high light transmission efficiency such as ITO.

The method for forming the reflection electrodes 69 and the transmission electrodes 68 which are main portions of the reflection/transmission type active matrix substrate 70 will be described with reference to FIGS. 19A to 19F.

First, as shown in FIG. 19A, the plurality of gate bus lines 72 (see FIG. 18) made of Cr, Ta, or the like and the gate electrodes 73 extending from the gate bus lines 72 are formed on the glass substrate 61.

The gate insulating film 61a made of $SiN_x$, $SiO_x$, or like is formed on the entire surface of the glass substrate 61 covering the gate bus lines 72 and the gate electrodes 73. The semiconductor layers 77 made of amorphous silicon (a—Si), polysilicon, CdSe, or the like are formed on the portions of the gate insulating film 61a located above the gate electrodes 73. The pair of contact layers 78 made of a-Si or the like are formed on both side portions of each of the semiconductor layers 77.

The source electrode 75 made of Ti, Mo, Al, or the like is formed on one of the contact layers 78, while the drain electrode 76 made of Ti, Mo, Al, or the like is formed on the other contact layer 78.

In this example, as the material of the glass substrate 61, product number 7059 manufactured by Corning Inc. with a thickness of 1.1 mm was used.

As shown in FIG. 19B, a metal layer 81 which constitutes part of the source bus lines 74 is formed by sputtering. The metal layer 81 is also used to form the underlying electrodes 81a.

Subsequently, as shown in FIG. 19C, an ITO layer 80 which also constitutes part of the source bus lines 74 is formed by sputtering and patterned.

Thus, in this example, the source bus lines 74 are of a double-layer structure consisting of the metal layer 81 and the ITO layer 80. This double-layer structure is advantageous in that even if the metal film 81 constituting the source bus line 74 is partly defective, the electric connection of the source bus line 74 is maintained by the ITO layer 80. This reduces the occurrence of disconnections in the source bus line 74.

The ITO layer 80 is also used to form the transmission electrodes 68. This makes it possible to form the transmission electrodes 68 simultaneously with the formation of the source bus lines 74, preventing an increase in the number of layers.

Then, as shown in FIG. 19D, rounded convex portions 64a and 64b, having substantially circular cross-sections are formed of a resist film of a photosensitive resin over the regions on which the reflection electrodes 69 are to be formed. Preferably, the convex portions 64a and 64b are not formed on the transmission electrodes 68 so that a voltage is efficiently applied to the liquid crystal layer. optically, however, not so large influence is observed when the convex portions 64a and 64b are formed on the transmission electrodes 68.

Hereinbelow, the process of forming the convex portions 64a and 64b in the reflection electrode regions will be briefly described with reference to FIGS. 20A to 20D.

Figure 20A:
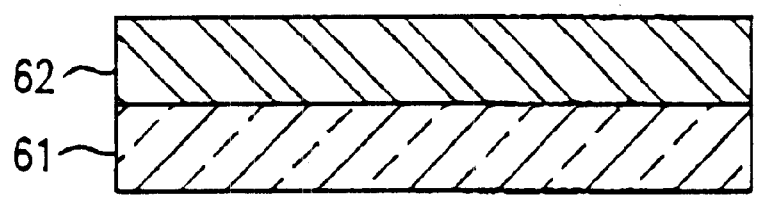
FIGS. 20A to 20D are sectional views illustrating the steps of forming convex portions in the reflection regions of the reflection/transmission type liquid crystal display device of Example 8.

First, as shown in FIG. 20A, a resist film 62 made of a photosensitive resin is formed on the glass substrate 61 (actually, with the metal layer 81 and the underlying electrode 81a formed thereon as shown in FIG. 19D) by a spin coat method. The resist film 62 is formed of the same photosensitive resin as that used for the polymer resin film 65 to be described hereinafter, i.e., OFPR-800, by spin coating at a speed preferably in the range of about 500 to about 3000 rpm, in this example at 1500 rpm, for 30 seconds, so as to obtain a thickness of 2.5 μm.

Then, the resultant glass substrate 61 with the resist film 62 formed thereon is prebaked at 90° C. for 30 minutes, for example.

Figure 20B:
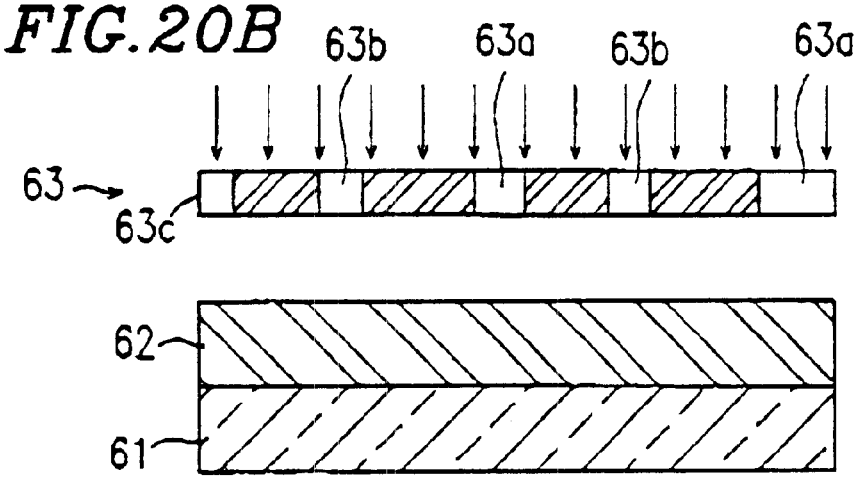
Figure 21:
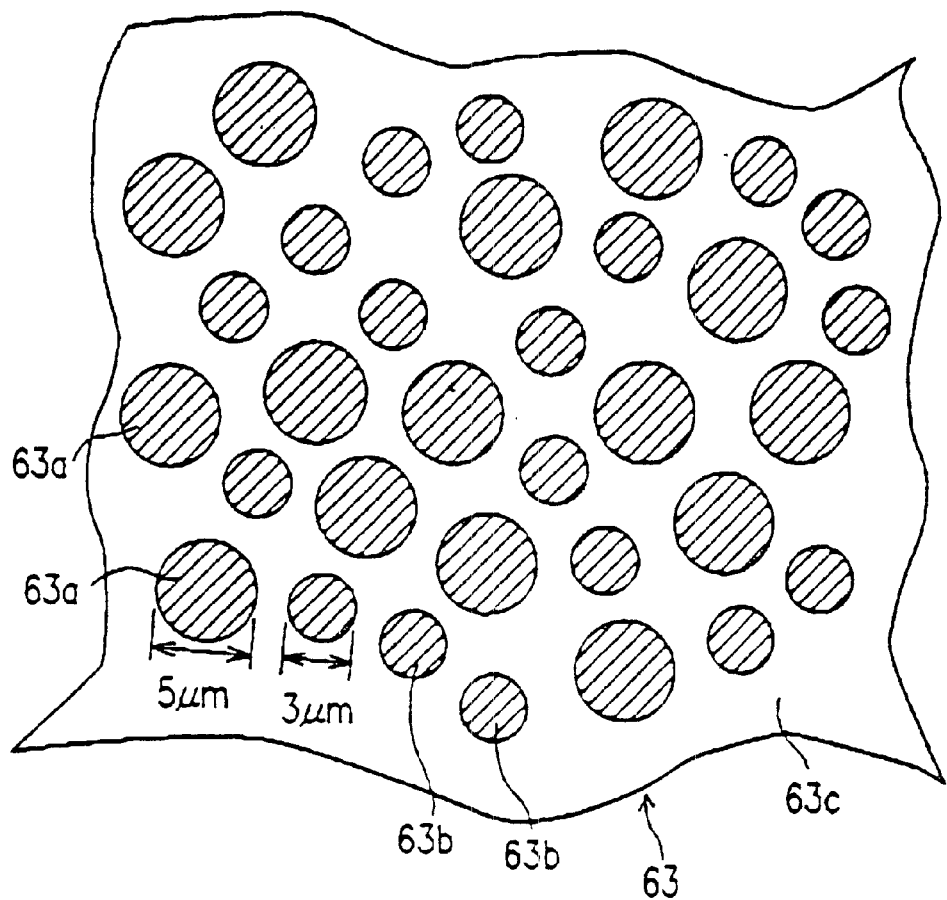
FIG. 21 is a plan view of a photomask used in the step shown in FIG. 20B.

Subsequently, as shown in FIG. 20B, a photomask 63 is disposed above the resist film 62. The photomask 63 has a shape as shown in FIG. 21, for example, which includes two types of circular pattern holes 63a and 63b formed through a plate 63c. The photomask 63 is then irradiated with light from above as shown by the arrows in FIG. 20B.

The photomask 63 in this example has the circular pattern holes 63a with a diameter of 5 μm and the circular pattern holes 63b with a diameter of 3 μm arranged at random. The space between any adjacent pattern holes should be at least about 2 μm. If the space is too large, however, the polymer resin film 65 to be formed thereon at a later step will hardly succeed in obtaining a continuous wave shape.

Figure 20C:
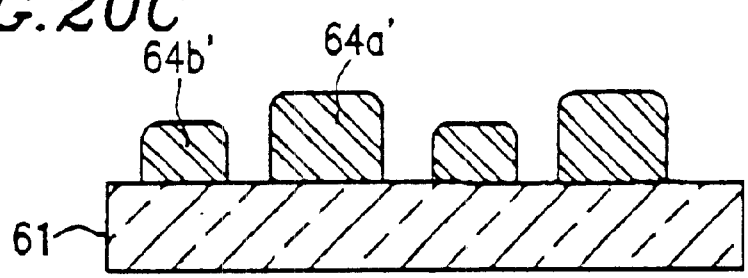

The resultant substrate is developed with a developer with a concentration of 2.38%, e.g., NMD-3 manufactured by Tokyo Ohka Co., Ltd. As a result, as shown in FIG. 20C a number of minute convex portions 64a' and 64b' with different heights are formed on the reflection electrode regions of the glass substrate 61. The top edges of the convex portions 64a' and 64b' are squared. The convex portions 64a' with a height of 2.48 μm and the convex portions 64b' with a height of 1.64 μm are formed from the pattern holes 63a with a diameter of 5 μm and the pattern holes 63b with a diameter of 3 μm, respectively.

The heights of the convex portions 64a' and 64b' can be changed by changing the sizes of the pattern holes 63a and 63b, the light exposure time, and the developing time. The size of the pattern holes 63a and 63b are not limited to those described above.

Figure 20D:
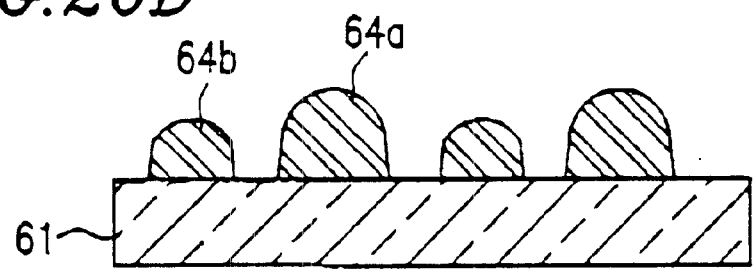

Thereafter, as shown in FIG. 20D, the glass substrate 61 with the convex portions 64a' and 64b' formed thereon is heated at about 200° C. for one hour. This softens the square top edges of the convex portions 64a' and 64b', to form the rounded convex portions 64a and 64b having substantially circular cross-sections.

Then, as shown in FIG. 19E, a polymer resin is applied on the resultant glass substrate 61 by spin coating and patterned to form the polymer resin film 65. The material OFPR-800 mentioned above is used as the polymer resin and applied by spin coating at a speed preferably in the range of about 1000 to about 3000 rpm. In this example, the spin coating was conducted at a speed of 2000 rpm.

In this way, the polymer resin film 65 having an upper surface of a continuous wave shape is obtained on the glass substrate 61, which is flat having no convex portions.

As shown in FIG. 19F, the reflection electrodes 69 made of Al are formed on predetermined portions of the polymer resin film 65 by sputtering, for example. Materials suitable for the reflection electrodes 69 include, besides Al and an Al alloy, Ta, Ni, Cr, and Ag having a high light reflection efficiency. The thickness of the reflection electrodes 69 is preferably in the range of about 0.01 to about 1.0 μm.

A polarizing plate (not shown) is attached to the back surface of the thus-fabricated active matrix substrate of this example. A backlight is then disposed on the outer surface of the polarizing plate.

Electric corrosion is generated if the Al film is formed after the portions of the polymer resin film 65 located on the transmission electrodes 68 are removed. Therefore, the portions of the polymer resin film 65 located on the transmission electrodes 68 should be removed after the formation of the reflection electrodes 69. This removal can be done by ashing, together with the removal of the portions of the polymer resin film 65 located above terminal electrodes for the connection of drivers formed on the peripheries of the active matrix substrate 70. This improves the process efficiency and allows for efficient voltage application to the liquid crystal layer.

If the polymer resin film 65 is not used in the process of forming the convex portions, a layer of Mo or the like may be formed between the transmission electrodes 68 made of ITO and the reflection electrodes 69 made of Al, to prevent the generation of electric corrosion.

The thus-formed reflection electrodes 69, made of a material having a high light reflection efficiency, have an upper surface in a continuous wave shape since the underlying polymer resin film 65 has the continuous wave shape as described above.

In this example, the transmission electrodes 68 are formed simultaneously with the formation of the source bus lines 74. When the source bus lines 74 are of a single-layer structure composed of the metal layer 81, not the double-layer structure composed of the metal layer 81 and the ITO layer 80 as described above, the transmission electrodes 68 may be formed separately from the formation of the source bus lines 74.

Figure 22:
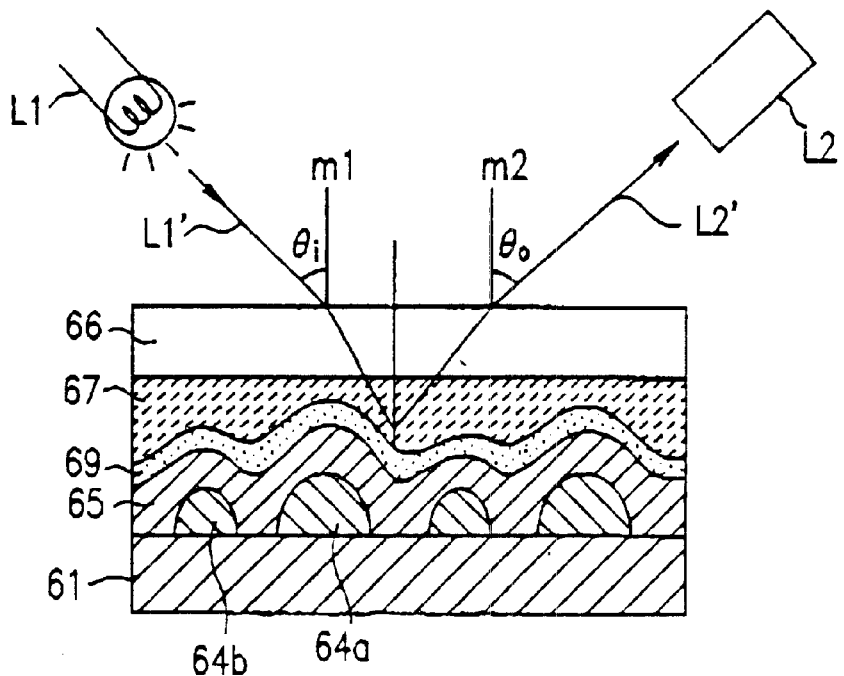
FIG. 22 is a sectional view illustrating a method for measuring the reflection characteristics of pixel electrodes having a high light reflection efficiency of the reflection/transmission type liquid crystal display device of Example 8.

The wavelength dependence of light reflected from the reflection electrodes 69 having a continuous wave shape and made of a material having a high light reflection efficiency was measured in a manner as shown in FIG. 22. An object structure for measurement was formed by simulating conditions for the reflection electrodes 69 equivalent to an actual liquid crystal display device during an actual use. Specifically, a dummy glass 66 having a refractive index of 1.5, which is substantially equal to the refractive index of the actual liquid crystal layer is attached to the active matrix substrate 70, with the reflection electrodes 69 and the transmission electrodes 68 formed thereon with an ultraviolet-setting adhesive 67 having a refractive index of about 1.5.

As the measurement system, a light source L1 is disposed so that an incident light beam L1' is incident at an incident angle θi with respect to the normal m1 of the dummy glass 66, and a photomultimeter L2 is disposed so as to capture a fixed-angle light beam reflected at an output angle θo with respect to the normal m2.

With the above construction, the photomultimeter L2 captures the intensity of a scattered light beam L2' which is reflected at the output angle θo among scattered light beams which are incident on the dummy glass 66 at the incident angle θi, as the incident light beam L1'.

The above measurement was conducted under the conditions of θi=30° and θo=20° in order to avoid the photomultimeter L2 from capturing a regular-reflected light beam which is emitted from the light source L1 and reflected from the surface of the dummy glass 66.

Figure 24:
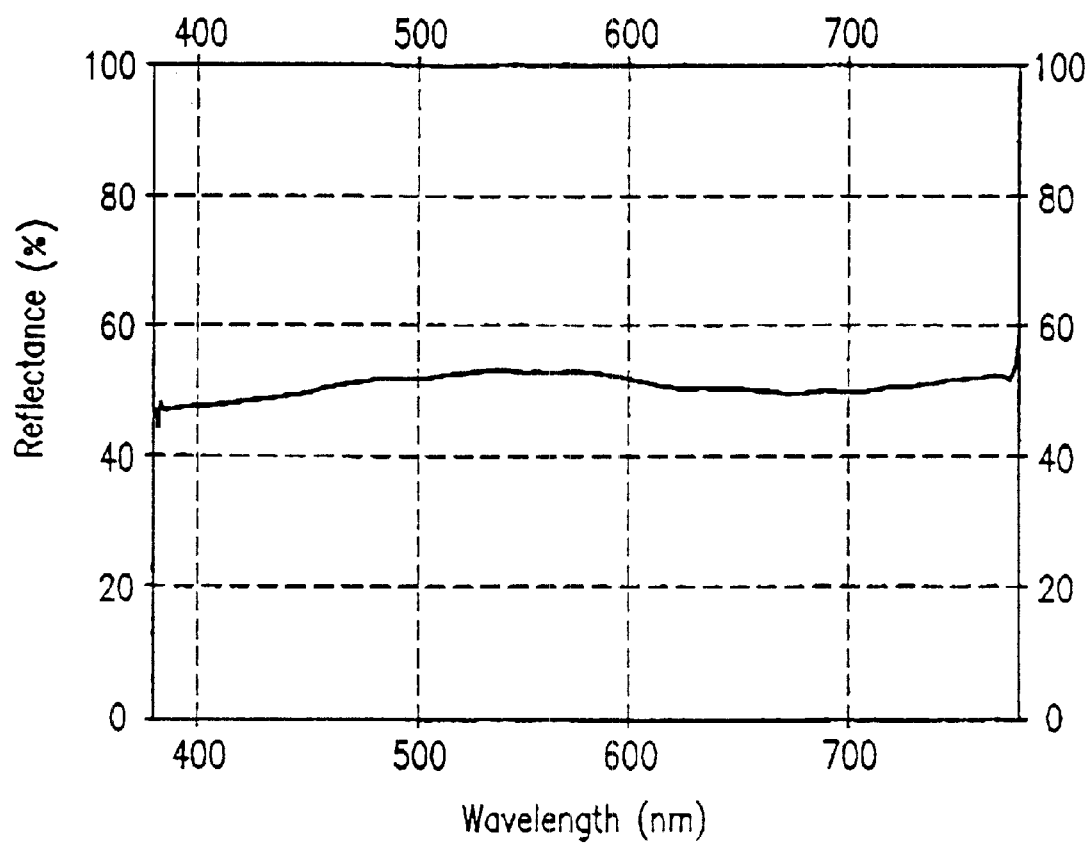
FIG. 24 is a graph showing the wavelength dependence of the pixel electrodes of the reflection/transmission type liquid crystal display device of Example 8.

FIG. 24 is a graph showing the wavelength dependence of reflected light in this example.

As shown in FIG. 24, the wavelength dependence of the reflectance is hardly recognized in this example, which proves that a good white color display is obtained.

In this example, the shape of the pattern holes 63a and 63b of the photomask 63 is a circle. Other shapes such as a rectangle, an ellipse, and a stripe may also be used.

In this example, the convex portions 64a and 64b with two different heights are formed. Alternatively, convex portions with a single height or those with three or more different heights may also be formed to obtain reflection electrodes having good reflection characteristics.

It has been found, however, that reflection electrodes with better wavelength dependence of the reflection characteristics are obtained when convex portions with two or more different heights are formed then when convex portions with a single height are formed.

If it is ensured that the upper surface of a continuous wave shape can be obtained only by the convex portions 64a and 64b, the formation of the polymer resin film 65 is not required. Only the resist film 62 (See FIGS. 20B and 20C) is formed to obtain the upper surface of a continuous wave shape and then the reflection electrodes 69 are formed thereon. In this case, the step of forming the polymer resin film 65 can be omitted.

In this example, OFPR-800 manufactured by Tokyo Ohka Co., Ltd. is used as the photosensitive resin material. Any other photosensitive resin material of the negative or positive type which can be patterned by an exposure process may also be used. Examples of such photosensitive resin materials include: OMR-83, OMR-85, ONNR-20, OFPR-2, OFPR-830, and OFPR-500 manufactured by Tokyo Ohka Co., Ltd.; TF-20, 1300-27, and 1400-27 manufactured by Shipley Co.; Photoneath manufactured by Toray Industries, Inc.; RW-101 manufactured by Sekisui Fine Chemical Co., Ltd., and R101 and R633 manufactured by Nippon Kayaku K.K.

In this example, the TFTs 71 are used as the switching elements. The present invention is also applicable to active matrix substrates using other switching elements such as metal-insulator-metal (MIM) elements, diodes, and varistors.

Thus, as described above, in the liquid crystal display device and the method for fabricating the liquid crystal display device of Example 8, the reflection electrodes made of a material having a high light reflection efficiency are formed so as to have a continuous wave shape. This reduces the wavelength dependence of the reflection and thus permit realization of a good white color display by reflection without the generation of an interference color.

Since the convex portions are formed on the substrate by an optical technique using a photomask, good reproducibility is ensured. The resultant wave-shaped upper surfaces of the reflection electrodes can also be obtained with good reproducibility.

The transmission electrodes made of a material having a high light transmission efficiency are formed simultaneously with the formation of the source bus lines. This allows for the formation of the transmission electrodes of the reflection/transmission type liquid crystal display device without increasing the number of steps compared with the conventional liquid crystal display device.

By forming a continuous wave shape for the reflection electrodes, more effective use of light than that expected from the actual aperture ratio is possible.

According to the liquid crystal display device of this example, the reflection portion made of a material having a high light reflection efficiency and a transmission portion made of a material having a high light transmission efficiency are formed in one display pixel. With this construction, when the environment is pitch-dark, the device serves as a transmission type liquid crystal display device which displays images utilizing light from the backlight passing through the transmission portion. When the environment is comparatively dark, the device serves as a reflection/transmission type liquid crystal display device which displays images utilizing both light from the backlight passing through the transmission portion and light reflected from the reflection portion composed of a film having a comparatively high reflectance. When the environment is bright, the device serves as a reflection type liquid crystal display device which displays images utilizing light reflected from the reflection portion composed of a film having a comparatively high reflectance.

In other words, according to this example, the pixel electrode of each pixel is composed of the reflection portion made of a material having a high light reflection efficiency and the transmission portion made of a material having a high light transmission efficiency. Thus, a liquid crystal display device having a good light utilization efficiency in any of the above-described cases and an excellent productivity is realized.

In this example, the upper surface of the reflection portion made of a material having a reflection function is of a continuous wave shape. This prevents the occurrence of a mirror phenomenon without providing a light scattering means, which is necessary when the reflection portion is flat, thus realizing a paper-white display.

In this example, a photosensitive polymer resin film having a plurality of convex portions underlies the reflection portion made of a material having a reflection function. With this construction, even if a variation exists in the continuous smooth concave and convex shape, it. does not influence the display. Thus, the liquid crystal display device can be fabricated with good productivity.

The transmission portion made of a material having a high light transmission efficiency is formed simultaneously with the formation of the source bus lines. This greatly shortens the fabrication process of the liquid crystal display device.

A protection film is formed between the transmission portion and the reflection portion. This prevents the generation of electric corrosion between the transmission portion and the reflection portion.

The reflection material remaining on the transmission portions and terminal electrodes is simultaneously removed when the patterning of the reflection portions is conducted. This greatly shortens the fabrication process of the liquid crystal display device.

In this example, light emitted from the backlight passes through the transmission portion to leave the substrate, while it is reflected from the back surface of the reflection portion to be returned to the backlight and reflected again toward the substrate. Part of the re-reflected light passes through the transmission portion to leave the substrate.

It is conventionally difficult to direct the re-reflected light to effectively pass through the transmission portion since regular reflection mainly occurs when the reflection portion is flat. In this example, however, since the reflection portion is of a continuous wave shape, the light emitted from the backlight is scattered, allowing the reflected light to effectively return toward the portion of the backlight located below the transmission portion. Thus, more effective use of light than that expected from the actual aperture ratio is possible, unlike the conventional transmission type liquid crystal display device.

EXAMPLE 9

Figure 25:
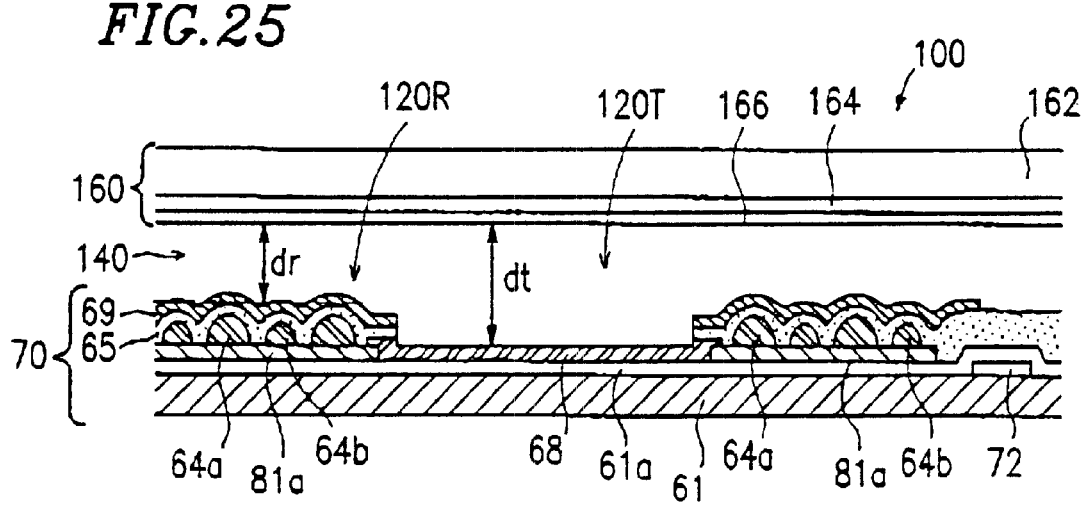
FIG. 25 is a sectional view of a transmission/reflection type liquid crystal display device according to Example 9 of the present invention.

FIG. 25 is a partial sectional view of a transmission/reflection type liquid crystal display device 100 of Example 9 according to the present invention, Referring to FIG. 25, the liquid crystal display device 100 includes an active matrix substrate 70 shown in FIG. 18 (corresponding to the P'—F' cross section), a counter substrate (color filter substrate) 160, and a liquid crystal layer 140 interposed therebetween. The transmission/reflection type active matrix substrate 70 includes a plurality of gate bus lines 72, as scanning lines, and a plurality of source bus lines 74, as signal lines, formed on an insulating glass substrate 61 so as to cross with each other. In each of the rectangular regions surrounded by the adjacent gate bus lines 72 and the adjacent source bus lines 74, a transmission electrode 68 made of a material having a high light transmission efficiency and a reflection electrode 69 made of a material having a high light reflection efficiency are disposed. The transmission electrode 68 and the reflection electrode 69 constitute one pixel electrode. The counter substrate (color filter substrate) 160 includes a color filter layer 164 and a transparent electrode 166 made of ITO or the like formed in this order on an insulating glass substrate 162.

Vertical alignment films (not shown) are formed on the surfaces of the substrates 70 and 160 facing the liquid crystal layer 140. In order to define the direction of liquid crystal molecules oriented by the electric field, the vertical alignment films are rubbed in a direction so as to provide a pretilt angle to the liquid crystal molecules. A nematic liquid crystal material having a negative dielectric anisotropy (e.g., M J manufactured by Merck & Co., Inc.) is used for the liquid crystal layer 140.

Each pixel which is a minimum display unit of the liquid crystal display device 100 includes a reflection region 120R defined by the reflection electrode 69 and is the transmission region 120T defined by the transmission electrode 68. The thickness of the liquid crystal layer 140 is dr in the reflection region 120R and dt (dt=2dr) in the transmission region 120T, so that the optical path lengths of light beams contributing to the display (reflected light beams in the reflection region and transmitted light beams in the transmission region) are substantially equal to each other. Although dt=2dr is preferable, dt and dr may be appropriately determined in the relationship with the display characteristics as far as dt>dr. Typically, dt is about 4 to about 6 $\mu$m and dr is about 2 to about 3 $\mu$m. In other words, a step of about 2 to about 3 $\mu$m is formed in each pixel region of the active matrix substrate 70. When the reflection electrode 69 has a concave and convex shaped surface as shown in FIG. 25, the average value of thicknesses should be dr. In this way, the transmission/reflection type liquid crystal display device 100 includes two types of regions (the reflection regions and the transmission regions) where the thickness of the liquid crystal layer 140 is different therebetween. In this example, the active matrix substrate 70 includes the reflection regions 120R and the transmission regions 120T having different heights formed on the side facing the liquid crystal layer 140.

Figure 26:
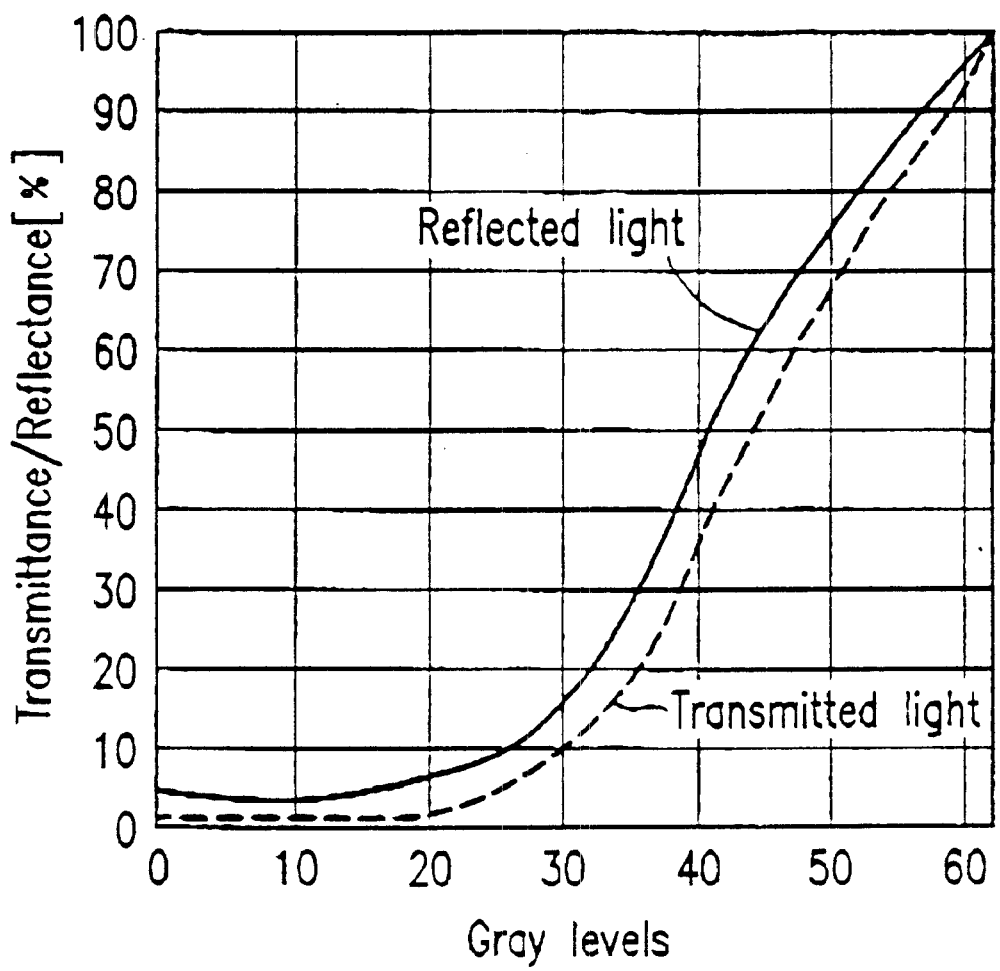
FIG. 26 is a graph showing the transmittance and reflectance in a gray-level display in Example 9.

A liquid crystal display device (diagonal: 8.4 inches) having the construction shown in FIG. 25 was actually fabricated and subjected to a 64 gray-level display to evaluate the display characteristics (transmittance and reflectance) of the device. The evaluation results are shown in FIG. 26. The liquid crystal display device was fabricated under the following conditions. The ratio of the area of the transmission region 120T to that of the reflection region 120R in one pixel was 4:6. The transmission electrodes 68 were made of, ITO, while the reflection electrodes 69 were made of Al. The thickness dt of the liquid crystal layer 140 in the transmission regions 120T was set at about 5.5 $\mu$m, while the thickness of the liquid crystal layer 140 in the reflection regions 120R were set at about 3 $\mu$m.

The transmittance of the liquid crystal display device in the transmission mode using light from a backlight was measured by MB-5 manufactured by Topcon Co., while the reflectance of the liquid crystal display device in the reflection mode using ambient light was measured by LCD-5000 manufactured by Otsuka Electronics Co., Ltd. by use of an integrating sphere.

As is apparent from FIG. 26, the variations in the reflectance and the transmittance in the 64 gray-level display (the solid line and the dotted line in FIG. 26, respectively) substantially match with each other. Accordingly, a gray-level display with a sufficient display quality is realized even if the display in the transmission mode using light from the backlight and the display in the reflection mode using ambient light are conducted simultaneously. The contrast ratios in the transmission mode and the reflection mode were about 200 and about 25, respectively.

Figure 27:
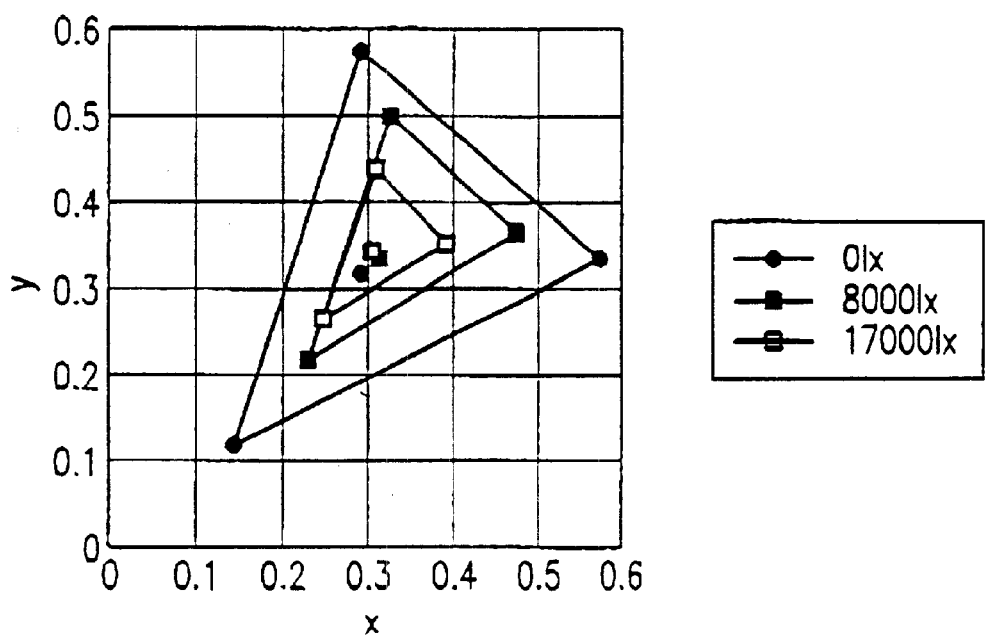
FIG. 27 is a chromaticity diagram of a conventional transmission type liquid crystal display device.
Figure 28:
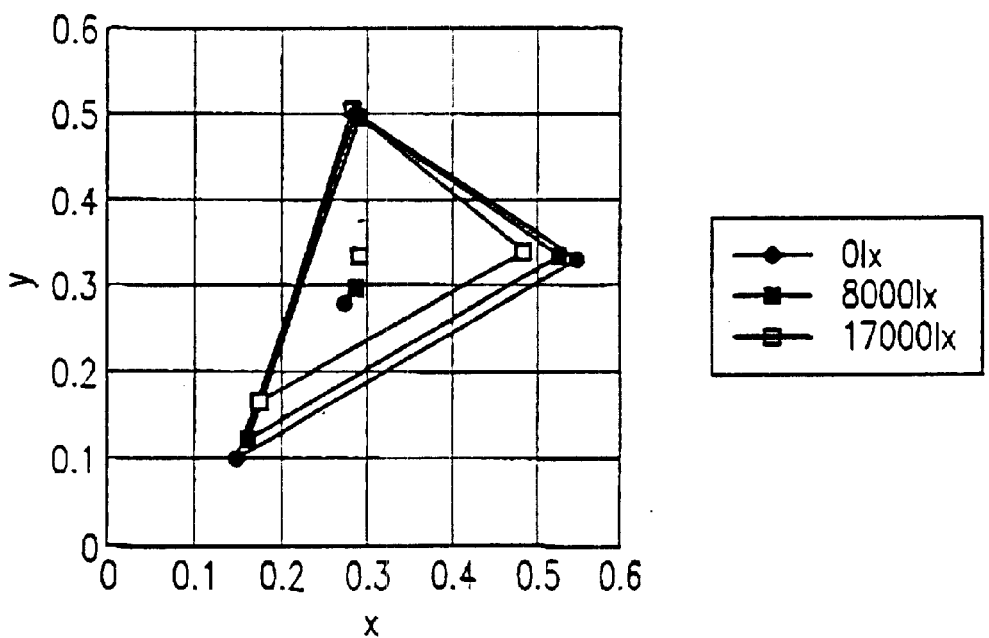
FIG. 28 is a chromaticity diagram of the transmission/reflection type liquid crystal display device of FIG. 9.

Hereinbelow, the evaluation results of color reproducibility will be described. FIGS. 27 and 28 are chromaticity diagrams of a conventional transmission type liquid crystal display device and the transmission/reflection type liquid crystal display device of this example, respectively, under ambient light with different brightnesses. The same backlight was used for these liquid crystal display devices.

As is apparent from FIG. 27, as the illuminance on the display screen by ambient light increases from 0 lx to 8,000 lx and then to 17,000 lx, the range of the color reproducibility (the area inside the triangle in FIG. 27) of the conventional liquid crystal display device significantly decreases. This is recognized by the observer as color blurring. In the transmission/reflection type liquid crystal display device, however, as is observed from FIG. 28, the range of the color reproducibility when the illuminance is 8,000 lx is substantially the same as that when the illuminance is 0 lx. Moreover, only a minor decrease is observed in the color reproducibility when the illuminance is 17,000 lx. Color blurring is therefore hardly recognized.

In the conventional transmission type liquid crystal display device, the contrast ratio is lower due to the reflection of ambient light from the surface of the display panel, as well as due to reflected light from a black mask for light shading, interconnect lines, and the like. On the contrary, in the transmission/reflection type liquid crystal display device of this example, which provides a reflection mode display using ambient light in addition to the transmission mode display, the lowering of the contrast ratio due to the reflection of ambient light in the transmission mode display can be suppressed by the reflection mode display. Thus, the contrast ratio obtained by the liquid crystal display device of this example will not become lower than the contrast ratio which may be obtained by only the reflection mode display irrespective of how bright ambient light becomes. As a result, in the tranamission/reflection type liquid crystal display device of this example, the color reproducibility is hardly lowered even under bright ambient light and thus a display with high visibility can be obtained under any environment.

Figure 29:
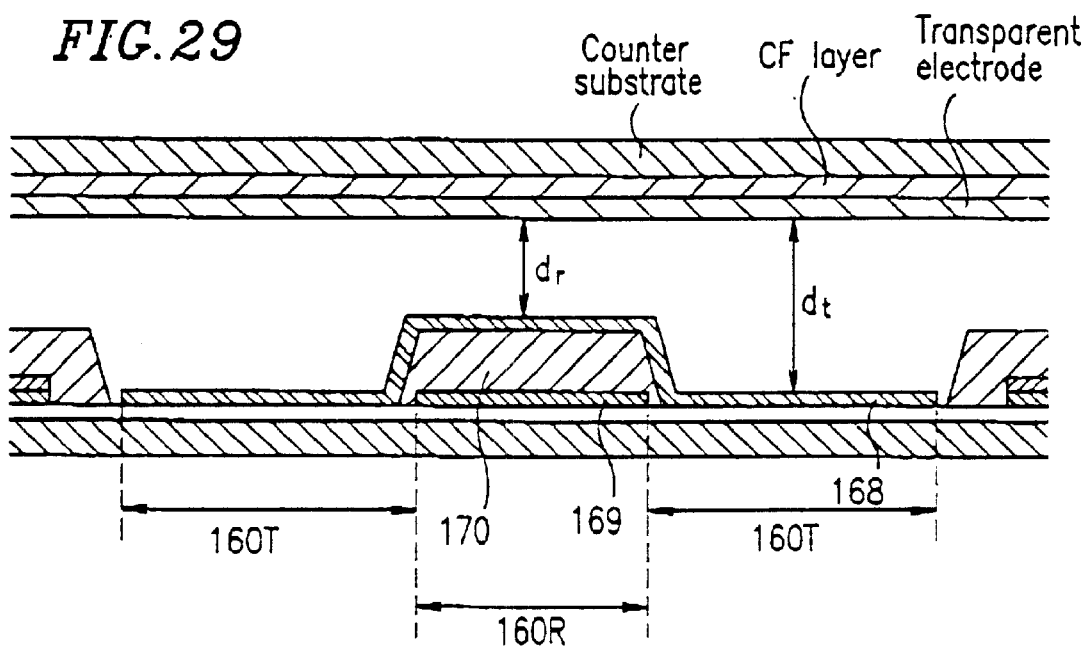
FIG. 29 is a sectional view of another embodiment of the transmission/reflection type liquid crystal display device according to Example 9 of the present invention.

FIG. 29 shows an alternative embodiment of the construction of this example, where a reflection electrode region 160R includes a reflection layer (reflection plate) 169 and a portion of a transmission electrode 168. This is unlike the construction shown in FIG. 25, where the reflection electrode region 120R includes a reflection electrode 69 having a reflection characteristic. The height of the reflection electrode region 160R of the active matrix substrate can be controlled by adjusting the thickness of the reflection layer 169 and/or an insulating layer 170 formed on the reflection layer 169.

EXAMPLE 10

Figure 30:
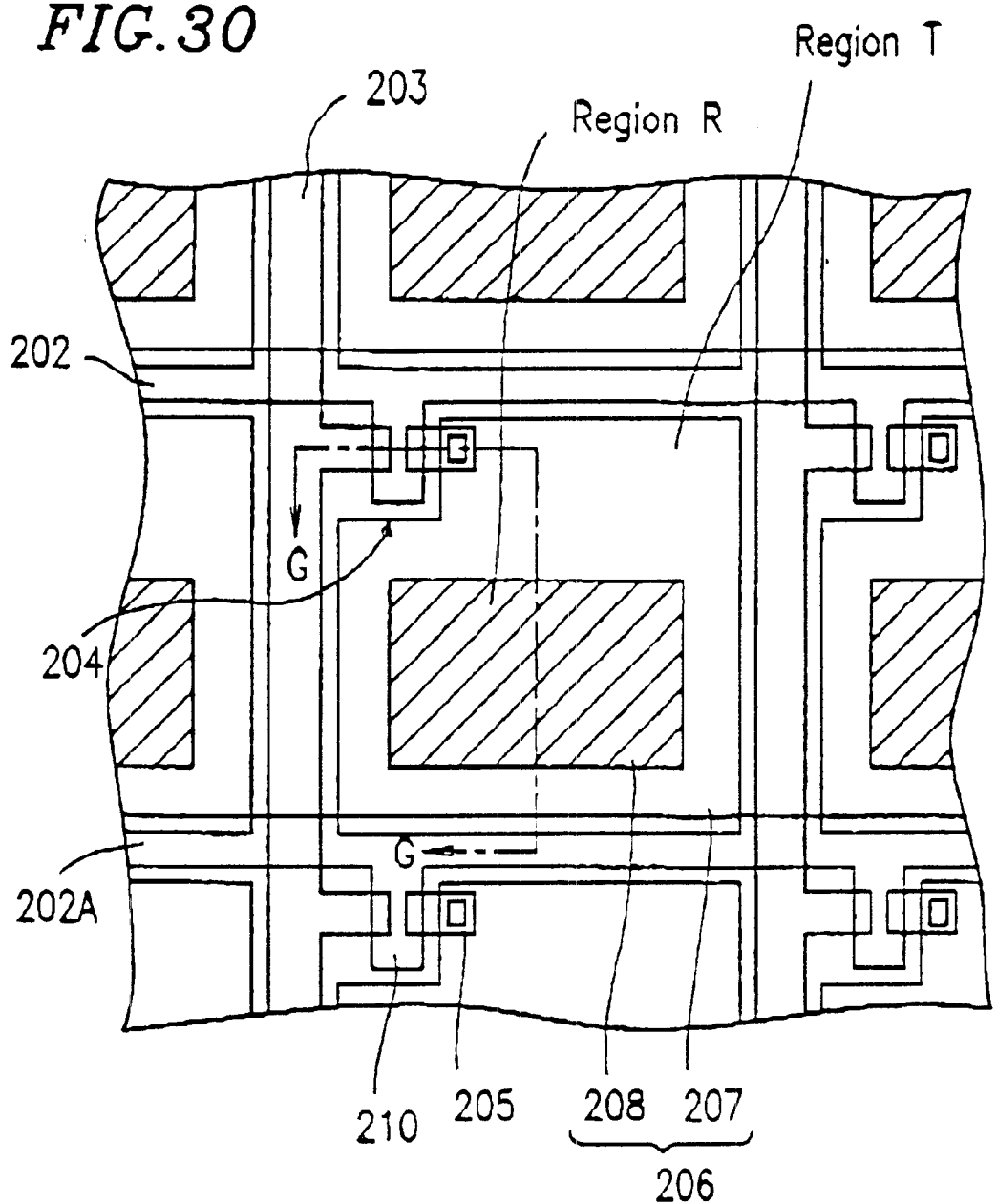
FIG. 30 is a plan view of an active matrix substrate of a liquid crystal display device according to Example 10 of the present invention.
Figure 31:
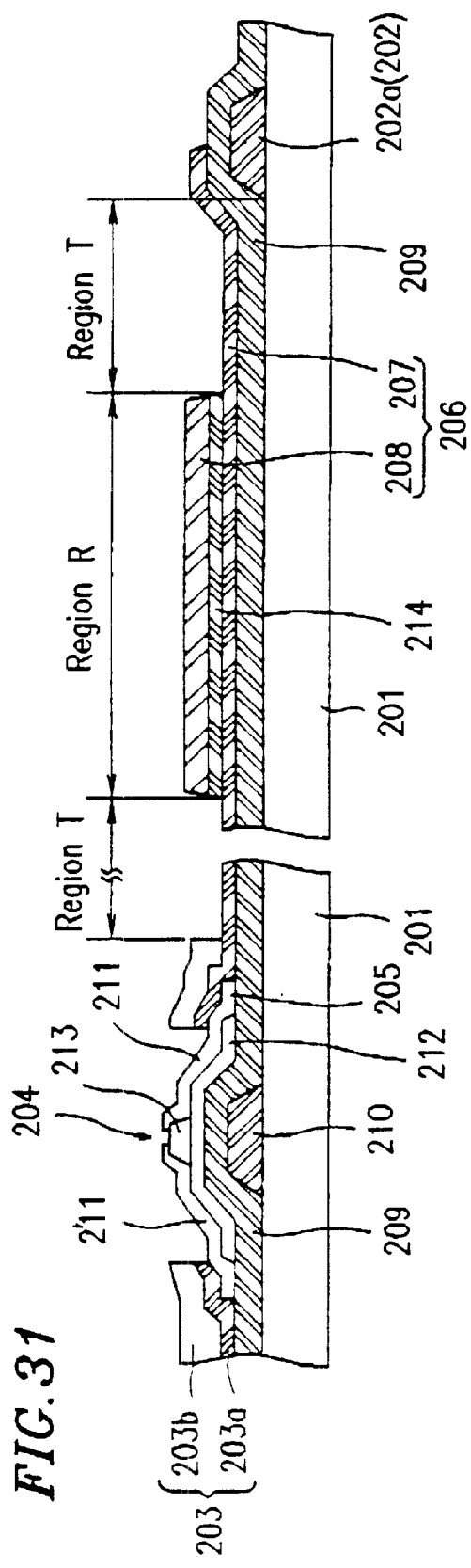
FIG. 31 is a sectional view taken along line G—G of FIG. 30.

FIG. 30 is a partial plan view of an active matrix substrate of a liquid crystal display device of Example 10 according to the present invention. FIG. 31 is a sectional view taken along line G—G of FIG. 30.

Referring to FIGS. 30 and 31, a plurality of gate lines 202 and a plurality of source lines 203 are formed on a transparent insulating substrate 201, made of glass or plastic, so as to cross with each other. Each region surrounded by the adjacent gate lines 202 and the adjacent source lines 203 defines a pixel. A TFT 204 is disposed in the vicinity of each of the crossings of the gate lines 202 and the source lines 203. A drain electrode 205 of each TFT 204 is connected to a corresponding pixel electrode 206. The portion of each pixel where the pixel electrode 206 is formed is composed of two regions as is viewed from the top, i.e., a region T having a high transmission efficiency and a region R having a high reflection efficiency. In this example, an ITO layer 207 constitutes the top layer of the region T as a layer having a high transmission efficiency, while an Al layer 208 (or an Al alloy layer) constitutes the top layer of the region R as a layer having a high reflection efficiency. The layers 207 and 208 constitute the pixel electrode 206 of each pixel. The pixel electrode 206 overlaps a gate line 202a for the adjacent pixel in the next pixel row via a gate insulating film 209. During driving, a storage capacitor for the driving of liquid crystal is formed at this overlap portion.

The TFT 204 includes a gate electrode 210 branched from the corresponding gate line 202 (in this case 202a), a gate insulating film 209, a semiconductor layer 212, a channel protection layer 213, and n$^+$-Si layers 211 which are to be source/drain electrodes deposited in this order.

Though not shown, the resultant active matrix substrate is provided with an alignment film, and then bonded with a counter substrate having a transparent electrode and an alignment film formed thereon. Liquid crystal is injected in a space between the two substrates in a sealing manner, and a backlight is disposed on the rear side of the resultant structure, thereby completing the liquid crystal display device of this example.

A mixture of a guest-host liquid crystal material, ZLI2327 (manufactured by Merck & Co., Inc.) containing black pigments therein and 0.5% of an optically active substance, S-811 (manufactured by Merck & Co., Inc.) was used as the liquid crystal. An electrically controlled birefringence (ECB) mode may also be used as the liquid crystal &ode by disposing polarizing plates on the top and bottom surfaces of the liquid crystal layer. When a color display is desired, a color filter (referred to as a CF layer) composed of red, green, and blue colored layers is disposed on top of the liquid crystal layer.

Hereinbelow, a method for fabricating such an active matrix substrate of this example will be described.

First, the gate lines 202 and the gate electrodes 210 made of Ta are formed on the insulating substrate 201, and the gate insulating film 209 is formed over the entire resultant substrate. Subsequently, the semiconductor layer 212 and the channel protection layer 213 are formed above each of the gate electrodes 210, followed by the formation of the n$^+$-Si layers 211 as the source electrodes 211 and drain electrodes 205 (or 211).

An ITO layer 203a (a lower layer) and a metal layer 203b (an upper layer) are formed in this order by sputtering and patterned to form the source lines 203. In this example, Ti was used for the metal layer 203b.

This double-layer structure of the source lines 203 is advantageous in that even if the metal layer 203b constituting each source line 203 is partly defective, the electric connection of the source line 203 is maintained by the ITO layer 203a, reducing the occurrence of disconnections in the source lines 203.

The ITO layer 207 of the region T having a high transmission efficiency is formed of the same material at the same step as the ITO layer 203a of the source line 203. The region R having a high reflection efficiency is formed by forming an Mo layer 214 and the Al layer 208 by sputtering in this order and patterning. The Al layer 208 can provide a sufficiently stable reflection efficiency (about 90%) when the thickness thereof is about 150 nm or more. In this example, the thickness of the Al layer 208 was 150 nm to obtain the reflection efficiency of 90% and thus to allow ambient light to be effectively reflected. Ag, Ta, W, and the like may also be used in place of Al or an Al alloy for the layer (Al layer 208) having a high reflection efficiancy.

In this example, the ITO layer 207 and the Al layer 208 are used as the pixel electrode 206 of each pixel. Alternatively, layers of Al or an Al alloy with different thicknesses may be formed to define a region having a high transmission efficiency and a region having a high reflection efficiency as the regions T and R, respectively. This makes the fabrication process simpler then in the case of using different materials. Also, the layer having a high reflection efficiency of the region R (the Al layer 208 in this example) may be made of the same material as that used for the metal layer 203b of the source line 203. This makes it possible to fabricate the liquid crystal display device of this example by the same process as that used in the fabrication of a conventional transmission type liquid crystal display device.

As described above, each pixel electrode 206 is composed of the region T having a high transmission efficiency and the region R having a high reflection efficiency. This construction realizes a liquid crystal display device where a transmission mode display, a reflection mode display, and a transmission/reflection mode display are possible by utilizing ambient light and illumination light more efficiently, compared with the conventional liquid crystal display device using a semi-transmissive reflection film.

The ITO layer 207 is formed, as the pixel electrode 206, over the entire region of each pixel and above the gate line 202a of the adjacent pixel, in the next pixel row, via the gate insulating film 209, interposed therebetween. The Al layer 208 is formed on the ITO layer 207 via the Mo layer 214, interposed therebetween, to constitute the region R in the center portion of the pixel like an island. In this way, since the ITO layer 207 and the Al layer 208 are electrically connected with each other, the regions T and R apply the same voltage received from the same TFT 204 to the liquid Crystal. Thus, a disclination line which may occur when the orientation of the liquid crystal molecules varies within one pixel during the voltage application is prevented.

The interposition of the Mo layer 214 between the ITO layer 207 and the Al layer 208 serves to prevent the generation of electric corrosion due to the contact between the ITO layer 207 and the Al layer 208 via an electrolytic solution in the fabrication process.

In this example, good display characteristics are obtained by setting the ratio of the area of the region T to that of the region R at 60:40. The area ratio is not limited to this value, but may be appropriately changed depending on the transmission/reflection efficiency of the regions T and R and the use of the device.

In this example, the area of the region R is preferably about 10 to about 90% of the effective pixel area (i.e., the total of the area of the region T and the area of the region R). If this percentage is below about 10%, i.e., the region having a high transmission efficiency occupies a too large a portion of the pixel, there arises a problem which arises in conventional transmission type liquid crystal display devices, i.e., the problem that the display is blurred when the environment becomes too bright. Conversely, if the percentage of the region R exceeds about 90%, a problem arises when the environment becomes too dark to observe the display only by ambient light. That is, even if the backlight is turned on during such an occasion, the occupation of the region T is so small that the resultant display is not recognizable.

In particular, when the liquid crystal display device is applied to an apparatus which is mainly used outdoors, battery life is an important factor, and the device should be designed so as to utilize ambient light efficiently to realize a lower power consumption. Accordingly, the area of the region R, having a high reflection efficiency, is preferably about 40 to about 90% of the effective pixel area. When the area occupation of the region R is about 40%, the environment where only the reflection mode display is sufficient for display becomes limited, and thus the amount of time requiring light from the backlight becomes too long. This reduces battery life.

On the other hand, when the liquid crystal display device is applied to an apparatus which is mainly used indoors, the device should be designed so as to utilize light from the backlight efficiently. Accordingly, the area of the region R is preferably about 10 to about 60% of the effective pixel area. When the area occupation of the region R exceeds 60%, the region T for transmitting light from the backlight becomes too small. To compensate for this, the brightness of the backlight must be substantially increased when compared with, for example, a transmission type liquid crystal display device. This increases the power consumption and lowers the backlight utilization efficiency of such a device.

The liquid crystal display device of this example was actually mounted in a battery-driven video camera. As a result, the display was kept bright and recognizable regardless of the brightness of ambient light by adjusting the brightness of the backlight. In particular, when the device was used outdoors during a fine weather, it was not necessary to light the backlight, thus reducing the power consumption. Therefore, battery life is significantly increased when compared with a device with only a transmission type liquid crystal display device.

EXAMPLE 11

Figure 32:
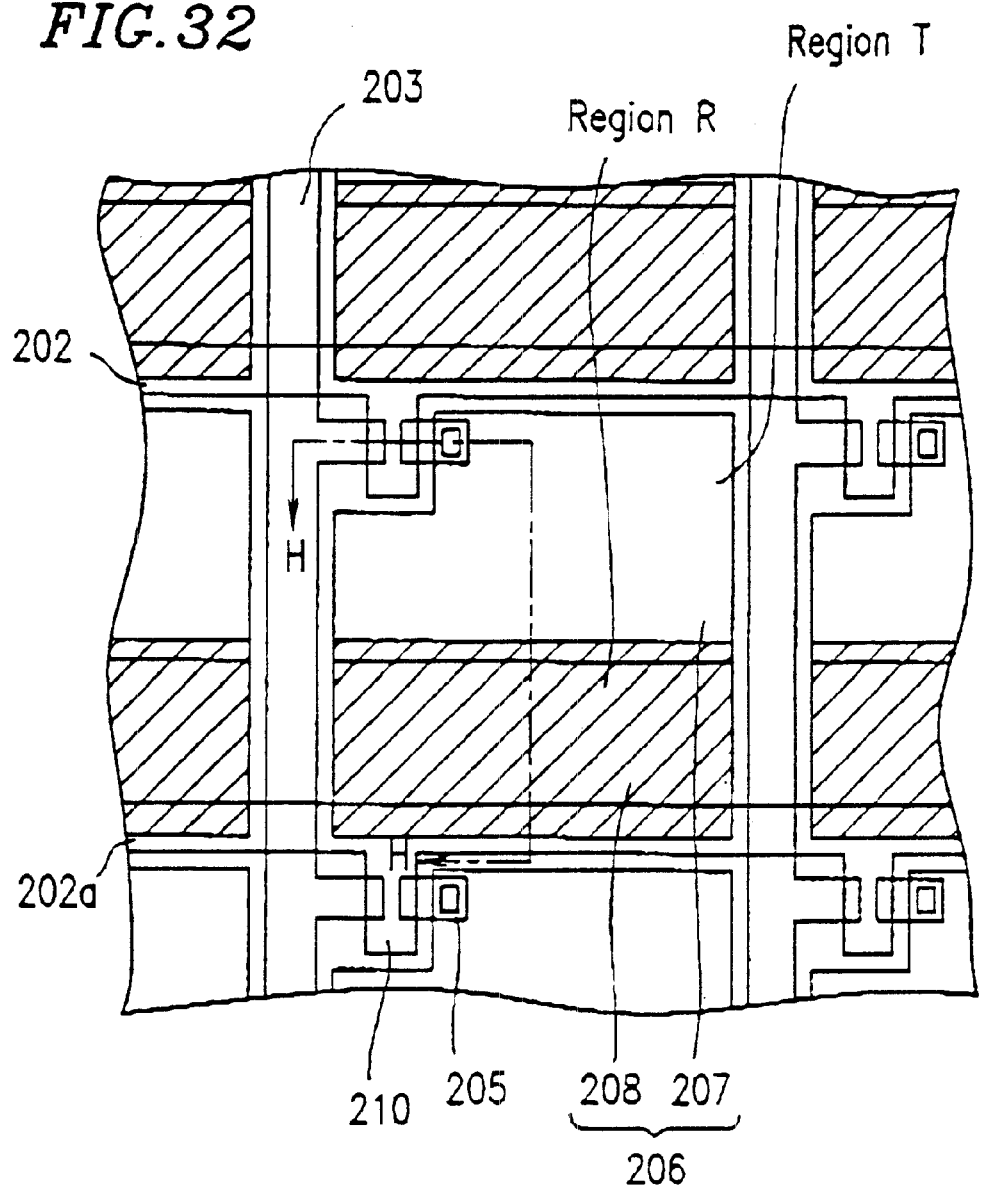
FIG. 32 is a plan view of an active matrix substrate of a liquid crystal display device according to Example 11 of the present invention.
Figure 33:
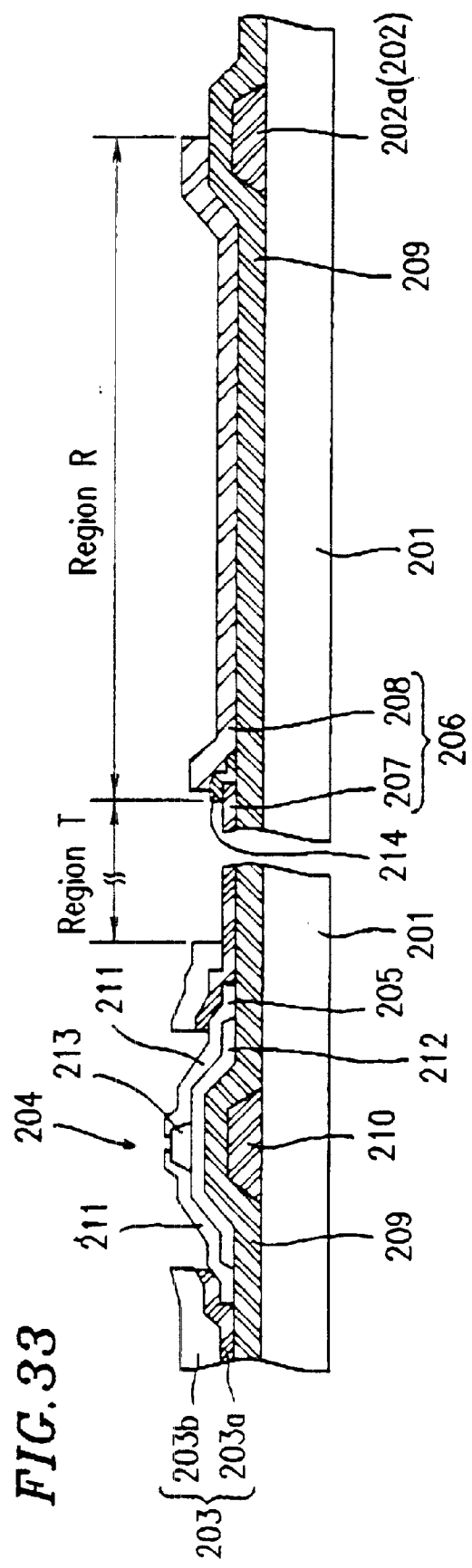
FIG. 33 is a sectional view taken along line H—N of FIG. 32.

FIG. 32 is a partial plan view of an active matrix substrate of a liquid crystal display device of Example 11 according to the present invention. FIG. 33 is a sectional view taken along line H—H of FIG. 32.

In this example, the portion of each pixel where the pixel electrode is formed is divided into two regions at the center thereof as is viewed from the top, i.e., a region T having a high transmission efficiency and a region R having a high reflection efficiency.

The same components are denoted by the same reference numerals as those in FIGS. 30 and 31 in Example 10. The pixels, the structure of the TFTs, and the fabrication process of the device are substantially the same as those described in Example 10.

Referring to, FIGS. 32 and 33, an ITO layer 207 is formed over the region of each pixel ranging from the center portion to a vicinity of a corresponding gate line 202, and partly connected to a drain electrode 205 of a TFT 204. An Al layer 208, having a high reflection efficiency, overlaps the ITO layer 207 via an Mo layer 214 at the center portion of the pixel. The Al layer 208 extends on the side of the pixel opposite to the region of the ITO layer 207, to overlap a gate line 202a for the adjacent pixel in the next pixel row via a gate insulating film 209.

Since the ITO layer 207 and the Al layer 208 are electrically connected via the Mo layer 214, electric corrosion due to the contact between the ITO layer 207 and the Al layer 208 is suppressed. The overlap between the Al layer 208, i.e., the region R and the gate line 202a, and the adjacent pixel is accomplished via the insulating film 209. This overlap forms a storage capacitor during the driving of liquid crystal, and this overlap portion of the region R also contributes to the display. This significantly increases the effective area of the pixel compared with the conventional construction.

In order to further increase the aperture ratio of the pixel, a film having a high reflection efficiency such as the Al layer 208 may be formed above the TFT 204 or the source line 203, via an insulating film, to serve as part of the pixel electrode 206 (which is electrically connected to the drain electrode 205). In such a case, however, the thickness, the material, and the pattern design of the insulating film should be appropriately determined so that the degradation of image quality due to a parasitic capacitance generated between the pixel electrode 206 and the TFT 204 or the source line 203 is minimized.

EXAMPLE 12

Figure 34:
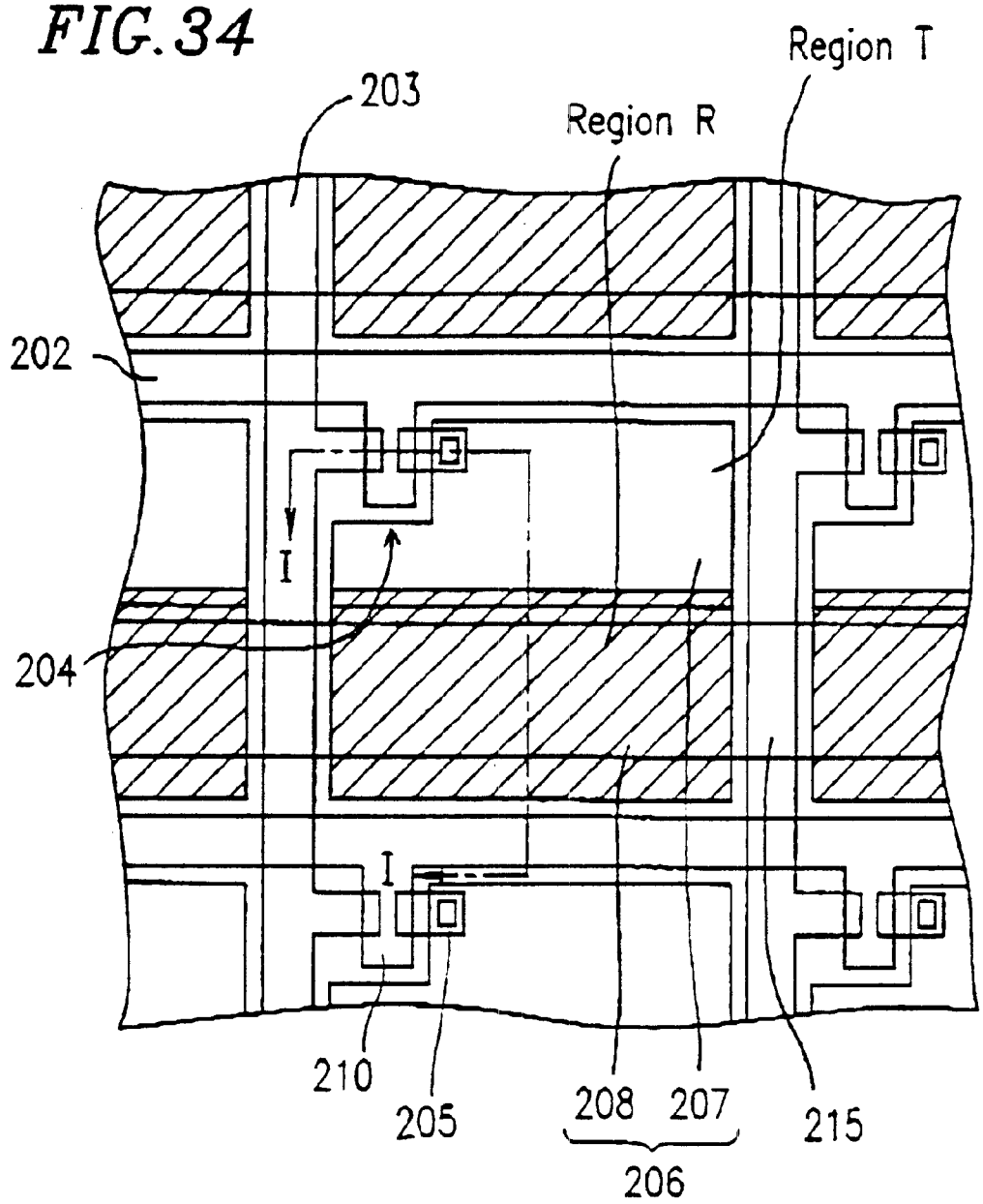
FIG. 34 is a plan view of an active matrix substrate of a liquid crystal display device according to Example 12 of the present invention.
Figure 35:
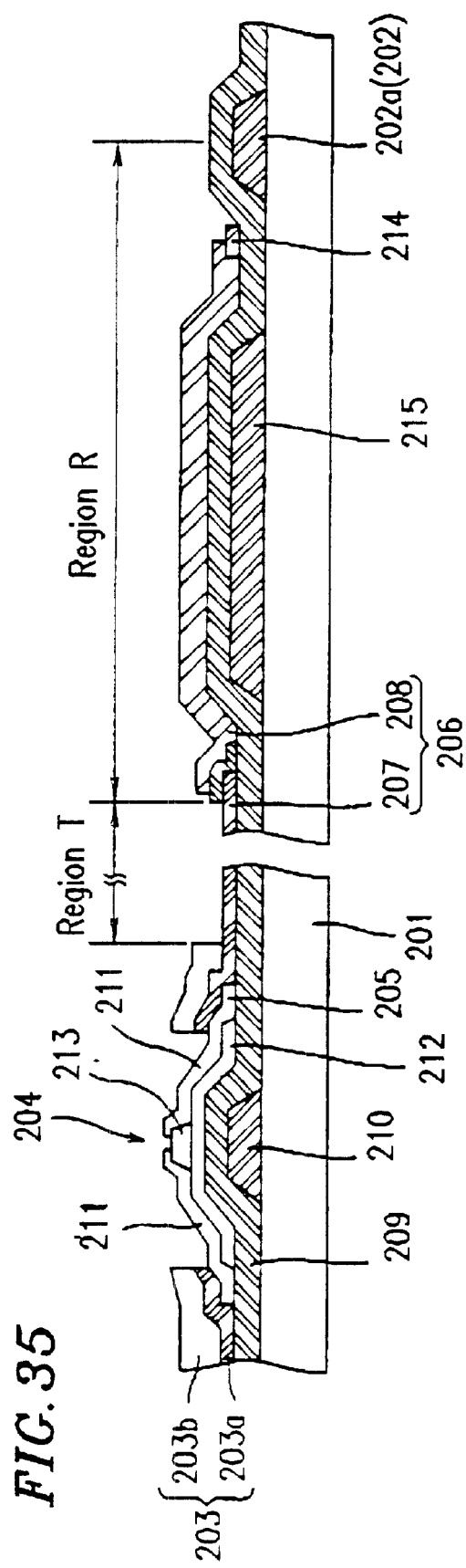
FIG. 35 is a sectional view taken along line I—I of FIG. 34.

FIG. 34 is a partial plan view of an active matrix substrate of a liquid crystal display device of Example 12 according to the present invention. FIG. 35 is a sectional view taken along line I—I of FIG. 34.

This example is different from Example 11 in that a common line 215 is formed under the region R having a high reflection efficiency, via a gate insulating film 209.

The same components are denoted by the same reference numerals as those in FIGS. 30 to 33 in Examples 10 and 11. The pixels, the structure of the TFTs, and the fabrication process of the device are substantially the same as those described in Examples 10 and 11.

Referring to FIGS. 34 and 35, an ITO layer 207 is formed over the region of each pixel ranging from the center portion to a vicinity of a corresponding gate line 202 and connected to a drain electrode 205 of a TFT 204. An Al layer 208 having a high reflection efficiency overlaps the ITO layer 207 via an Mo layer 214 at the center portion of the pixel. The Al layer 208 and extends on the side of the pixel opposite to the region of the ITO layer 204 in the vicinity of a gate line 202a for the adjacent pixel in the next pixel row, overlapping the common line 215 via a gate insulating film 209.

Since the ITO layer 207 and the Al layer 208 are electrically connected via the Mo layer 214, electric corrosion due to the contact between the ITO layer 207 and the Al layer 208 is suppressed. The overlap between the Al layer 208, i.e., the region R and the common line 215 via the insulating film 209 forms a storage capacitor during the driving of liquid crystal, contributing to an improved display. This formation of the storage capacitor will not lower the aperture ratio.

In order to further increase the aperture ratio of the pixel, a film having a high reflection efficiency such as the Al layer 208 may be formed above the TFT 204 or the source line 203, via an insulating film, to serve as part of the pixel electrode 206 (which is electrically connected to the drain electrode 205). In such a case, however, the thickness and the material of the insulating film should be appropriately determined so that no parasitic capacitance is generated between the pixel electrode 206 and the TFT 204 or the source line 203. For example, after the formation of the ITO layers 207, an organic insulating film having a dielectric constant of about 3.6 may be deposited over the entire resultant substrate to a thickness as large as about 3 $\mu$m. Then, the Al layer 208 may be formed in each pixel, so as to overlap the TFT 204 or the source line 203 and to be electrically connected to the drain electrode 205. This electrical connection can be realized via a contact hole by forming a contact hole on the drain electrode 205 or the ITO layer 207.

Figure 36:
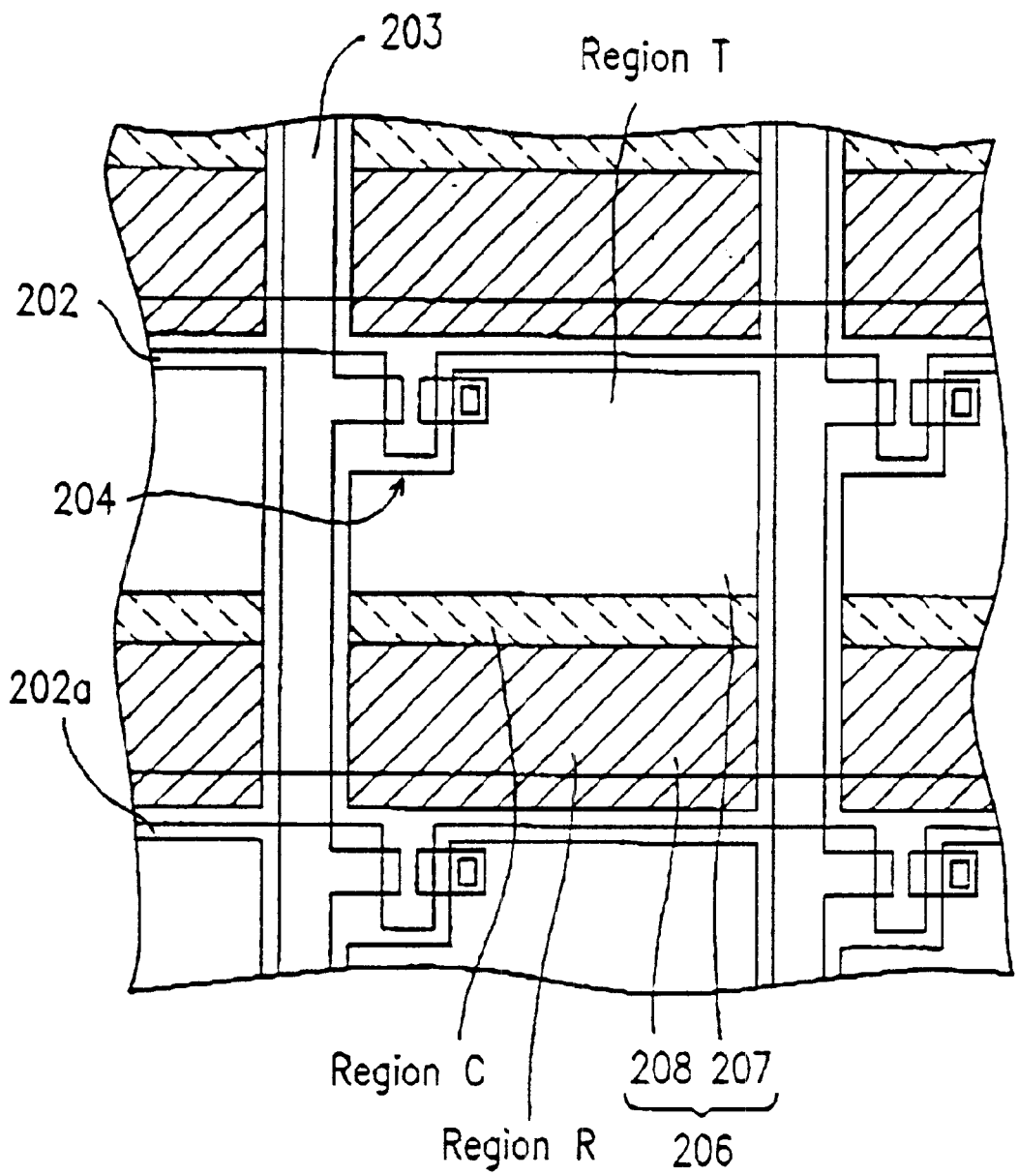
FIG. 36 is a plan view of an alternative embodiment of the active matrix substrate of the liquid crystal display device according to Example 12 of the present invention.

In this example, the portion of each pixel where the pixel electrode 206 is formed is divided into two regions, i.e., a region having a high transmission efficiency (region T) and a region having a high reflection efficiency (region R). Alternatively, the portion may be divided into three or more regions. For example, as shown in FIG. 36, the pixel electrode 206 may be divided into three regions, i.e., the region T having a high transmission efficiency, the region R having a high reflection efficiency, and a region C having a different transmission or reflection efficiency from the other two regions.

EXAMPLE 13

Figure 37:
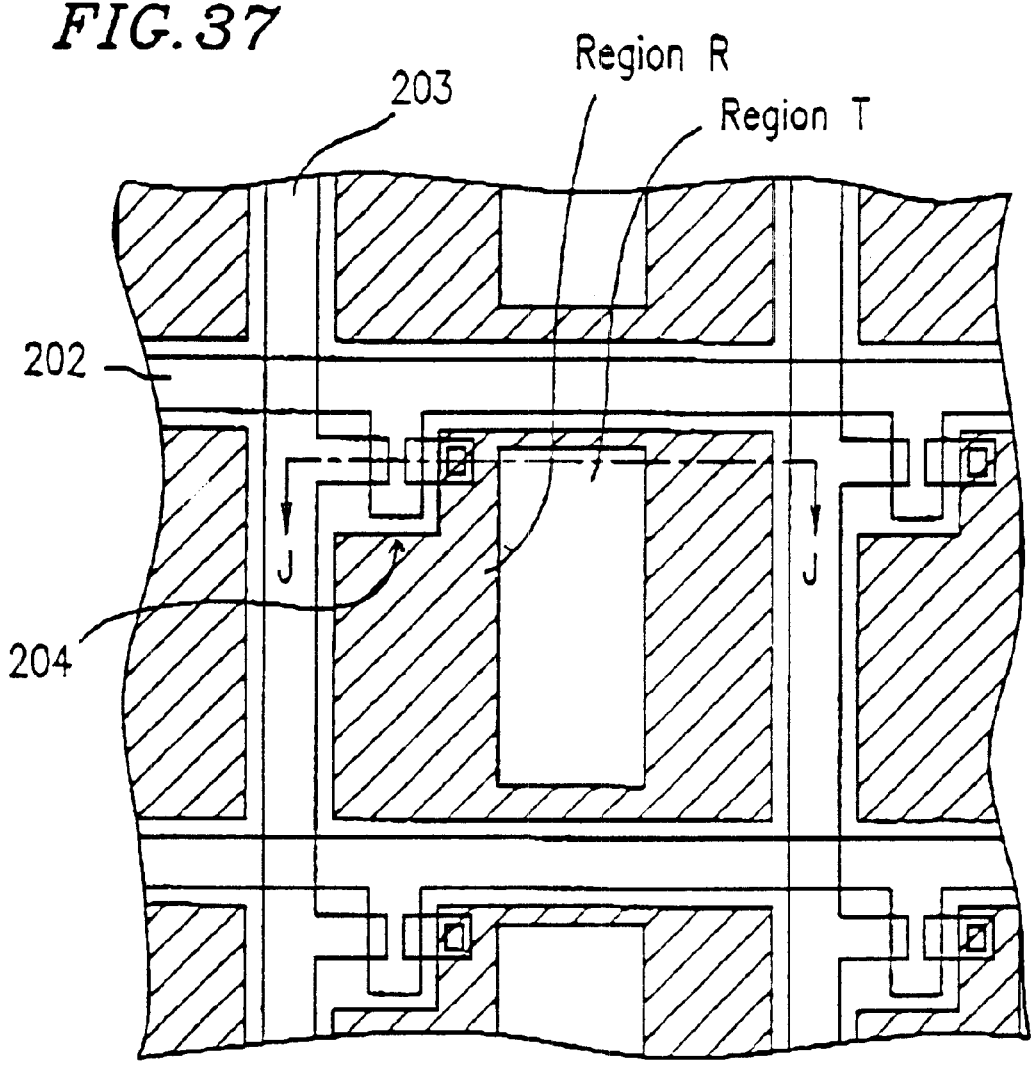
FIG. 37 is a plan view of an active matrix substrate of a liquid crystal display device according to Example 13 of the present invention.

FIG. 37 is a partial plan view of an active matrix substrate of a liquid crystal display device of Example 13 according to the present invention. FIGS. 38A to 38D are sectional views taken along line J—J of FIG. 37, illustrating the process of fabricating the liquid crystal display device of this example.

In this example, regions R having a high reflection efficiency are made of the same material as that used for source lines. The same components are denoted by the same reference numerals as those in FIGS. 30 to 36 in Examples 10 to 12. The pixels, the structure of the TFTs, and the fabrication process of the device are substantially the same as those described in Examples 10 to 12 unless otherwise specified.

In this example, each pixel includes a region T having a high transmission efficiency formed in the center portion thereof and a region R surrounding the region T. The outer profile of the region R is a square along two gate lines and two source lines. The region R includes a layer, having a high reflection efficiency, made of the same material as that for the source line, realizing a high reflection efficiency.

The process of fabricating such a liquid crystal display device will be described with reference to FIGS. 38A to 38D.

Figure 38A:
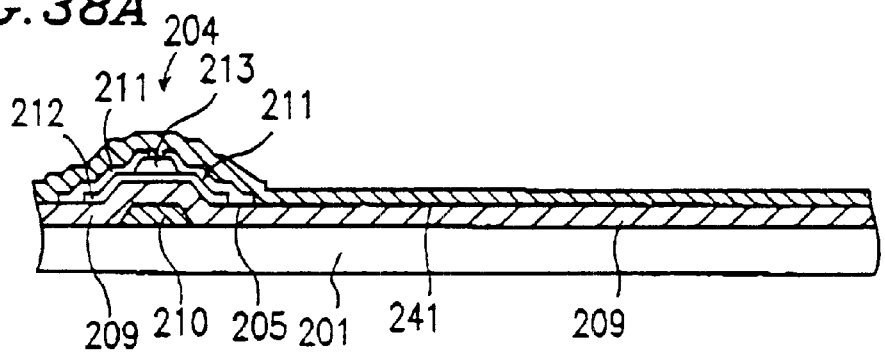
FIGS. 38A to 38D are sectional views taken along line J—J of FIG. 37, illustrating the fabrication process of the active matrix substrate of Example 13.

Referring to FIG. 38A, gate lines 202 (see FIG. 37) and gate electrodes 210, a gate insulating film 209, semiconductor layers 212, channel protection layers 213, and n$^+$-Si layers 211, which are to be source electrodes 211 and drain electrodes 205 (or 211) are sequentially deposited on an insulating substrate 201 by sputtering. Then, a conductive film 241 for source lines 203 (see FIG. 37) is deposited on the resultant substrate by sputtering.

Figure 38B:
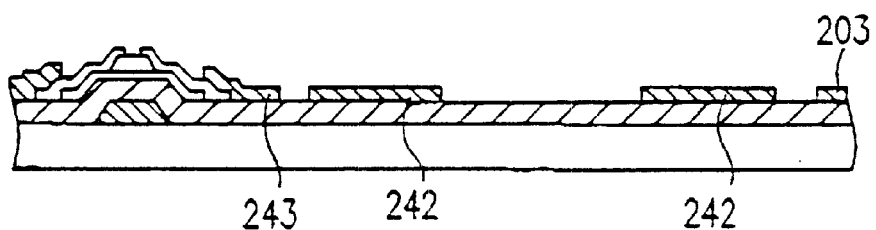

Referring to FIG. 38B, the conductive film 241 is patterned to form layers 242 having a high reflection efficiency, drain-pixel electrode connecting layers 243, and the source lines 203. The regions of the layers 242 having a high reflection efficiency correspond to the regions R.

Figure 38C:
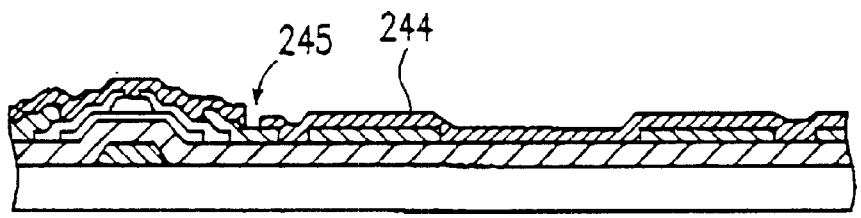

Referring to FIG. 38C, an interlayer insulating film 244 is formed over the resultant substrate, and then contact holes 245 are formed through the interlayer insulating film 244.

Figure 38D:
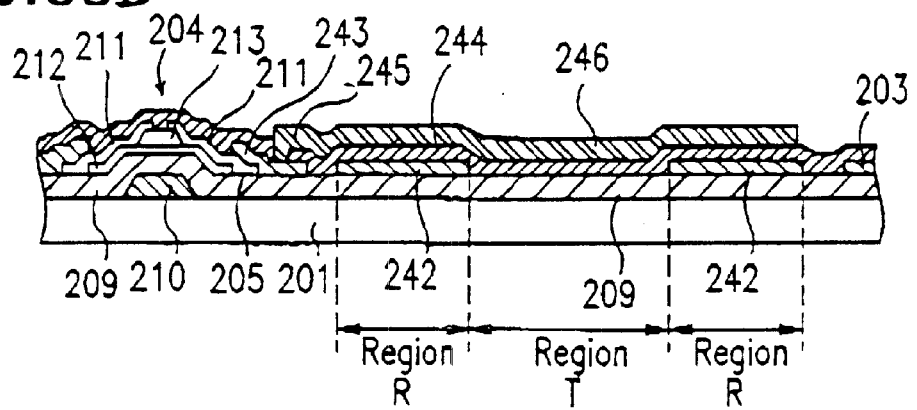

Referring to FIG. 38D, a layer 246 having a high transmission efficiency, made of ITO, is formed over the entire area of each pixel. The layer 246 having a high transmission efficiency may be made of any other material having a high transmission efficiency. The layer 246 having a high transmission efficiency is connected to the connecting layer 243 via the contact hole 245 formed through the interlayer insulating film 244, thus being electrically connected to a corresponding drain electrode 205. The layer 246 having a high transmission efficiency also serves as the pixel electrode for applying a voltage to a liquid crystal layer, so that the voltage is applied to the portions of the liquid crystal layer corresponding to both the regions T and R via the layer 246 having a high transmission efficiency. Thus, in this example, each pixel electrode is composed of only the layer 246 having a high transmission efficiency, and are not composed of the region T having a high transmission efficiency and the region R having a high reflection efficiency. This construction is advantageous over the transmission type liquid crystal display device in that the region having a high reflection efficiency can be formed without increasing the number of process steps and that failure in the formation of pixel electrodes is minimized.

EXAMPLE 14

Figure 39:
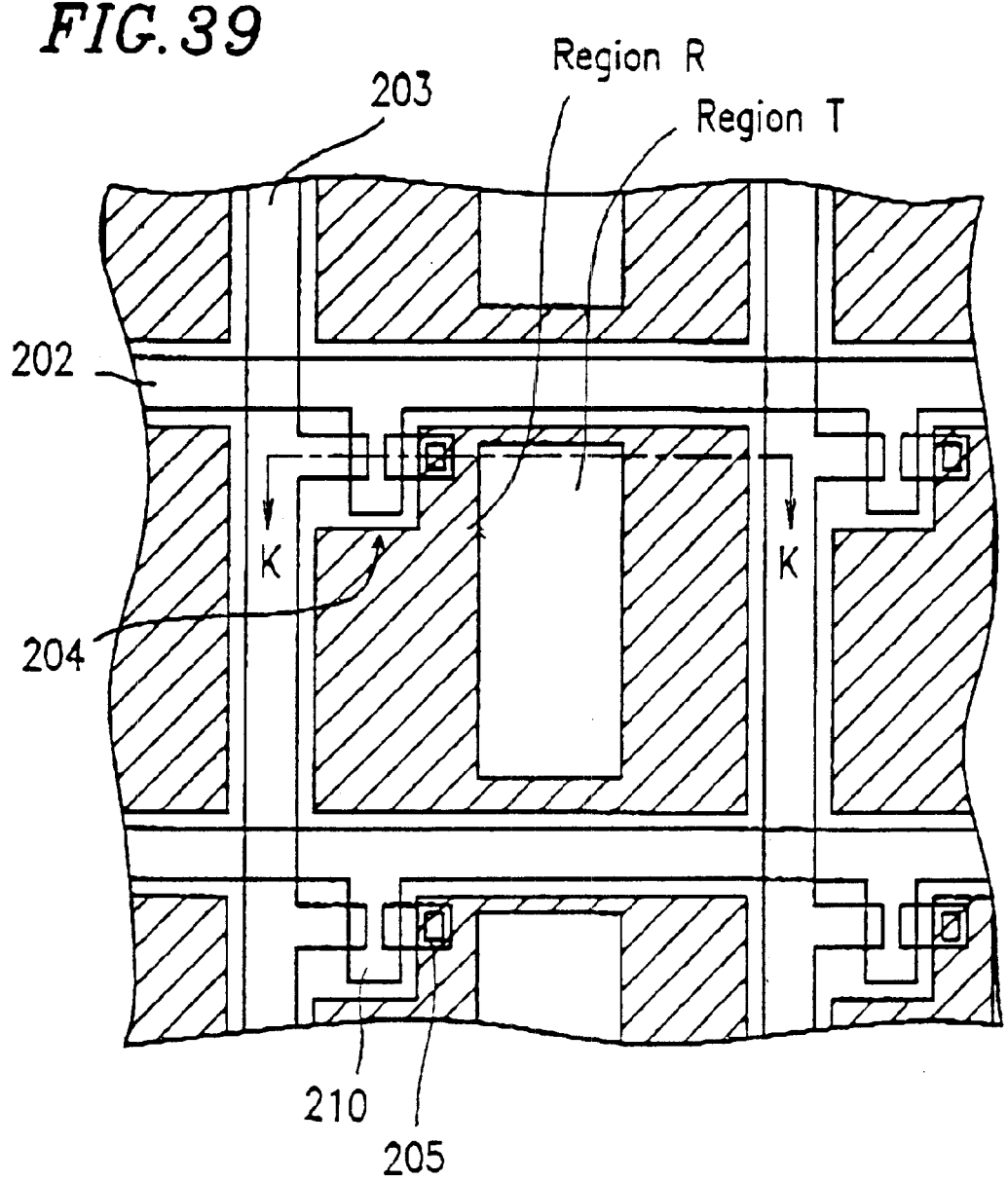
FIG. 39 is a plan view of an active matrix substrate of a liquid crystal display device according to Example 14 of the present invention.

FIG. 39 is a partial plan view of an active matrix substrate of a liquid crystal display device of Example 14 according to the present invention. FIGS. 40A to 40D are sectional views taken along line K—K of FIG. 39, illustrating the process of fabricating the liquid crystal display device of this example.

In this example, regions R (the hatched portion in FIG. 39) having a high reflection efficiency are made of the same material as is used for gate lines. The same components are denoted by the same reference numerals as those in FIGS. 30 to 38 in Examples 10 to 13. The pixels, the structure of the TFTS, and the fabrication process of the device are substantially the same as those described in Examples 10 to 13 unless otherwise specified.

In this example, each pixel includes a rectangular region T having a high transmission efficiency formed in the center portion thereof and a region R substantially composed of two connected strips surrounding the region T as is viewed from the top, The outer profile of the region R is a square along two gate lines and two source lines. The region R includes a layer, having a high reflection efficiency, made of the same material as that for the gate line, realizing a high reflection efficiency.

The process of fabricating such a liquid crystal display device will be described with reference to FIGS. 40A to 40D.

Figure 40A:
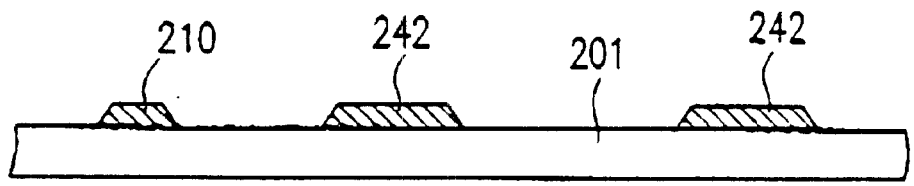
FIGS. 40A to 40D are sectional views taken along line K—K of FIG. 39, illustrating the fabrication process of the active matrix substrate of Example 14.

Referring to FIG. 40A, a conductive film is formed on an insulating substrate 201. The conductive film is then patterned to form gate electrodes 210, gate lines 202 (see FIG. 39), and layers 242 having a high reflection efficiency. The layers 242 having a high reflection efficiency correspond to the regions R.

Figure 40B:
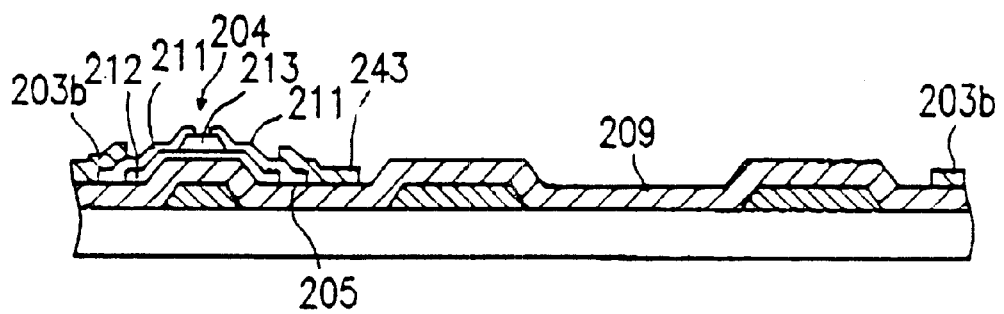

Referring to FIG. 40B, a gate insulating film 209, semiconductor layers 212, channel protection layers 213, and n$^+$-Si layers 211 which are to be source electrodes 211 and drain electrodes 205 (or 211) are sequentially deposited on the resultant substrate by sputtering. Then, metal layers 203b, used as part of source layers 203, and drain-pixel electrode connecting layers 243 are formed during the same step. The connecting layers 243 partly overlap drain electrodes 205 of TFTs 204.

Figure 40C:
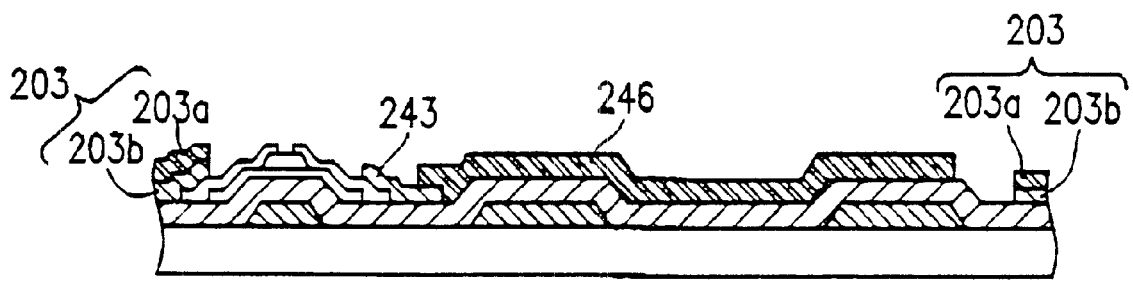

Referring to FIG. 40C, ITO is deposited on the resultant substrate by sputtering and patterned to form layers 246 having a high transmission efficiency and ITO layers 203a as part of the source lines 203. The layers 246 having a high transmission efficiency are formed over the entire areas of respective pixels, and the ITO layers 203a are formed on the metal layers 203b to have the same pattern as the metal layers 203b. The layer 246 having a high transmission efficiency partly overlap the connecting layers 243 to be electrically connected to the respective TFTs 204.

Figure 40D:
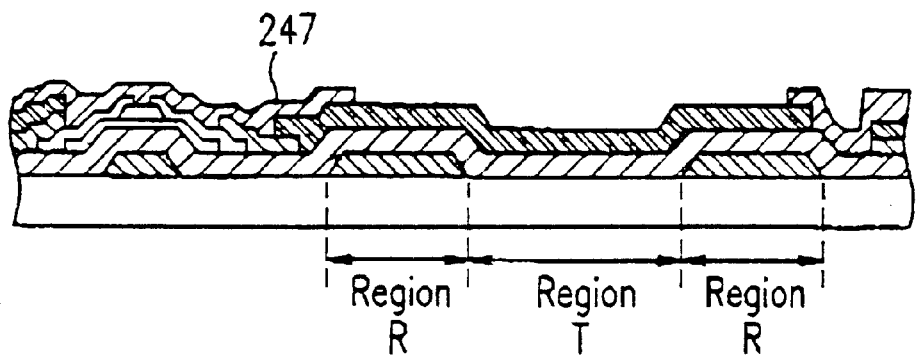

Referring to FIG. 40D, a passivation film 247 is formed and patterned.

Thus, each pixel of the liquid crystal display device of this example includes the region T having a high transmission efficiency in the center portion thereof, and the region R having a high reflection efficiency surrounding the region T in a shape of two connected strips along the adjacent source lines. In this case, since the ITO layers 203a of the source lines 203 and the layers 242, having a high reflection efficiency are located at different levels, the gap between the ITO layer 203a and the layer 242, having a high reflection efficiency, of each pixel, which is required to prevent a leakage therebetween, can be narrowed, and thus the aperture ratio of the pixel can be increased, compared with the case where the regions T and R are formed in reverse (i.e., the case where the layer having a high reflection efficiency is located in the center portion of the pixel).

In this example, as in Example 13, each pixel electrode is composed of only one type of electrode (i.e., the layer 246 having a high transmission efficiency). This construction is advantageous over the construction where the pixel electrode is composed of two types of electrodes in that the occurrence of defects is reduced and efficient fabrication of the device is possible.

In this example, each source line 203 is of a double layer structure composed of the metal layer 203b and the ITO layer 203a. Even if the metal layer 203b is partly defective, the electric connection of the source line 203 is maintained by the ITO layer 203a. This reduces the occurrence of disconnections in the source line 203.

EXAMPLE 15

Figure 41:
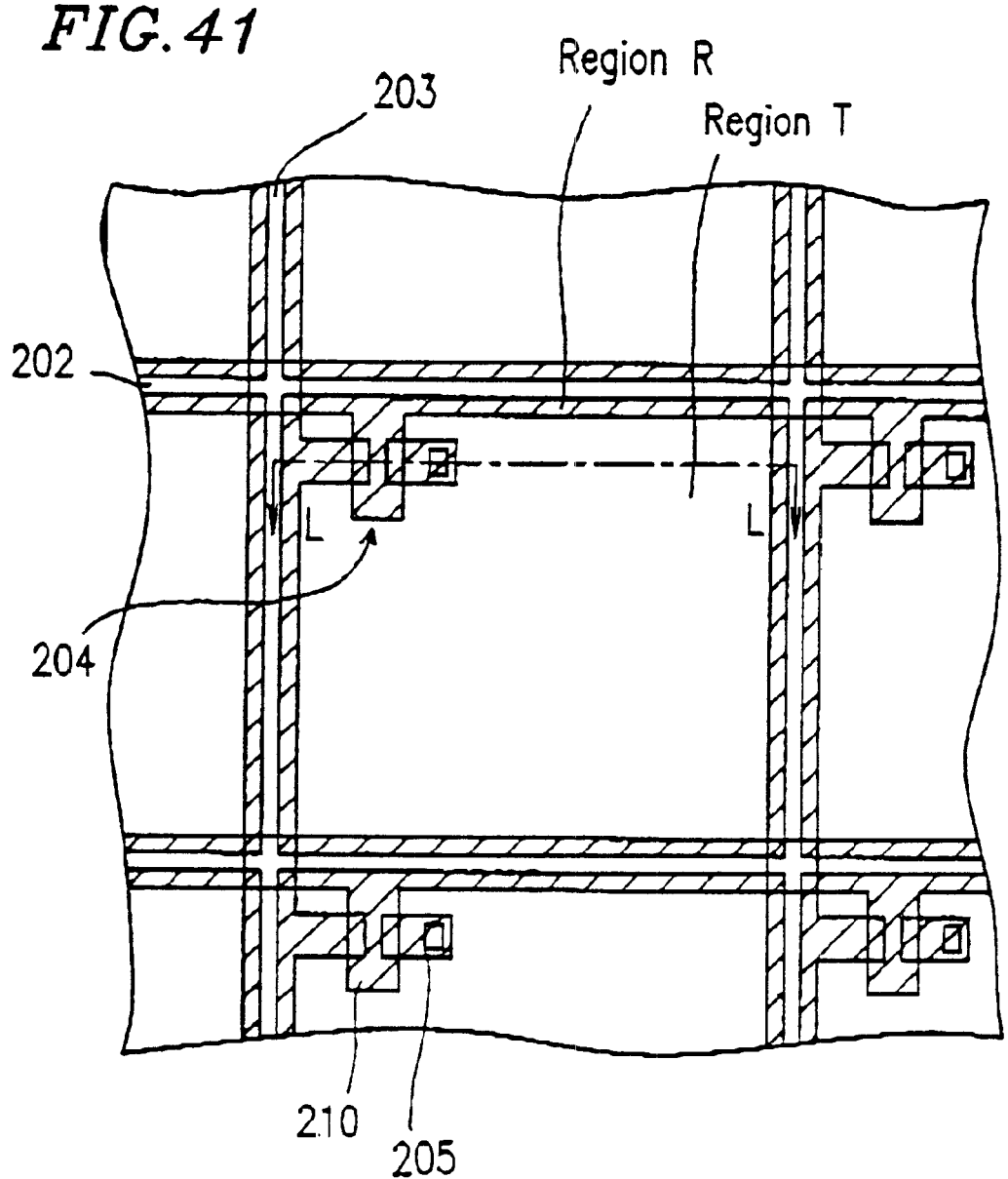
FIG. 41 is a plan view of an active matrix substrate of a liquid crystal display device according to Example 15 of the present invention.
Figure 42A:
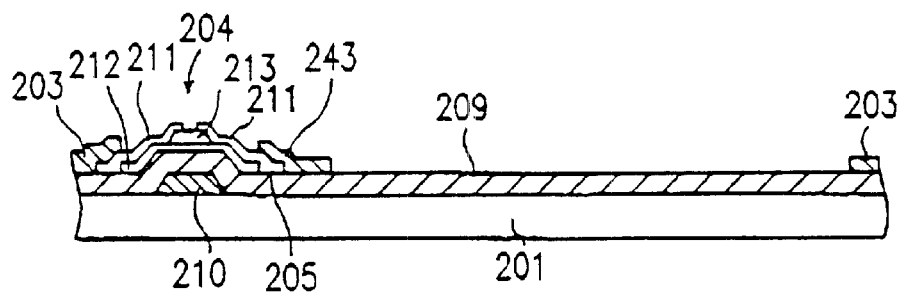
FIGS. 42A to 42C are sectional views taken along line L—L of FIG. 41, illustrating the fabrication process of the active matrix substrate of Example 15.
Figure 42B:
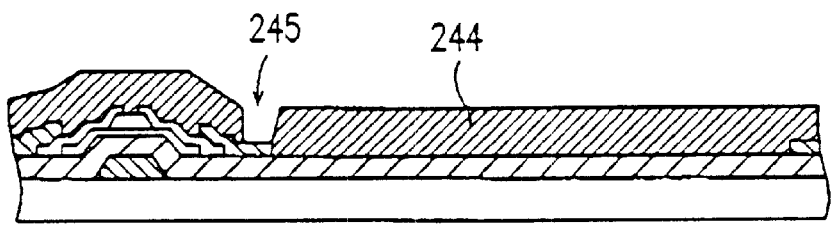
Figure 42C:
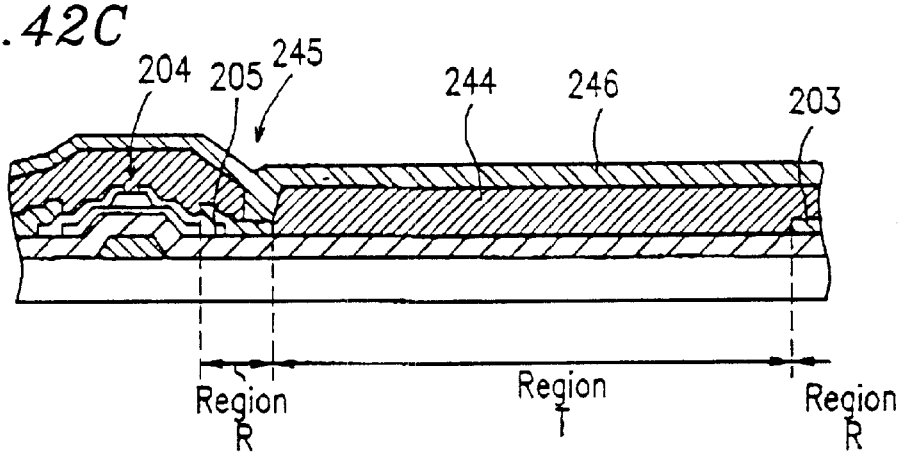

FIG. 41 is a partial plan view of an active matrix substrate of a liquid crystal display device of Example 15 according to the present invention. FIGS. 42A to 42C are sectional views taken along line L—L of FIG. 41, illustrating the process of fabricating the liquid crystal display device of this example.

In this example, pixel electrodes extend over gate lines and/or source lines via an insulating film so as to increase the effective pixel area (the area substantially functioning as a pixel).

The same components are denoted by the same reference numerals used in Examples 10 to 14. The pixels, the structure of the TFTs, and the fabrication process of the device are substantially the same as those described in Examples 10 to 14 unless otherwise specified.

As shown in FIG. 41, in this example, each pixel includes a region T having a high transmission efficiency formed in the center portion thereof and a region R (a hatched portion in FIG. 41) a square formed from narrow strips, surrounding the region T as is viewed from the top. The pixel electrode including a layer having a high transmission efficiency overlaps adjacent gate lines 202 and source lines 203 via an interlayer insulating film, so that a voltage can be applied to the portions of a liquid crystal layer located above the gate lines 202 and the source lines 203. This ensures a larger effective pixel area than in Examples 10 to 14. In this example, the gate lines 202 and the source lines 203 serve as layers having a high reflection efficiency in the region R.

The process of fabricating such a liquid crystal display device will be described with reference to FIGS. 42A to 42C.

Referring to FIG. 42A, gate electrodes 210, gate lines 202 (see FIG. 41), a gate insulating film 209, semiconductor layers 212, channel protection layers 213, and n+-Si layers 211, which are to be source electrodes 211 and drain electrodes 205 (or 211) are sequentially deposited on an insulating substrate 201 by sputtering. At least either of the gate lines 202 and the source lines 203, which are to be overlapped by light transmission layers as the pixel electrodes at a later step, are preferably made of a material having a high reflection efficiency.

Referring to FIG. 429, an interlayer insulating film 244 is formed on the resultant substrate, and then contact holes 245 are formed through the interlayer insulating film 244.

Referring to FIG. 42C, a material having a high transmission efficiency such as ITO is deposited on the resultant substrate by sputtering and patterned to form layers 246 having a high transmission efficiency. The layers 246, having a high transmission efficiency, are connected, via the contact holes 245, to connecting layers 243 which are in turn connected to drain electrodes 205 of TFTs 204. At this time, the layers 246 having a high transmission efficiency are patterned so as to overlap at least either of the gate lines 202 and the source lines 203. With this construction, the gate lines 202 and/or the source lines 203 which are overlapped by the layers 246 having a high transmission efficiency via the interlayer insulating film 244, can be used as the layers having a high reflection efficiency.

The display device having the above construction should be designed so that a degradation of the image quality, due to a phenomenon such as crosstalk, does not occur due to a capacitance generated between the layer 246, having a high transmission efficiency, and the gate line 202 or the source line 203.

Thus, in this example, each pixel includes the region T having a high transmission efficiency formed in the center portion thereof and the region R having a high reflection efficiency formed at positions corresponding to the adjacent gate lines and/or the source lines. This eliminates the necessity of forming an additional layer having a high reflection efficiency, and thus the process can be shortened.

EXAMPLE 16

Figure 43:
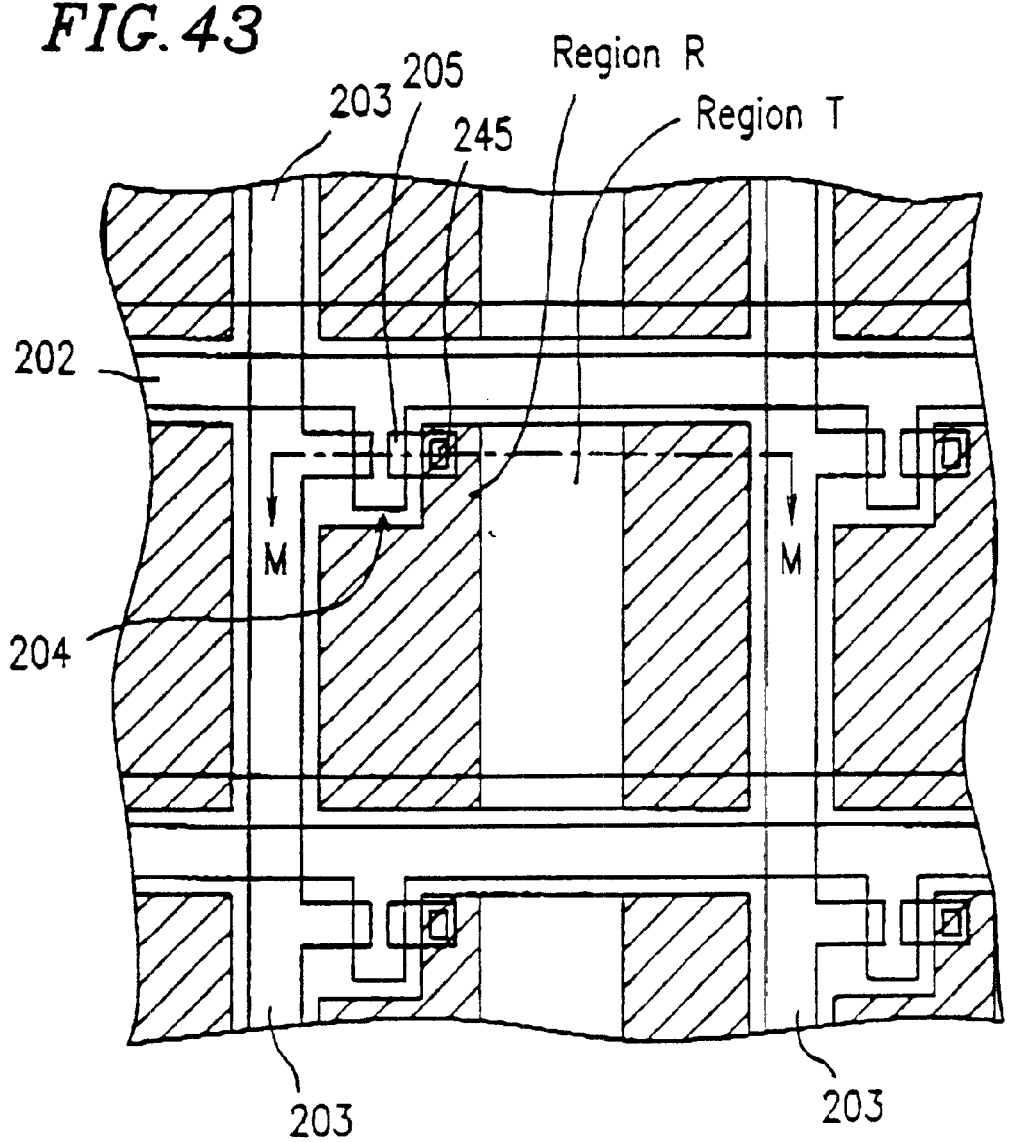
FIG. 43 is a plan view of an active matrix substrate of a liquid crystal display device according to Example 16 of the present invention.

FIG. 43 is a partial plan view of an active matrix substrate of a liquid crystal display device of Example 16 according to the present invention. FIGS. 44A to 44F are sectional views taken along line M—M of FIG. 43, illustrating the process of fabricating the liquid crystal display device of this example.

As shown in FIG. 43, each pixel of the liquid crystal display device of this example includes a region T having a high transmission efficiency in the center portion thereof, and a region R (hatched portions in FIG. 43) having a high reflection efficiency composed of two strips along adjacent source lines 203 formed on the sides of the region T.

Figure 44A:
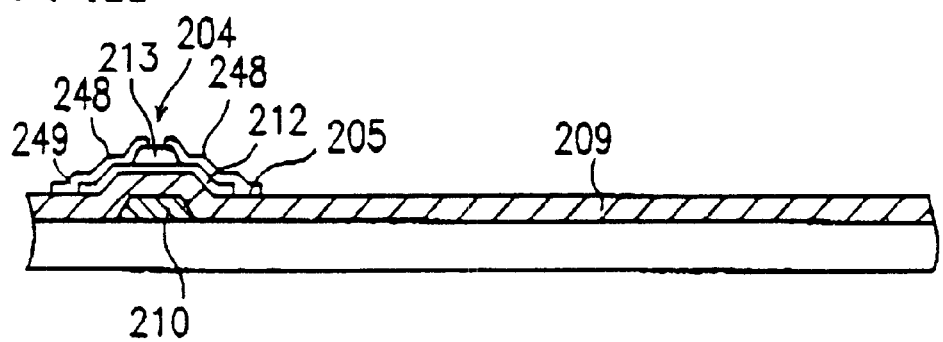
FIGS. 44A to 44F are sectional views taken along line M—M of FIG. 43, illustrating the fabrication process of the active matrix substrate of Example 16.
Figure 44B:
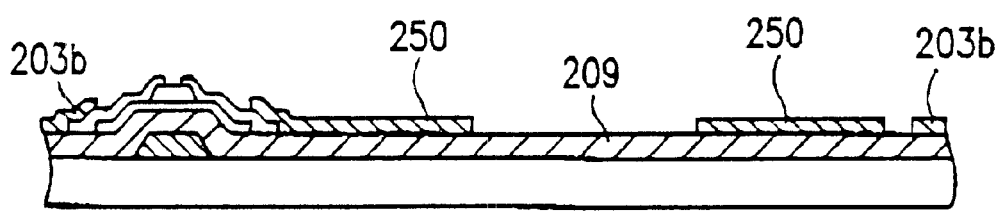
Figure 44C:
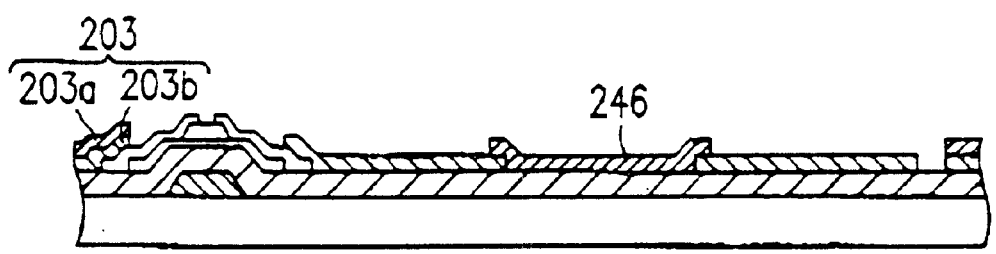
Figure 44D:
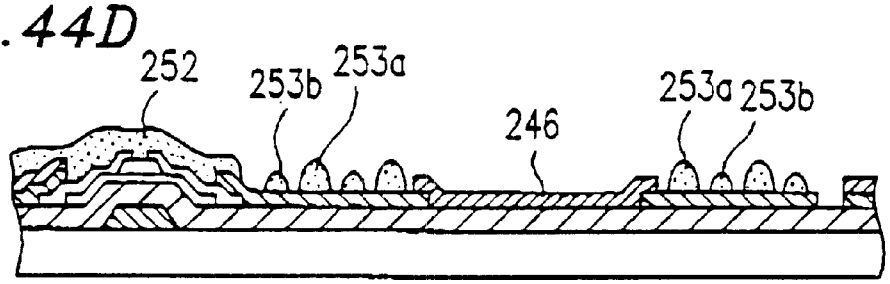
Figure 44E:
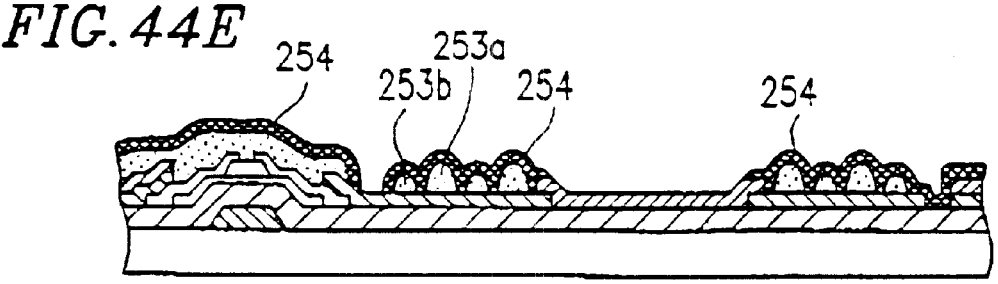
Figure 44F:
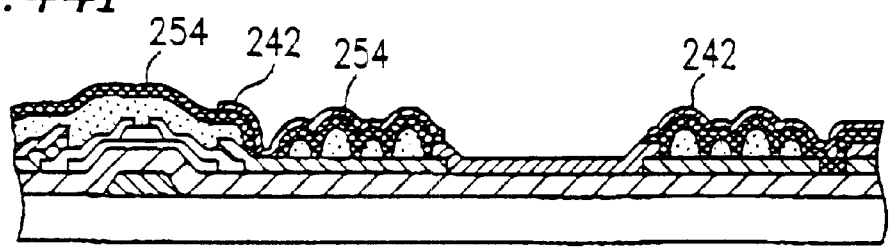

As shown in FIG. 44F, the region R includes high convex portions 253a and low convex portions 253b formed randomly on an insulating substrate 201, a polymer resin layer 254 formed over these convex portions 253a and 253b, and a layer 242, having a high reflection efficiency, formed on the polymer resin layer 254. The resultant layer 242, which constitutes the surface layer of the region R, has a surface of a continuous wave shape, and is electrically connected to a drain electrode 205 via a contact hole 245 and an underlying electrode (not shown).

The method for fabricating such a liquid crystal display device will be described with reference to FIGS. 44A to 44F.

Referring to FIG. 44A, a plurality of gate lines 202 (see FIG. 43) and gate electrodes 210 branched from the gate lines 202, made of Cr, Ta, or the like, are formed on the insulating substrate 201.

Then, a gate insulating film 209, made of $SiN_x$, $SiO_x$, or the like, is formed over the insulating substrate 201 covering the gate lines 202 and the gate electrodes 210. Semiconductor layers 212, made of amorphous silicon (a-Si), polysilicon, CdSe, or the like, are formed on the portions of the gate insulating film 209 located above the gate electrodes 210. A channel protection layer 213 is formed on each of the semiconductor layers 212. A pair of contact layers 248, made of a-Si or the like, are formed on both side portions of the channel protection layer extending to the side portions of the semiconductor layers 212.

A source electrode 249, made of Ti, Mo, Al, or the like, is formed on one of the contact layers 248, while the drain electrode 205 made of Ti, Mo, Al, or the like, is formed on the other contact layer 248.

In this example, as the material of the insulating substrate 201, a glass plate with a thickness of 1.1 mm, product number 7059 manufactured by Corning Inc. may be used.

Referring to FIG. 44B, a conductive film is formed on the resultant substrate by sputtering and patterned, to form metal layers 203b used as part of the source lines 203 and the underlying electrodes 250 simultaneously. Each of the underlying layers 250 may be formed to partly overlap the gate electrode 202 for the adjacent pixel in the next pixel row, via the gate insulating film 209, so as to form a storage capacitor therebetween.

Each of the gate lines 202 used to form a storage capacitor may be overlapped by a layer having a high reflection efficiency, or the reflection efficiency of the gate line 202 itself may be made high to serve as part of the pixel region (the region R, to further increase the aperture ratio.

Referring to FIG. 44C, ITO is deposited on the resultant substrate by sputtering and patterned to form ITO layers 203a which constitute the source lines 203 together with the metal layers 203b.

In this example, each source line 203 is of a double-layer structure composed of the metal layer 203b and the ITO layer 203a. The double-layer structure is advantageous in that, even if the metal layer 203b is partly defective, the electric connection of the source line 203 is maintained by the ITO layer 203a. This reduces the occurrence of disconnections in the source line 203.

Simultaneously with the formation of the ITO layers 203a, layer 246, having a high transmission efficiency and which constitute the pixel electrodes, are also obtained by the patterning. In this way, the layers 246 having a high transmission efficiency as the pixel electrodes can be formed simultaneously with the source lines 203.

Referring to FIG. 44D, a resist film 252, made of a photosensitive resin, is formed and patterned, and then heat-treated in order to round it, so that the high convex portions 253a and the low convex portions 253b, having a substantially circular cross-section, are formed on the portions of the resultant substrate corresponding to the regions R. Such convex portions 253a and 253b are preferably not formed on the layers 246 having a high transmission efficiency so that a voltage can be efficiently applied to a liquid crystal layer. Even if the convex portions 253a and 253b are formed on the layers 246, however, no significant optical influence will be observed so long as the convex portions are transparent.

Referring to FIG. 44E, a polymer film 254 is formed over the convex portions 253a and 253b. With this film, the concave and convex shaped surface of the region R can be made more continuous by reducing the number of flat portions. This step may be omitted by changing the fabrication conditions.

Referring to FIG. 44F, layers 242 having a high reflection efficiency made of Al as the pixel electrodes are formed on predetermined portions of the polymer films 254 by sputtering, for example. Materials suitable for the layers 242 having a high reflection efficiency include, besides Al and an Al alloy, Ta, Ni, Cr, and Ag having a high light reflection efficiency. The thickness of the layers 242 having a high reflection efficiency is preferably in the range of about 0.01 to about 1.0 µm.

Thus, each pixel of the liquid crystal display device of this example includes the region T having a high transmission efficiency formed in the center portion thereof, and the region R having a high reflection efficiency formed along the adjacent source lines. With this construction, since the ITO layers 203a of the source lines 203 and the layers 242 having a high reflection efficiency are located at different levels, the gap between the ITO layer 203a and the layer 242 with a high reflection efficiency of each pixel, which is required to prevent a leakage therebetween, can be narrowed, and thus the aperture ratio of the pixel can be increased, compared with the case where the regions T and R are formed in reverse (i.e., the case when the layer having a high reflection efficiency is located in the center portion of the pixel).

In this example, the layers 242 having a high reflection efficiency have a smooth concave and convex shaped surface to allow reflected light to be scattered in a wide range of directions. When a scattering sheet is jointly used, such convex portions need not be formed with the resist film 252, instead the surface of the layers 242 having a high reflection efficiency can be made flat. In either case, the layers 242, having a high reflection efficiency, and the layers 246 having a high transmission efficiency, exist as individual layers with a third substance (e.g., a resin and a metal such as Mo) interposed therebetween. With this construction, in the specific case where the layers having a high transmission efficiency are made of ITO and the layers having a high reflection efficiency are made of Al or an Al alloy, Al patterning failure due to an electric corrosion which tends to be generated at the Al etching step can be reduced.

EXAMPLE 17

Figure 45:
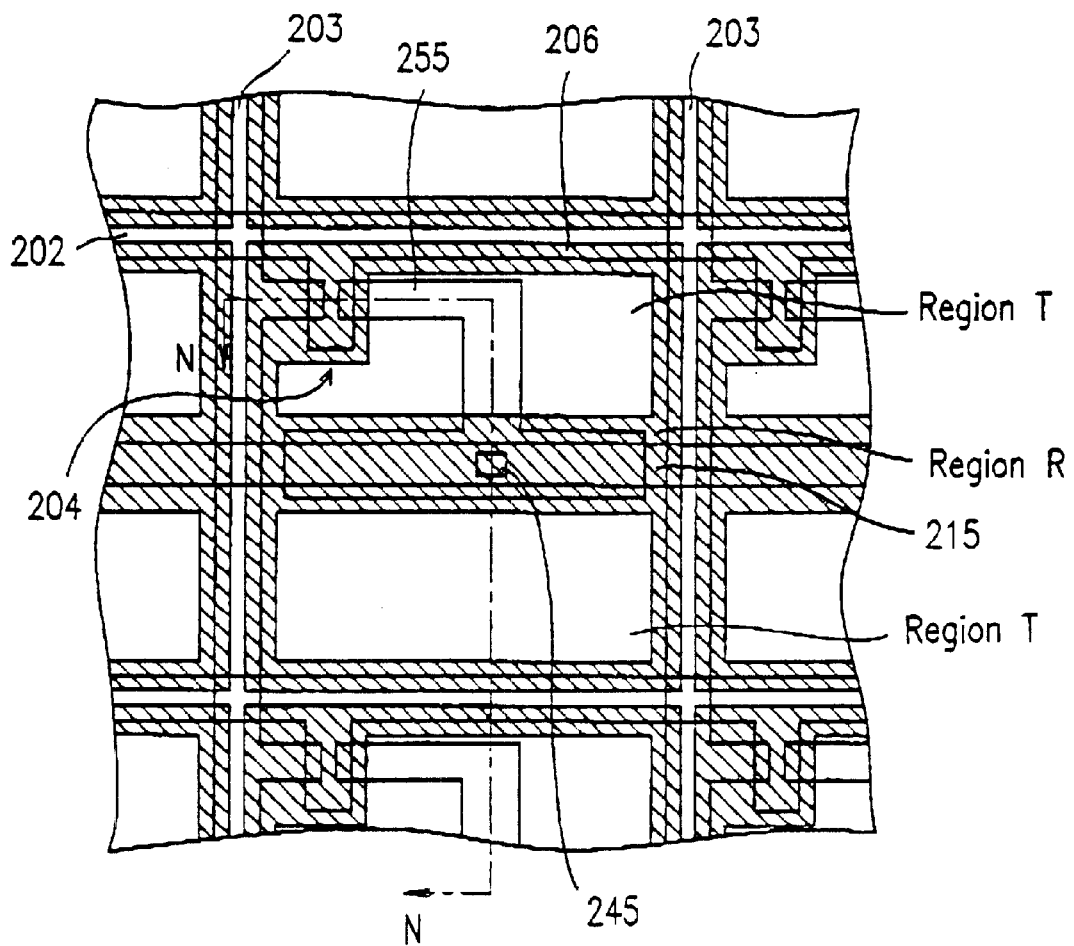
FIG. 45 is a plan view of an active matrix substrate of a liquid crystal display device according to Example 17 of the present invention.
Figure 46:
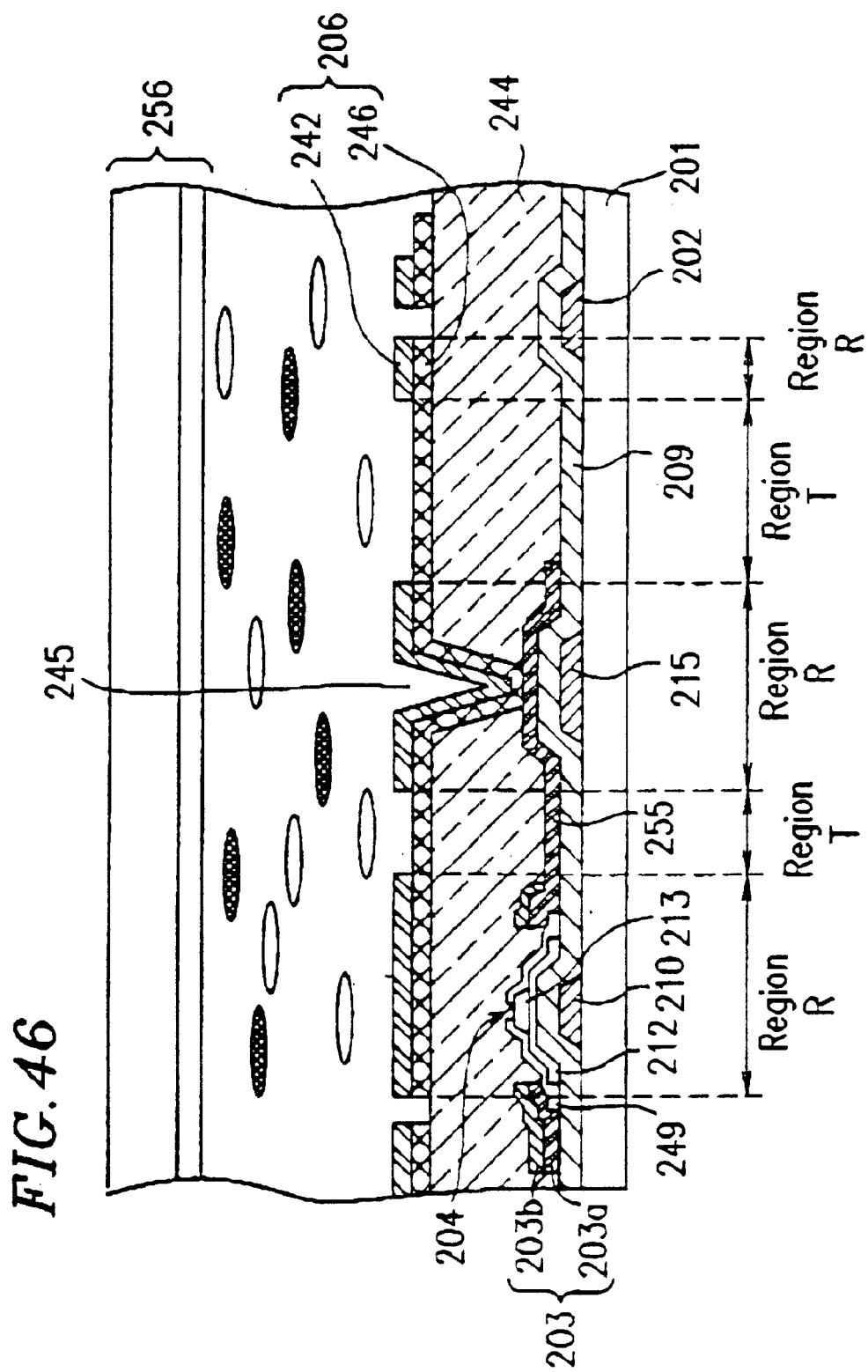
FIG. 46 is a sectional view taken along line N—N of FIG. 45.

FIG. 45 is a partial plan view of an active matrix substrate of a liquid crystal display device of Example 17 according to the present invention. FIG. 46 is a sectional view taken along line N—N of FIG. 45.

Referring to FIGS. 45 and 46, the active matrix substrate includes pixel electrodes 206 formed in a matrix and gate lines 202 for supplying scanning signals and source lines 203 for supplying display signals running along the peripheries of the pixel electrodes 206 so as to cross with each other.

The pixel electrodes 206 overlap the gate lines 202 and the source lines 203 at the peripheries via an interlayer insulating film 244. The gate lines 202 and the source lines 203 are composed of metal films.

A TFT 204 is formed in the vicinity of each of the crossings of the gate lines 202 and the source lines 203 as the switching element for supplying display signals to the corresponding pixel electrode 206. A gate electrode 210 of the TFT 204 is connected to the corresponding gate line 202 to drive the TFT 204 with signals input into the gate electrode 210. A source electrode 249 of the TFT 204 is connected to the corresponding source line 203 to receive data signals. A drain electrode 205 of the TFT 204 is electrically connected to a connecting electrode 255 and then to the pixel electrode 206 via a contact hole 245.

The connecting electrode 255 forms a storage capacitor with a common line 215 via a gate insulating film 209.

The common line 215 is composed of a metal film, and connected to a counter electrode formed on a counter substrate 256 via an interconnect (not shown). The common line 215 may be formed during the same step as the formation of the gate lines 202 to shorten the fabrication process.

Each of the pixel electrodes 206 is composed of a layer 242 having a high reflection efficiency made of Al or an Al alloy and a layer 246 having a high transmission efficiency made of ITO. When viewed from the top, the pixel electrode 206 is divided into three regions, i.e., two regions T having a high transmission efficiency and a region R having a high reflection efficiency (corresponding to the hatched portion in FIG. 45). The layer 242 having a high reflection efficiency may also be composed of a conductive metal layer having a high reflection efficiency such as Ta as in the above examples.

Each region R is designed to cover part of light-shading electrodes and interconnect lines, such as the gate lines 202, the source lines 203, the TFT 204, and the common line 215, which do not transmit light from a backlight. With this construction, the regions of each pixel portion which are not usable as the regions T can be used as the region R having a high reflection efficiency. This increases the aperture ratio of the pixel portion. The regions T of each pixel portion are surrounded by the region R.

The method for fabricating the active matrix with the above construction will be described.

First, the gate electrodes 210, the gate lines 202, the common lines 215, the gate insulating film 209, semiconductor layers 212, channel protection layers 213, the source electrodes 249, and the drain electrodes 205 are sequentially formed on a transparent insulating substrate 201 made of glass or the like.

Then, a transparent conductive film and a metal film which are to constitute the source lines 203 and the connecting electrodes 255 are deposited on the resultant substrate by sputtering and patterned into a predetermined shape.

Thus, each of the source lines 203 is of a double-layer structure composed the ITO layer 203a and the metal layer 203b. The double-layer structure is advantageous in that, even if the metal layer 203b is partly defective, the electric connection of the source lines 203 is maintained by the ITO layer 203a. This reduces the occurrence of disconnections in the source lines 203.

Thereafter, a photosensitive acrylic resin is applied to the resultant substrate by a spin application method to form the interlayer insulating film 244 with a thickness of about 3 µm. The acrylic resin is then exposed to light according to a desired pattern and then developed with an alkaline solution. Only the light-exposed portions of the film are etched away with the alkaline solution to form the contact holes 245 through the interlayer insulating film 244. By employing this alkaline development, well-tapered contact holes 245 are obtained.

Using a photosensitive acrylic resin for the interlayer insulating film 244 is advantageous in the aspect of productivity in view of the following points. Since the spin application method can be employed for the thin film formation, a film as thin as several micrometers can be easily formed. Also, no photoresist application step is required at the patterning of the interlayer insulating film 244.

In this example, the acrylic resin is originally colored and can be made transparent by exposing the entire surface to light after the patterning. The acrylic resin may also be made transparent by chemical processing.

Thereafter, an ITO film is formed by sputtering and patterned, to be used as the layers 246 having a high transmission efficiency of the pixel electrodes 206. Thus, the layers 246 having a high transmission efficiency, which constitute the pixel electrodes 206, are electrically connected to the corresponding connecting electrodes 255 via the contact holes 245.

The layers 242 having a high reflection efficiency, made of Al or an Al alloy, are then formed on the portions of the layers 246 having a high transmission efficiency, which correspond to the regions R, so as to overlie the gate lines 202, the source lines 203, the TFTs 204, and the common lines 215. The two layers 242 and 246 are electrically connected with each other, thereby forming pixel electrodes 206. Any adjacent pixel electrodes 206 are separated along the portions located above the gate lines 202 and the source lines 203 so as not to be electrically connected with each other.

As shown in FIG. 46, the thus-fabricated active matrix substrate and the counter substrate 256 are bonded together, and liquid crystal is injected in a space between the substrates to complete the liquid crystal display device of this example.

As described above, the liquid crystal display device of this example includes the layers 242, having a high reflection efficiency, formed above the TFTs 204, the gate lines 202, and the source lines 203 so as to constitute the regions R of the pixel electrodes 206. This eliminates the necessity of providing light-shading films for preventing light from entering the TFTS 204 and light-shading the portions of the pixel electrodes 206 located above the gate lines 202, the source lines 203, and the common lines 215. In such portions, a light leakage tends to be generated in the form of domains, disclination lines, and the like in display regions. As a result, the regions which are conventionally unusable as display regions because they are blocked by the light-shading films can be made usable as display regions. This allows for effective use of the display regions.

When the gate lines and the source lines are composed of metal films, they block light from a backlight in a conventional transmission type display device and thus are unusable as display regions. In this example, however, the region T having a high transmission efficiency is formed in the center portion of each pixel (as two separate portions in this example). The region R, having a high reflection efficiency, is formed in a shape of strips surrounding the region T That is, the region R having a high reflection efficiency overlies the gate lines, the source lines, the common line, and the switching element, and is used as the reflection electrode region of each pixel electrode. This construction increases the aperture ratio of the pixel electrode more than the case of the reverse pattern (i.e., the pattern where the region T surrounds the region R.

Figure 47:
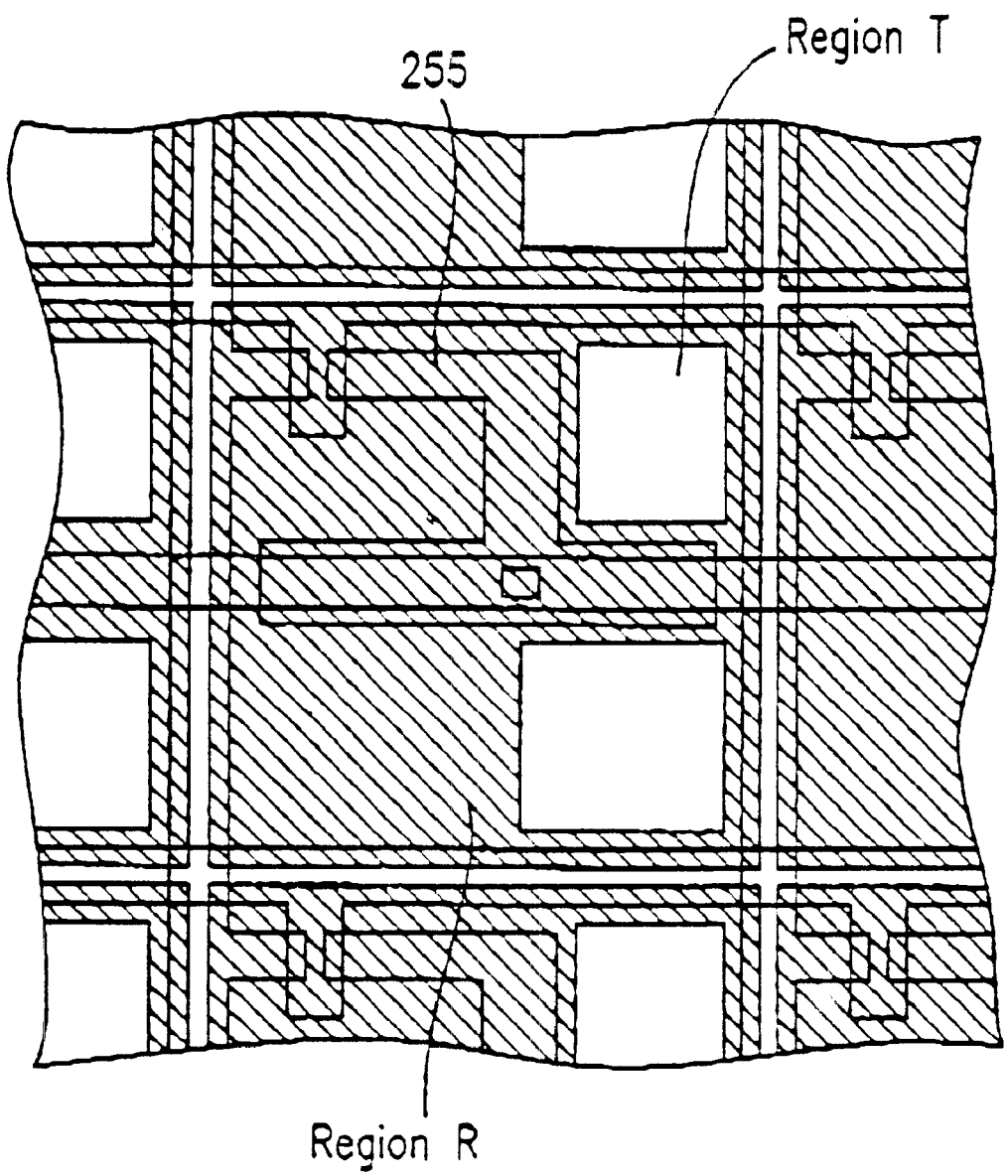
FIG. 47 is a plan view of an alternative embodiment of the active matrix substrate of the liquid crystal display device according to Example 17 of the present invention.

Alternatively, the region R of each pixel may be formed as shown in FIG. 47 (hatched portion) including the connecting electrode 255. This suppresses the decrease in the brightness of light passing through the region T.

EXAMPLE 18

In the above examples, the present invention was applied to the active matrix liquid crystal display device. The present invention can also be applied to a simple matrix liquid crystal display device.

Hereinbelow, a basic construction of a pair of a column electrode (a signal electrode) and a row electrode (a scanning electrode) which face each other will be described. In the simple matrix liquid crystal display device, the region where the pair of the column electrode and the row electrode cross with each other defines a pixel.

Figure 48A:
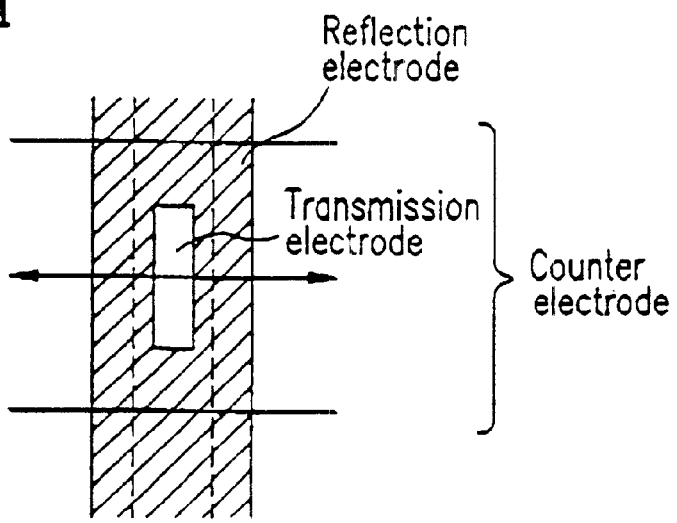
FIGS. 48A to 48C are views illustrating a construction of Example 18 where the present invention is applied to a simple matrix liquid crystal display device.
Figure 48B:
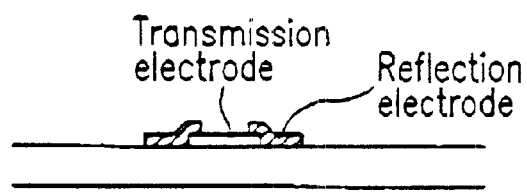
Figure 48C:
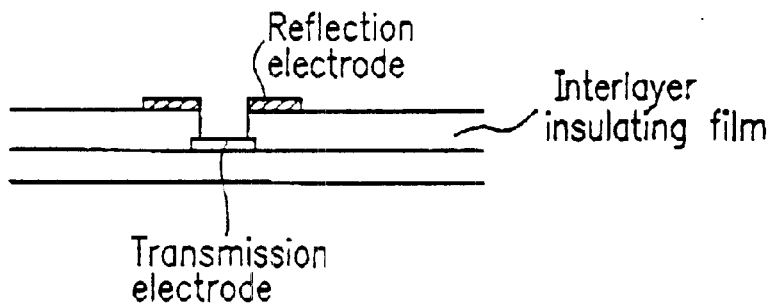

FIGS. 48A to 48C show one example of such a pixel region. Referring to FIG. 48A, a transmission electrode region is formed in the center portion of the column electrode in one pixel region, while a reflection electrode region is formed in the remaining peripheral portion thereof. The construction of the column electrode may be as shown in FIG. 48B or 48C. The height of the reflection electrode region can be adjusted by forming an interlayer insulating film between the reflection electrode and the transmission electrode as shown in FIG. 48C.

Figure 49A:
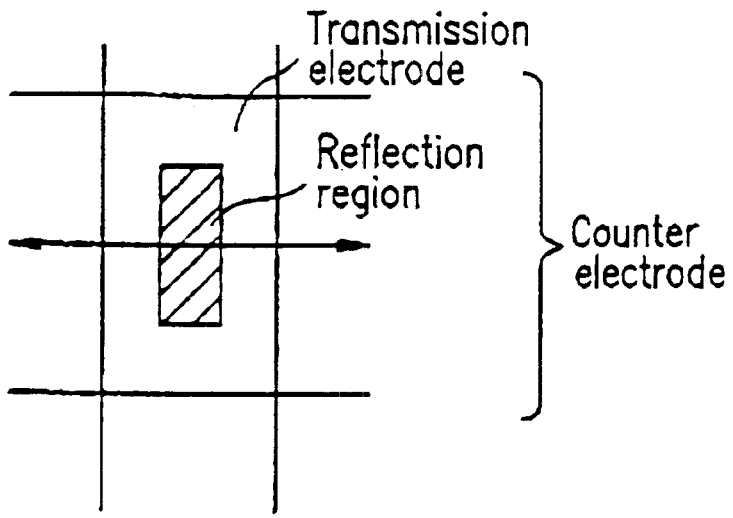
FIGS. 49A to 49C are views illustrating another construction of Example 18.
Figure 49B:
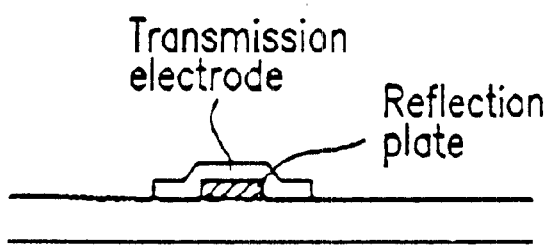
Figure 49C:
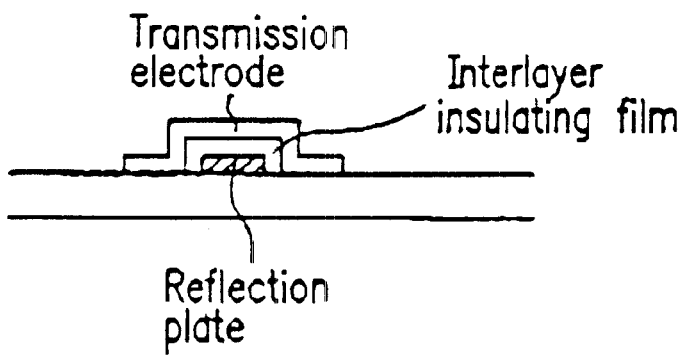

Alternatively, as shown in FIG. 49A, a reflection electrode region may be formed in the center portion of the column electrode in one pixel region, while a transmission electrode region is formed in the remaining peripheral portion thereof. The construction of the column electrode may be as shown in FIG. 49B or 49C. The height of the reflection electrode region can be adjusted by forming an interlayer insulating film between the reflection plate and the transmission electrode as shown in FIG. 49C.

Figure 50A:
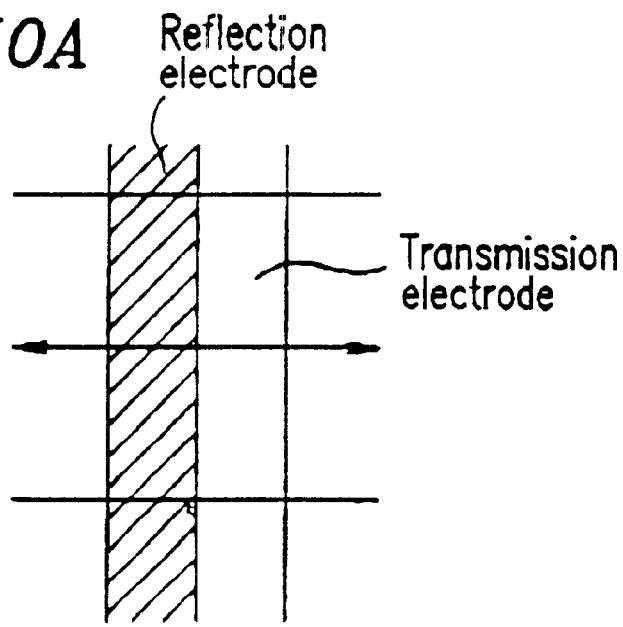
FIGS. 50A to 50C are views illustrating still another construction of Example 18.
Figure 50B:
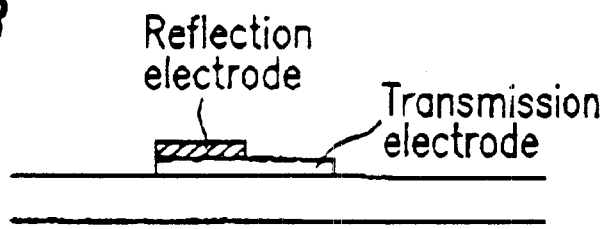
Figure 50C:
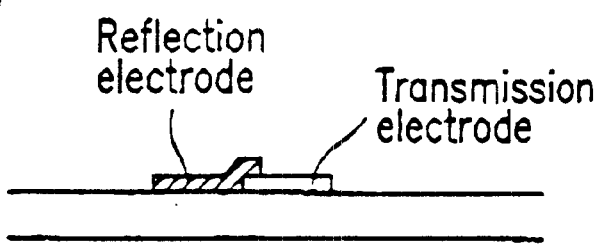
Figure 51A:
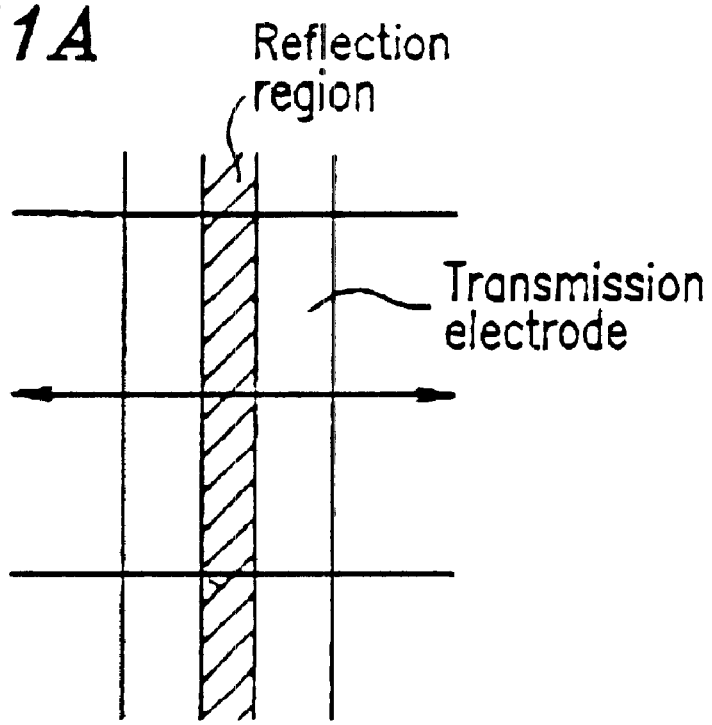
FIGS. 51A and 51B are views illustrating still another construction of Example 18.
Figure 51B:
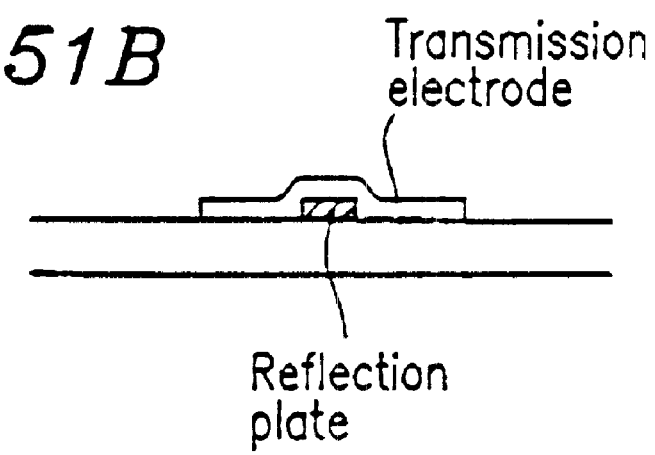
Figure 52:
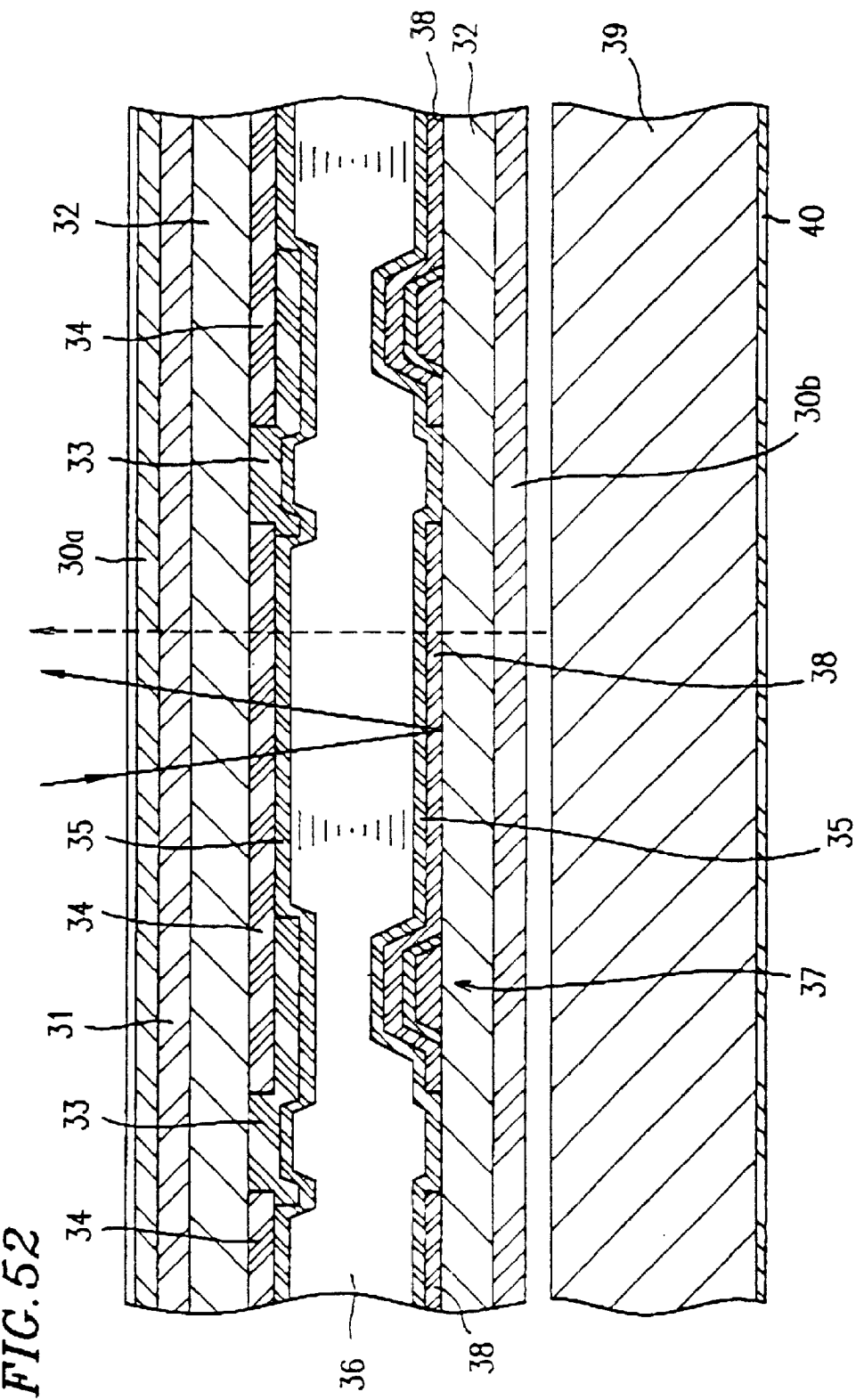
FIG. 52 is a sectional view of a conventional liquid crystal display device.

Alternatively, as shown in FIGS. 50A, 503 and 50C and FIGS. 51A and 51B, the column electrode may have a strip-shaped reflection electrode region. Such a strip-shaped reflection electrode region may be formed along one side of the column electrode as shown in FIGS. 50A to 50C, or along the center thereof as shown in FIGS. 51A and 51B.

Hereinbelow, the features of the liquid crystal display device according to the present invention distinguished from the conventional reflection type or transmission type liquid crystal display device will be described.

In the conventional reflection type liquid crystal display device, the display is effected by use of ambient light to realize low power consumption. Accordingly, when ambient light is lower than a certain limit value, the display fails to be recognized even if the device is being used in an environment where sufficient power supply is possible. This is one of the biggest shortcomings of the reflection type liquid crystal display device.

If the reflection characteristics of the reflection electrodes vary at the fabrication, the ambient light utilization efficiencies of the reflection electrodes also vary. This varies the critical value of the ambient light intensity at which the display becomes unrecognizable depending on the panels. At the fabrication, therefore, the variation in the reflection characteristics must be controlled more carefully than the variation in the aperture ratio of which control is required for the conventional transmission type liquid crystal display device. Otherwise, a liquid crystal display device having stable display characteristics is not obtained.

On the contrary, in the liquid crystal display device according to the present invention, light from a backlight is utilized under the environment where sufficient power supply is possible as in the conventional transmission type liquid crystal display device. Accordingly, the display can be recognized regardless of the intensity of ambient light. Thus, the variation in the ambient light utilization efficiency due to the variation in the reflection characteristics is not required to be controlled as strictly as that in the reflection type liquid crystal display device.

On the other hand, in the conventional transmission type liquid crystal display device, when ambient light becomes bright, the surface reflection components of the light increases, making it difficult to recognize the display. In the liquid crystal display device according to the present invention, when ambient light becomes bright, the reflection regions are used together with the transmission regions. This increases the panel brightness, and thus improves the visibility.

Thus, the liquid crystal display device according to the present invention can overcome both the problems that visibility is lowered due to surface reflection under high (i.e., bright) ambient light in a conventional transmission type liquid crystal display device and that display recognition becomes difficult due to a decrease in the panel brightness under low (i.e., dark) ambient light in a conventional reflection type liquid crystal display device simultaneously. In addition to the above, both the features of these devices can be obtained.

As described above, according to the present invention, each pixel includes a region having a higher transmission efficiency and a region having a higher reflection efficiency than in the case of using a semi-transmissive reflection film. In each region, a layer having a high transmission efficiency or a layer having a high reflection efficiency serves as the pixel electrode. With this construction, unlike the conventional liquid crystal display device using a semi-transmissive reflection film, the utilization efficiency of ambient light and illumination light is prevented from decreasing due to straylight phenomenon, for example. Good images can be displayed regardless of the brightness of ambient light by using either a reflection mode display, a transmission mode display, or both a reflection mode display and a transmission mode display. Since both light from the backlight and the ambient light contribute to the display simultaneously and efficiently, power consumption significantly decreases compared with the transmission type liquid crystal display device which always uses light from the backlight.

In other words, the shortcomings that visibility is significantly lower under low ambient light in a conventional reflection type liquid crystal display device and the display recognition becomes difficult under high ambient light in a conventional transmission type liquid crystal display device can be overcome simultaneously by increasing the light utilization efficiency according to the present invention.

Since the regions having a high reflection efficiency partly cover the gate lines, the source lines, and/or the switching elements, light incident on these portions can also be used for the display. Therefore, the effective area of the pixel increases markedly. This not only overcomes the problems of the conventional device using the semi-transmissive reflection film, but also increases the aperture ratio of each pixel even if compared with a normal transmission type liquid crystal display device.

In the case where only a layer having a high transmission efficiency constitutes a pixel electrode, the occurrence of a defect caused by the pixel electrode can be reduced, compared with the case where a layer having a high transmission efficiency and a layer having a high reflection efficiency are electrically connected with each other to form a pixel electrode of one pixel and the case where a layer having a high transmission efficiency and a layer having a high reflection efficiency partly overlap each other to form a pixel electrode of one pixel. As a result, the yield increases.

The layer having a high transmission efficiency or the layer having a high reflection efficiency may be made of the same material as that for the source lines or the gate lines. This simplifies the fabrication process of the liquid crystal display device.

The occupation of the area of the region having a high reflection efficiency in the effective pixel area is set at about 10 to about 90%. This setting overcomes both the problems that the display becomes less recognizable when ambient light is too high in a convention transmission type liquid crystal display device and that the display becomes completely unrecognizable when the intensity of ambient light is extremely low in a conventional reflection type liquid crystal display device. Thus, an optimal display can be realized as a reflection mode display, a transmission mode display, or both a reflection mode display and a transmission mode display, regardless of the amount of ambient light.

The reflection/transmission type liquid crystal display device according to the present invention is especially effective when it is applied to an apparatus in which the display screen is not swingable or which cannot be moved to a better environment for the convenience of the operator.

The liquid crystal display device according to the present invention was actually used as a view finder (monitor screen) in a battery-driven digital camera and a video camera. As a result, it has been found that the power consumption was kept at a low level while the brightness suitable for observation was maintained by adjusting the brightness of the backlight regardless of the brightness of the ambient light.

When the conventional transmission type liquid crystal display device is used outdoors under bright sunlight, the display become less recognizable even if the brightness of the backlight is increased. Under such occasions, the liquid crystal display device of the present invention can be used as a reflection type device by turning off the backlight, or it can be used as the transmission/reflection type device by lowering the brightness of the backlight. As a result, good display quality and reduced power consumption can be realized.

When the liquid crystal display device according to the present invention is used indoors with bright sunlight coming thereinto, the reflection mode display and the transmission mode display may be switched therebetween or both may be used depending on the directional position of the object, to obtain a more recognizable display. When the monitor screen receives direct sunlight, the manner described in the case of an outdoors use under bright sunlight may be adopted. When the object is to be imaged in a dark corner of a room, the backlight is turned on in order to use the device as a reflection/transmission mode display.

When the liquid crystal display device according to the present invention is used as a monitor screen in a car apparatus such as a car navigator, also, an invariably recognizable display is realized regardless of the brightness of ambient light.

In a car navigator using the conventional liquid crystal display device, a backlight having a higher brightness than that used in a personal computer and the like is used, so as to be usable during a fine weather and in an environment receiving direct sunlight. However, despite such a high brightness, the display is still less recognizable under the environment described above. On the other hand, a backlight with such a high brightness is so bright that the user is dazzled and adversely influenced. In a car navigator using the liquid crystal display device according to the present invention, a reflection mode display can always be used together with a transmission mode display. This allows for a good display under a bright environment without increasing the brightness of the backlight. Conversely, under a pitch-dark environment, a recognizable display is realized by obtaining only a low brightness (about 50 to 100 cd/m$^2$) of the backlight.

Various other modifications will be apparent to and can be readily made by those skilled in the art without departing from the scope and spirit of this invention. Accordingly, it is not intended that the scope of the claims appended hereto be limited to the description as set herein, but rather that the claims be broadly construed.

What is claimed is:

1. A liquid crystal display element comprising:
   a liquid crystal layer;
   a pair of substrates having the liquid crystal layer interposed therebetween;
   a pixel region formed within the pair of substrates being defined by pixel electrodes for applying a voltage to the liquid crystal layer; and
   wherein the pixel region includes a first region having a non-transmissive reflection layer with light-reflectivity and a second region having light-transmissivity, and reflected light from the first region and transmitted light from the second region are adapted to contribute to display so that the display can operate in a transmissive mode and in a reflective mode; and
   wherein within the pixel region the first region is formed in a central portion of a pixel and the second region substantially surrounds the first region in the pixel.

2. A liquid crystal display element according to claim 1, wherein a switching device is provided in the pixel region, and a transparent electrode connected to the switching device functions as a pixel electrode within the first or the second region.

3. A liquid crystal display element according to claim 2, wherein the transparent electrode functions as a pixel electrode within the first and second regions.

4. A liquid crystal display element according to claim 2, wherein the reflection layer is made of the same material as an address line connected to the switching device.

5. A liquid crystal display element according to claim 1, wherein the liquid crystal device is a simple matrix type, and the pixel region is defined by two strip electrodes crossing each other.

6. A liquid crystal display element according to claim 1, wherein within the pixel region, an area of first region is substantially at least 10% of a total area of the pixel region.

7. A liquid crystal display element according to claim 1, further comprising a diffusion means for diffusing reflected light from the first region.

8. A liquid crystal display device according to claim 1, wherein the reflection layer in the first region is adapted to function as one of a respective pair of pixel electrodes.

9. A liquid crystal display device according to claim 8, wherein the reflection layer in the first region is formed in a plane.

10. A liquid crystal display device according to claim 8, wherein the reflection layer in the first region has a configuration for diffusing and reflecting light simultaneously.

11. The display element of claim 1, wherein the display operates in a transmissive mode using a backlight and in a reflective mode using ambient light.

12. A liquid crystal display element comprising:
    a liquid crystal layer;
    a pair of substrates having the liquid crystal layer interposed therebetween;
    a pixel region formed within the pair of substrates being defined by pixel electrodes for applying a voltage to the liquid crystal layer;
    wherein the pixel region includes a first region having a reflection layer with light-reflectivity and a second region having light-transmissivity, and reflected light from the first region and transmitted light from the second region are adapted to contribute to display; and
    wherein between the first and second regions there is provided a further separate region which has a characteristic of reflection or transmission different from that of the first and second regions.

13. A liquid crystal display element comprising:
    a liquid crystal layer;
    a pair of substrates having the liquid crystal layer interposed therebetween;
    a pixel region formed within the pair of substrates being defined by pixel electrodes for applying a voltage to the liquid crystal layer;
    wherein the pixel region includes a first region having a reflection layer with light-reflectivity and a second region having light-transmissivity, and reflected light from the first region and transmitted light from the second region are adapted to contribute to display; and
    wherein the reflection layer with light-reflectivity of the first region is provided to function as a pixel electrode within the first region, and within the second region a transmission layer is provided with a light-transmissivity which is more than that of the reflection layer in the first region.

* * * * *

UNITED STATES PATENT AND TRADEMARK OFFICE
CERTIFICATE OF CORRECTION

PATENT NO.     : 6,452,654 B2                                      Page 1 of 1
DATED          : September 17, 2002
INVENTOR(S)    : Kubo et al.

It is certified that error appears in the above-identified patent and that said Letters Patent is hereby corrected as shown below:

<u>Title page,</u>
Please add the following information which was inadvertently left off, -- [30] Foreign Application Priority Data

| | | |
|---|---|---|
| July 28, 1997 | (JP) | 9-201176 |
| Oct. 7, 1997 | (JP) | 9-274327 |
| Jan. 29, 1998 | (JP) | 10-016299 |
| Jan. 30, 1998 | (JP) | 10-018781 |
| Mar. 24, 1998 | (JP) | 10-075317 |
| Apr. 28, 1998 | (JP) | 10-117954 -- |

Signed and Sealed this

Eighteenth Day of March, 2003

JAMES E. ROGAN
*Director of the United States Patent and Trademark Office*